(12) United States Patent
Ito et al.

(10) Patent No.: US 8,933,998 B2
(45) Date of Patent: *Jan. 13, 2015

(54) THREE-DIMENSIONAL IMAGE DISPLAY DEVICE, METHOD OF MANUFACTURING THE SAME, AND THREE-DIMENSIONAL IMAGE DISPLAY METHOD

(75) Inventors: Katsuhisa Ito, Tokyo (JP); Naoya Eguchi, Kanagawa (JP); Hiroki Kikuchi, Kanagawa (JP); Shinichiro Tajiri, Tokyo (JP); Izushi Kobayashi, Tokyo (JP); Hiroaki Yasunaga, Tokyo (JP)

(73) Assignee: Sony Corporation, Tokyo (JP)

( * ) Notice: Subject to any disclaimer, the term of this patent is extended or adjusted under 35 U.S.C. 154(b) by 792 days.

This patent is subject to a terminal disclaimer.

(21) Appl. No.: 12/958,900

(22) Filed: Dec. 2, 2010

(65) Prior Publication Data

US 2011/0069157 A1 Mar. 24, 2011

(30) Foreign Application Priority Data

Dec. 12, 2008 (JP) ................................. 2008-317522
Oct. 21, 2009 (JP) ................................. 2009-242716
Dec. 10, 2009 (JP) ................................. 2009-280754

(51) Int. Cl.
*H04N 13/04* (2006.01)
(52) U.S. Cl.
CPC ....... *H04N 13/0468* (2013.01); *H04N 13/0402* (2013.01); *H04N 13/0404* (2013.01); *H04N 13/0418* (2013.01)
USPC ............................................ 348/51; 345/419

(58) Field of Classification Search
CPC ................. G02B 2006/12107; G02B 27/2207; G02B 6/06; G02B 2027/011; G02B 2027/0132; G02B 2027/0154; G02B 2027/0178; G02B 25/008; G02B 26/06; G02B 27/0093; G02B 27/0172; G02B 27/0994; G02B 27/225; G02B 3/0056; G02B 3/0062; G02B 27/2214; G02B 27/2285; H04N 13/0402; H04N 13/0404; H04N 13/0418; H04N 13/0468; H04N 13/0275; H04N 13/0409; G03B 35/04; G03B 35/18; G03B 37/00; G06F 3/0346; G06F 3/0421; G06F 3/04815; G06T 15/00; G09G 3/001
USPC ....... 359/464, 462, 465, FOR. 127, 618, 621, 359/622, 629, 802; 345/419; 348/51, 348/E13.075, E13.022, E13.03, E13.056
See application file for complete search history.

(56) References Cited

U.S. PATENT DOCUMENTS

| | | | | |
|---|---|---|---|---|
| 5,748,375 A | * | 5/1998 | Yamana | 359/622 |
| 2005/0122584 A1 | * | 6/2005 | Ishikawa et al. | 359/463 |
| 2007/0247519 A1 | * | 10/2007 | Riaziat et al. | 348/37 |
| 2008/0043014 A1 | * | 2/2008 | Tachi et al. | 345/419 |
| 2009/0052617 A1 | * | 2/2009 | Sadakane et al. | 378/38 |

\* cited by examiner

*Primary Examiner* — Sath V Perungavoor
*Assistant Examiner* — Dakshesh Parikh
(74) *Attorney, Agent, or Firm* — Wolf, Greenfield & Sacks, P.C.

(57) ABSTRACT

Embodiments of the invention provide an image display device comprising a rotating section having a plurality of light emitting elements. The rotating section rotates about a center and presents an image. A sensor detects an object, and a display controller controls presentation of the image based at least in part on detection of an object by the sensor.

26 Claims, 37 Drawing Sheets

EXAMPLE OF CONFIGURATION OF MULTI-DIRECTIONAL THREE-DIMENSIONAL IMAGE DISPLAY DEVICE 10 AS FIRST EMBODIMENT

EXAMPLE OF ASSEMBLY OF MULTI-DIRECTIONAL
THREE-DIMENSIONAL IMAGE DISPLAY DEVICE 10

EXAMPLE OF CALCULATING SHAPE OF LIGHT EMITTING SURFACE OF
TWO-DIMENSIONAL LIGHT EMITTING ELEMENT ARRAY 101 (FIRST EXAMPLE)

EXAMPLE OF CALCULATING SHAPE OF LIGHT EMITTING SURFACE OF TWO-DIMENSIONAL LIGHT EMITTING ELEMENT ARRAY 101 (SECOND EXAMPLE)

(L1=90, L2=10, r=30, $-33° \leqq \theta \leqq 33°$ )

EXAMPLE OF SHAPE OF TWO-DIMENSIONAL LIGHT
EMITTING ELEMENT ARRAY 101 (FIRST EXAMPLE)

EXAMPLE OF SHAPE OF TWO-DIMENSIONAL LIGHT EMITTING ELEMENT ARRAY 101 (SECOND EXAMPLE)

EXAMPLE OF SHAPE OF TWO-DIMENSIONAL LIGHT EMITTING ELEMENT ARRAY 101 (THIRD EXAMPLE)

EXAMPLE OF FUNCTION OF LENS MEMBER IN TWO-DIMENSIONAL LIGHT EMITTING ELEMENT ARRAY 101

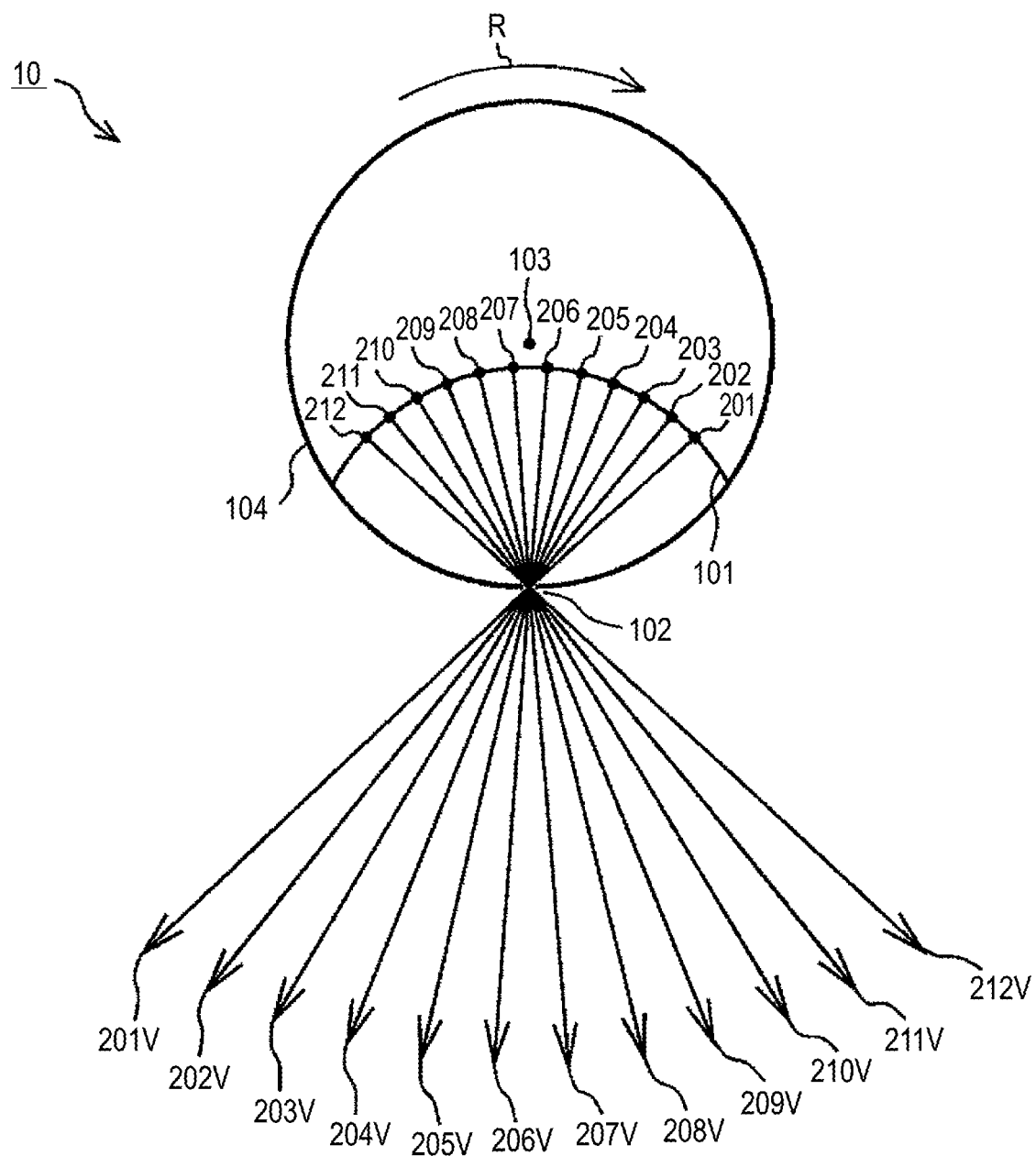

EXAMPLE OF LOCUS OF LIGHT EMITTING POINTS OBSERVED
FROM VIEWING POINT p (FIRST EXAMPLE)

EXAMPLE OF LOCUS OF LIGHT EMITTING POINTS OBSERVED
FROM VIEWING POINT p (SECOND EXAMPLE)

EXAMPLE OF LOCUS OF LIGHT EMITTING POINTS OBSERVED
FROM VIEWING POINT p (THIRD EXAMPLE)

SITUATION WHERE LIGHT BEAMS ARE OUTPUT THROUGH SLIT 102 (FIRST SITUATION)

t=0 t=T

SITUATION WHERE LIGHT BEAMS ARE OUTPUT THROUGH SLIT 102 (SECOND SITUATION)

t=2T t=3T

SITUATION WHERE LIGHT BEAMS ARE OUTPUT THROUGH SLIT 102 (THIRD SITUATION)

SITUATION WHERE LIGHT BEAMS ARE OUTPUT THROUGH SLIT 102 (FOURTH SITUATION)

t=0~59T

EXAMPLE OF CONVERSION OF IMAGED DATA INTO EMISSION LIGHT DATA

EXAMPLE OF CONFIGURATION OF CONTROL SYSTEM OF MULTI-DIRECTIONAL THREE-DIMENSIONAL IMAGE DISPLAY DEVICE 10

EXAMPLE OF CONFIGURATION OF ONE-DIMENSIONAL LIGHT EMITTING ELEMENT SUBSTRATE #1

EXAMPLE OF THREE-DIMENSIONAL IMAGE DISPLAY IN MULTI-DIRECTIONAL THREE-DIMENSIONAL IMAGE DISPLAY DEVICE 10

EXAMPLES OF CONFIGURATION AND OPERATION OF MULTI-DIRECTIONAL
THREE-DIMENSIONAL IMAGE DISPLAY DEVICE 20 AS SECOND EMBODIMENT

EXAMPLES OF CONFIGURATION AND OPERATION OF MULTI-DIRECTIONAL THREE-DIMENSIONAL IMAGE DISPLAY DEVICE 30 AS THIRD EMBODIMENT

EXAMPLES OF CONFIGURATION AND OPERATION OF MULTI-DIRECTIONAL
THREE-DIMENSIONAL IMAGE DISPLAY DEVICE 40 AS FOURTH EMBODIMENT

EXAMPLES OF CONFIGURATION AND OPERATION OF MULTI-DIRECTIONAL
THREE-DIMENSIONAL IMAGE DISPLAY DEVICE 50 AS FIFTH EMBODIMENT

EXAMPLES OF CONFIGURATION AND OPERATION OF MULTI-DIRECTIONAL
THREE-DIMENSIONAL IMAGE DISPLAY DEVICE 60 AS SIXTH EMBODIMENT

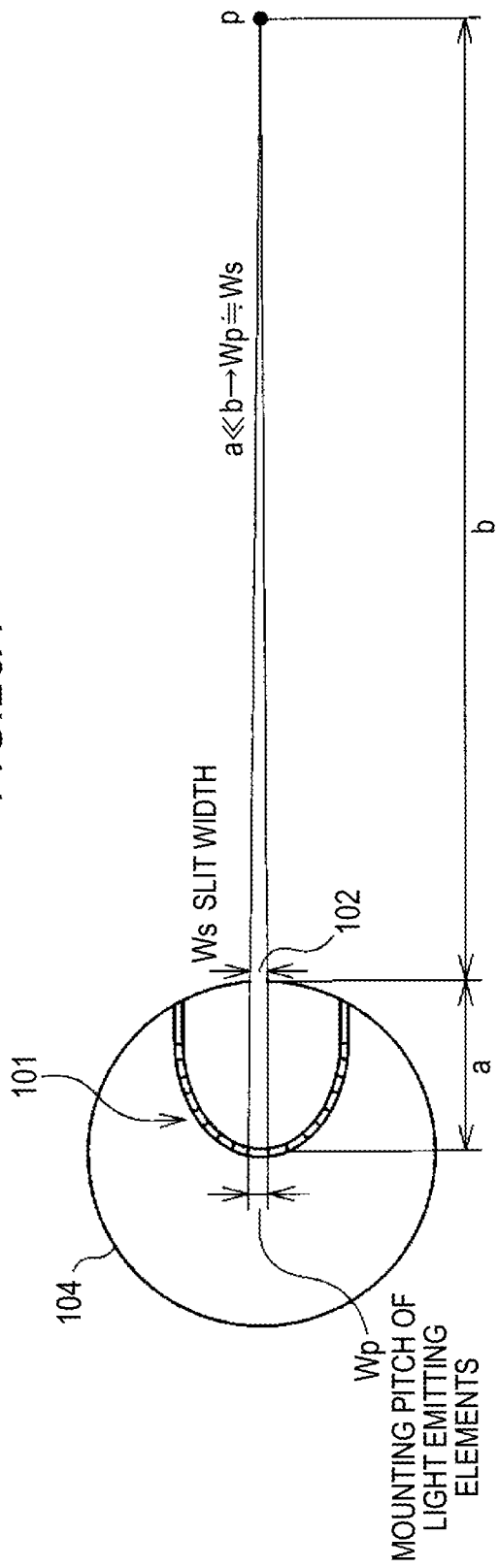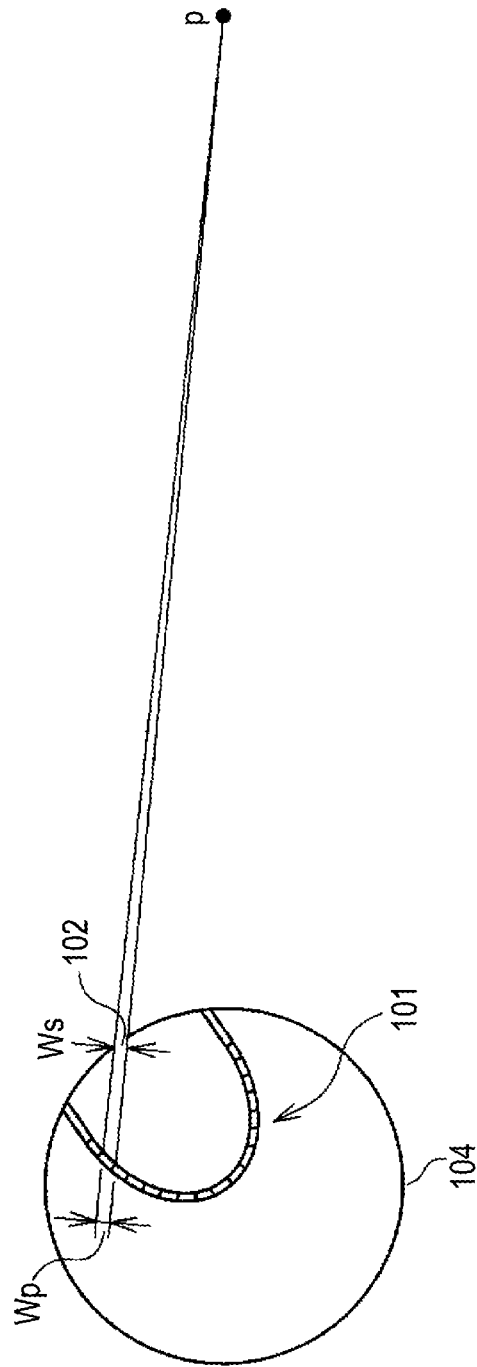

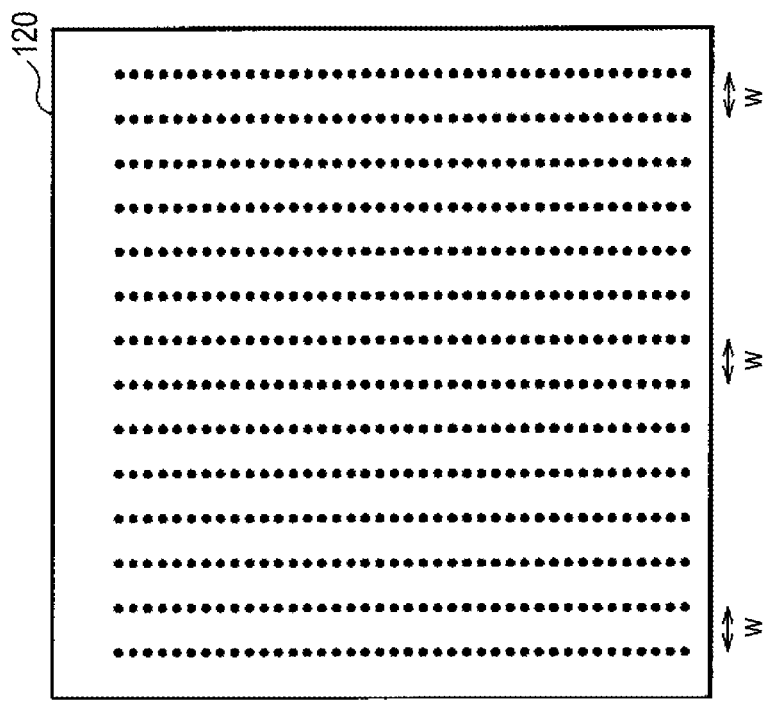
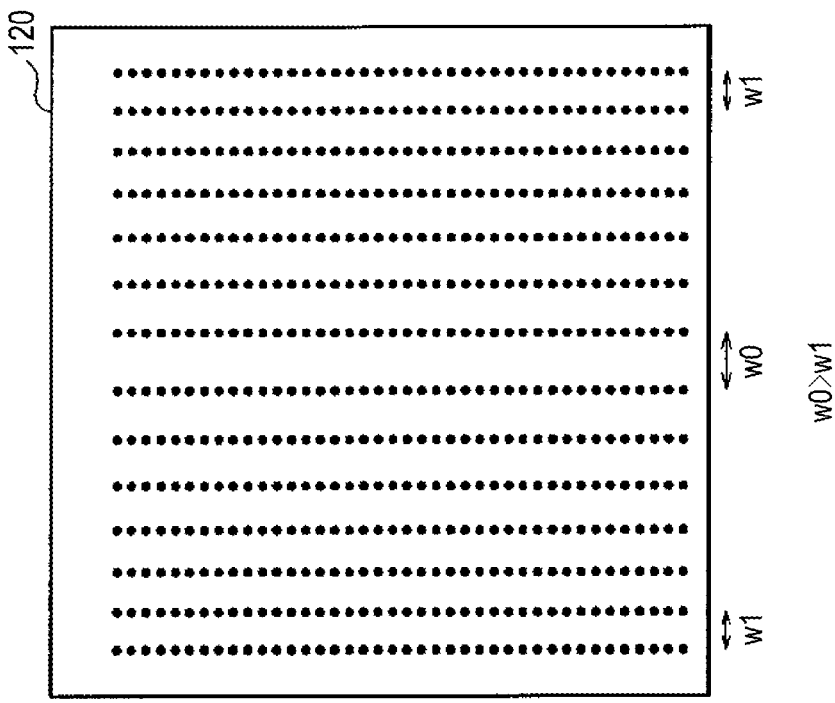

EXAMPLES OF WATCHING THREE-DIMENSIONAL IMAGE IN MULTI-DIRECTIONAL THREE-DIMENSIONAL IMAGE DISPLAY DEVICE 10 OR THE LIKE AS EACH EMBODIMENT

THREE-DIMENSIONAL IMAGE DISPLAY DEVICE, METHOD OF MANUFACTURING THE SAME, AND THREE-DIMENSIONAL IMAGE DISPLAY METHOD

BACKGROUND OF THE INVENTION

1. Field of the Invention

The present invention relates to a three-dimensional image display device capable of displaying a three-dimensional image over its entire periphery, a method of manufacturing the same, and a three-dimensional image display method.

2. Description of the Related Art

Various proposals have been made regarding a multi-directional three-dimensional image display device based on a light reproduction method which images a subject over its entire periphery or reproduces a three-dimensional image over the entire periphery of the subject on the basis of two-dimensional image information for three-dimensional image display and the like created by a computer. For example, a three-dimensional image display device which is observable from all directions is disclosed in "Three-dimensional image display device observable from all directions", URL:http://hhil.hitachi.co.jp/products/transpost.html. This three-dimensional image display device includes a viewing angle restricted screen, a rotation mechanism, an upper mirror, a lower mirror group, a projector, and a personal computer, and displays a three-dimensional image using binocular parallax. The personal computer controls the projector and the rotation mechanism.

The projector projects an image for three-dimensional image display onto the upper mirror. The image for three-dimensional image display projected onto the upper mirror is reflected by the lower mirror group and is then projected onto the viewing angle restricted screen. The viewing angle restricted screen rotates at high speed by the rotation mechanism. If the three-dimensional image display device is configured as described above, a three-dimensional image can be viewed from any angle of 360° because the background is transparent.

A 3D video display which is observable from all directions is disclosed in "Cylindrical 3D Video Display Observable from All Directions", URL:http://www.yendo.org/seelinder/. This 3D video display includes a cylindrical rotary body for three-dimensional image display and a motor. A plurality of vertical lines which allow light to be transmitted therethrough are provided on the peripheral surface of the rotary body. A timing controller, a ROM, an LED array, an LED driver, and an address counter are provided in the rotary body. The timing controller is connected to the address counter, the ROM, and the LED driver and controls outputs thereof. The image data for three-dimensional image display is stored in the ROM. On the other hand, a slip ring is provided at the rotary shaft of the rotary body. Electric power is supplied to components in the rotary body through the slip ring.

The address counter generates an address on the basis of a set/reset signal from the timing controller. The ROM is connected to the address counter. The ROM receives a read control signal from the timing controller and an address from the address counter, reads the image data for three-dimensional image display, and outputs it to the LED driver. The LED driver receives the image data from the ROM and the emission control signal from the timing controller and drives the LED array. The LED array emits light by control of the LED driver. The motor rotates the rotary body. If the 3D video display is configured as described above, a three-dimensional image can be displayed over the range of the entire periphery of 360°. Accordingly, a three-dimensional image can be observed without wearing the glasses for binocular parallax.

In relation to this kind of multi-directional three-dimensional image display device, JP-A-2004-177709 (page 8, FIG. 7) discloses a three-dimensional image display device. This three-dimensional image display device includes a light allocation means and a cylindrical two-dimensional pattern display means. The light allocation means is provided on the front or back surface of a display screen which has a convex curved shape when seen by a viewer. The light allocation means has a curved surface on which a plurality of openings are formed or lenses are formed in the array shape, so that light beams from a plurality of pixels on the display screen are allocated to the openings or the lenses. The two-dimensional pattern display means displays a two-dimensional pattern on the display screen.

If the three-dimensional image display device is configured as described above, it is possible to efficiently execute image mapping of a three-dimensional image which makes full-motion moving image display easy. Accordingly, even if the viewing position is changed, a three-dimensional image can be displayed with high resolution without having an adverse effect on the three-dimensional image.

Moreover, JP-A-2005-114771 (page 8, FIG. 3) discloses a light reproduction type display device. This display device includes one light emitting unit and a cylindrical screen. The light emitting unit has a structure capable of rotating around the rotary shaft. The screen is disposed around the light emitting unit and forms a part of a rotary body which is axisymmetric with respect to the rotary shaft. A plurality of light emitting sections are arrayed on a side of the light emitting unit facing the screen. Two or more different directions are emission directions of light beams of the light emitting sections, and the emission angle of light is restricted to a predetermined range.

The light emitting unit rotates around the rotary shaft for rotation scanning of the light emitting sections and the amount of emitted light of the light emitting section is modulated according to the given information so that an image is displayed on a screen. If the display device is configured as described above, a three-dimensional image can be displayed over the range of the entire periphery of 360°. Accordingly, many people can observe the three-dimensional image without wearing the glasses for binocular parallax.

Moreover, JP-T-2002-503831 discloses a display device which presents the same image to all viewers, who are present around the device, by displaying an image in a curved state within a cylindrical device while rotating the entire device.

JP-A-10-97013 discloses a three-dimensional display device which performs three-dimensional display by making a display unit, which irradiates light with a unit angle of predetermined parallax, among a plurality of display units corresponding to the parallax number emitting light to a viewer while rotating it.

SUMMARY OF THE INVENTION

In the three-dimensional image display devices based on the methods in the related art, however, there are the following problems.

In the three-dimensional image display device disclosed in "Three-dimensional image display device observable from all directions", URL:http://hhil.hitachi.co.jp/products/transpost.html, the viewing angle restricted screen, the rotation mechanism, the upper mirror, the lower mirror group, the projector, and the personal computer should be prepared. Accordingly, since the system size increases, control becomes complicated.

According to the 3D video display disclosed in "Cylindrical 3D Video Display Observable from All Directions", URL: http://www.yendo.org/seelinder/, a three-dimensional image is displayed using light transmitted from the plurality of vertical lines provided on the peripheral surface of the rotary body. Accordingly, since the light use efficiency becomes worse, there is a possibility that the energy loss will increase.

The three-dimensional image display device disclosed in JP-A-2004-177709 (page 8, FIG. 7) includes the light allocation means which is provided on the front or back surface of the display screen, which has a convex curved shape when seen by a viewer, and which has a curved surface on which a plurality of openings are formed lenses which are formed in the array shape. Since light beams from the plurality of pixels on the display screen are allocated to the openings or the lenses, there is a problem in that the practical quality of the image is not obtained.

According to the light reproduction type display device disclosed in JP-A-2005-114771 (page 8, FIG. 3), the light emitting unit rotates around the rotary shaft for rotation scanning of the light emitting sections and the amount of emitted light of the light emitting section is modulated according to the given information so that an image is displayed on the fixed screen. For this reason, there is a problem in that the practical quality of an image is not obtained like the three-dimensional image display device disclosed in JP-A-2004-177709 (page 8, FIG. 7).

Moreover, the display device disclosed in JP-T-2002-503831 is made to present the same image to all viewers therearound. Accordingly, it is difficult to perform three-dimensional display in order to display an image with parallax corresponding to the viewing position.

JP-A-10-97013 discloses the three-dimensional display device capable of displaying an image with parallax corresponding to the viewing position around the cylindrical device. However, since there is no description regarding which state an image is displayed in when observed from any viewing position around the device, it is difficult to realize.

In view of the above, it is desirable to provide a three-dimensional image display device which makes it possible to observe a three-dimensional image from its entire periphery with good reproducibility without complicating a three-dimensional display mechanism compared with systems in the related art, a method of manufacturing the same, and a three-dimensional image display method.

An embodiment of the present invention provides a three-dimensional image display device, comprising: a rotating section operable to rotate about a rotation center, the rotating section having an external body comprising a slit; a plurality of light emitting elements disposed within the external body, each one of the plurality of light emitting elements being operable to emit light through the slit to a viewing position as the rotating section rotates about the rotation center; and a display controller controlling emission of light by each one of the plurality of light emitting elements on a basis of image data.

Another embodiment of the present invention provides an image display device, comprising: a rotating section having a plurality of light emitting elements, the rotating section being operable to rotate about a center and to present an image; a sensor to detect an object; and a display controller to control presentation of the image on the surface based at least in part on detection of an object by the sensor.

Another embodiment of the invention provides a method for displaying an image, comprising: causing a rotating section having a plurality of light emitting elements to rotate about a center and to present an image; causing an object to be detected; and controlling presentation of the image based at least in part on detection of the object by the sensor.

Another embodiment of the invention provides a computer-readable storage medium having instructions encoded thereon which, when executed, perform a method of displaying an image, the method comprising: causing a rotating section having a plurality of light emitting elements to rotate about a center and to present an image; causing an object to be detected; and controlling presentation of the image based at least in part on detection of the object by the sensor.

Another embodiment of the invention provides a method of displaying an image, comprising: causing a rotating section having a surface to present an image; causing a sensor to rotate about a center and to detect an object at any of a plurality of points along the surface; and controlling presentation of the image on the surface based at least in part on an object detected by the sensor.

Another embodiment of the invention provides a computer-readable storage medium having instructions encoded thereon which, when executed, perform a method of displaying an image, the method comprising: causing a rotating section having a surface to present an image; causing a sensor to rotate about a center and to detect an object at any of a plurality of points along the surface; and controlling presentation of the image on the surface based at least in part on an object detected by the sensor.

According to the three-dimensional image display device according to the embodiment of the present invention or in the three-dimensional image display method according to the embodiment of the present invention, the plurality of light emitting elements emit light corresponding to the direction of the light emitting surface to the outside of the rotating section through the slit using the light emitting element array which has the light emitting surface formed at a recessed surface side of the curved portion. Therefore, it is possible to observe a three-dimensional image from its entire periphery with good reproducibility without complicating a three-dimensional display mechanism compared with systems in the related art.

In particular, since the three-dimensional image display device according to the embodiment of the present invention includes a plurality of light emitting element arrays and a plurality of slits, three-dimensional color image display can be realized by making the plurality of light emitting element arrays emit light beams with different wavelengths, for example.

According to the method of manufacturing a three-dimensional image display device according to the embodiment of the present invention, a three-dimensional image display device is manufactured by a simple configuration in which the light emitting element array is attached within the cylindrical rotating section. Therefore, it is possible to easily manufacture the three-dimensional image display device which makes it possible to observe a three-dimensional image from its entire periphery with good reproducibility without complicating a three-dimensional display mechanism compared with systems in the related art.

BRIEF DESCRIPTION OF THE DRAWINGS

FIG. 9 is a schematic diagram showing an example of the operation of the multi-directional three-dimensional image display device when viewed from the rotary shaft direction;

FIGS. 26A and 26B are explanatory views regarding the optimal width of a slit;

FIGS. 27A and 27B are explanatory views showing examples of the pixel arrangement on the display screen observed from any viewing point in the entire-periphery three-dimensional image display device;

DESCRIPTION OF THE PREFERRED EMBODIMENTS

Figure 1:
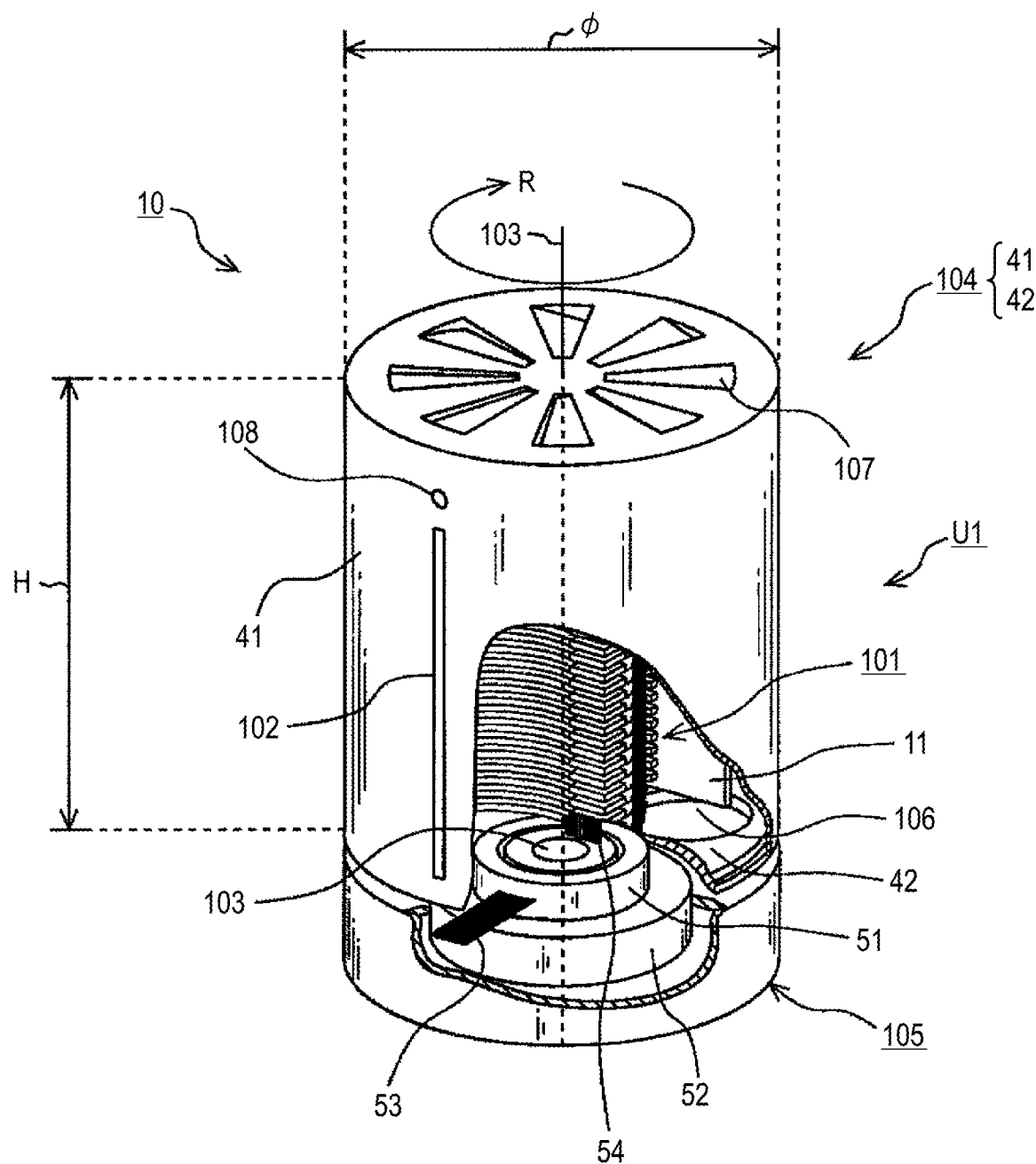
FIG. 1 is a partially broken perspective view showing an example of the configuration of a multi-directional three-dimensional image display device according to a first embodiment of the present invention.

Hereinafter, best modes for implementing the present invention (hereinafter, simply referred to as embodiments) will be described in detail with reference to the accompanying drawings. In addition, the explanation will be given in the following order.

1. First embodiment (multi-directional three-dimensional image display device 10: example of configuration, example of assembly, example of shape calculation, example of formation, principle of operation, example of locus, conditions, example of data generation, example of three-dimensional image display)
2. Second embodiment (multi-directional three-dimensional image display device 20: example of configuration and example of operation)
3. Third embodiment (multi-directional three-dimensional image display device 30: example of configuration and example of operation)
4. Fourth embodiment (multi-directional three-dimensional image display device 40: example of configuration and example of operation)
5. Fifth embodiment (multi-directional three-dimensional image display device 50: example of configuration and example of operation)
6. Sixth embodiment (multi-directional three-dimensional image display device 60: example of configuration and example of operation)
7. Seventh embodiment (optimization of slit width)
8. Eighth embodiment (optimization of emission timing)
9. Ninth embodiment (example of watching a three-dimensional image using a display device according to each of the first to eighth embodiments)
10. Tenth embodiment (multi-directional three-dimensional image display device 70: example of configuration and example of operation)

First Embodiment

[Example of the Configuration of a Multi-Directional Three-Dimensional Image Display Device 10]

FIG. 1 is a partially sectional perspective view showing an example of the configuration of a multi-directional three-dimensional image display device 10 as a first embodiment. The multi-directional three-dimensional image display device 10 shown in FIG. 1 is an example of a light reproduction type three-dimensional image display device and includes a two-dimensional light emitting element array 101, a rotating section 104 with a slit, and an installation frame 105 with a driving mechanism. The multi-directional three-dimensional image display device 10 images a subject over its entire periphery or reproduces a three-dimensional image over the entire periphery of the subject on the basis of two-dimensional image information for three-dimensional image display (hereinafter, simply referred to as only image data Din) and the like created by a computer.

The rotating section 104 is configured to include an external body 41 with a slit and a turntable 42 with an intake port. The external body 41 is attached on the turntable 42. The turntable 42 has a disk shape, and a rotary shaft 103 is provided at the center of the turntable 42. The rotary shaft 103 serves as a rotation center of the turntable 42 and also serves as a rotation center of the external body 41. Hereinafter, the rotary shaft 103 is called the rotary shaft 103 of the rotating section 104. An intake port 106 is provided at the predetermined position of the turntable 42, so that air flows into the external body 41.

One or more two-dimensional light emitting element arrays 101 with a predetermined shape are provided in the external body 41 on the turntable 42. In the two-dimensional light emitting element array 101, for example, "m (rows)×n (columns)" light emitting elements are arrayed in a matrix. Self-emission elements, such as a light emitting diode, a laser diode, and an organic EL element, are used. The two-dimensional light emitting element array 101 is configured such that a plurality of light emitting elements emit light according to the rotation of the rotating section 104 and the light emission is controlled on the basis of the image data Din for a three-dimensional image. This emission control is performed by a display controller 15 (FIG. 18) to be described later.

In addition, the light emitting element is not limited to the self-emission element, and may be a light emitting device obtained by combining a light source with a modulation element. Any kind of light emitting element or light emitting device may be used as long as it can follow the modulation rate of the rotating section 104 at the time of rotation scanning through a slit for a viewing point p (refer to FIG. 3). Not only the light emitting element but also a driving circuit (driver) for driving the light emitting element is mounted in the two-dimensional light emitting element array 101.

For example, the two-dimensional light emitting element array 101 has a laminated structure in which a plurality of one-dimensional light emitting element substrates #1 (refer to FIGS. 5 to 7), each of which includes a plurality of light emitting elements linearly arrayed (mounted), are laminated along the rotary shaft 103 on a small opening surface formed by cutting a printed circuit board into a curved shape (for example, in an arc shape). In this way, the two-dimensional light emitting element array 101 having a light emitting surface with a curved shape (for example, an arc shape) can be easily formed.

The external body 41 attached on the turntable 42 so as to cover the two-dimensional light emitting element array 101 is formed in a cylindrical shape with a predetermined aperture φ and a predetermined height H. The aperture φ of the external body 41 is about 100 mm to 200 mm, and the height H is about 400 mm to 500 mm. A slit 102 is provided at a predetermined position of the peripheral surface of the external body 41. The slit 102 is provided so as to be punctured in a direction parallel to the rotary shaft 103 on the peripheral surface of the external body 41 and is fixed ahead of the light emitting surface of the two-dimensional light emitting element array 101. The slit 102 restricts the emission angle of light to a predetermined range.

Undoubtedly, the slit 102 may be a window, which is formed by a transparent member through which light is transmitted, without being limited to the punctured portion. In this example, the slit 102 of the peripheral surface of the external body 41 and the two-dimensional light emitting element array 101, which is located further inside the slit 102, form a light emitting unit Ui (i=1, 2, 3, . . . ) in units of a set.

The two-dimensional light emitting element array 101 has a portion with a curved shape, and a recessed surface side of the curved shape is a light emitting surface. In addition, the curved light emitting surface is disposed between the rotary shaft 103 of the rotating section 104 and the slit 102 so as to face the slit 102. In this way, it becomes easy to guide (condense) the light, which is emitted from the curved light emitting surface, to the slit 102 compared with a flat light emitting surface. A cylindrical body formed by performing press working, roll machining, and the like of an iron sheet or an aluminum plate is used as the external body 41. Preferably, inside and outside portions of the external body 41 are coated with a black color so that light is absorbed. In addition, a hole located above the slit 102 of the external body 41 is a hole 108 for a sensor.

A top plate portion of the external body 41 has a fan structure so that the air flowing from the intake port 106 of the turntable 42 is exhausted to the outside. For example, some fan sections 107 (exhaust ports) such as blades, which are one example of cooling blade members, are provided at the top plate portion (upper portion) of the external body 41, the flow of the air is made using the rotation operation, and the heat generated from the two-dimensional light emitting element array 101 or its driving circuit is forced to be exhausted to the outside. The fan section 107 may be formed by cutting the upper portion of the external body 41. In this case, the top plate portion also serves as the fan section 107. If the top plate portion also serves as the fan section 107, the external body 41 becomes strong.

The location of the fan section 107 is not limited to the upper portion of the rotary shaft 103 of the rotating section 104, and the fan section 107 may be attached near the rotary shaft 103 at a lower portion of the external body 41. Although based on the direction of a blade of a blade member, the flow of the air from the upper portion of the rotating section 104 toward the lower portion or the flow of the air from the lower portion of the rotating section 104 toward the upper portion can be made when the rotating section 104 rotates. In any case, it is preferable to provide an intake port or an exhaust port above or below the rotating section 104.

Thus, since a blade member is attached to the rotary shaft 103, the flow of the air can be made using the rotation operation of the rotating section 104. Accordingly, the heat generated from the two-dimensional light emitting element array 101 can be exhausted to the outside without newly adding a fan motor and the like. As a result, since a fan motor is not necessary, manufacturing costs of the multi-directional three-dimensional image display device 10 can be reduced.

The installation frame 105 is a section which supports the turntable 42 rotatably. A shaft receiving section (not shown) is provided above the installation frame 105. The shaft receiving section is engaged with the rotary shaft 103 so that the rotary shaft 103 can rotate freely and also supports the rotating section 104. A motor 52 is provided inside the installation frame 105 in order to rotate the turntable 42 at a predetermined rotation (modulation) speed. For example, a direct connection type AC motor is engaged with a lower end of the rotary shaft 103. The motor 52 transmits the torque directly to the rotary shaft 103, and the rotary shaft 103 rotates. As a result, the rotating section 104 rotates at the predetermined modulation rate.

The motor 52 corresponds to one specific example of a "driving section" in one embodiment of the present invention.

In this example, when supplying electric power or the image data Din to the rotating section 104, a method of supplying it through a slip ring 51 is adopted. According to this method, the slip ring 51 which supplies the electric power and the image data Din to the rotary shaft 103 is provided. The slip ring 51 is divided into a fixed side component and a rotary side component. The rotary side component is attached to the rotary shaft 103. A harness 53 (wiring cable) is connected to the fixed side component.

The two-dimensional light emitting element array 101 is connected to the rotary side component through another harness 54. Between the fixed side component and the rotary side component, a structure is adopted in which a sliding member (not shown) is electrically connected to an annular body. The sliding member forms the fixed side component or the rotary side component, and the annular body forms the rotary side component or the fixed side component. Through this structure, in the installation frame 105, electric power or the image data Din supplied from the outside can be transmitted to the two-dimensional light emitting element array 101 through the slip ring 51.

[Example of Assembly of the Multi-Directional Three-Dimensional Image Display Device 10]

Figure 2:
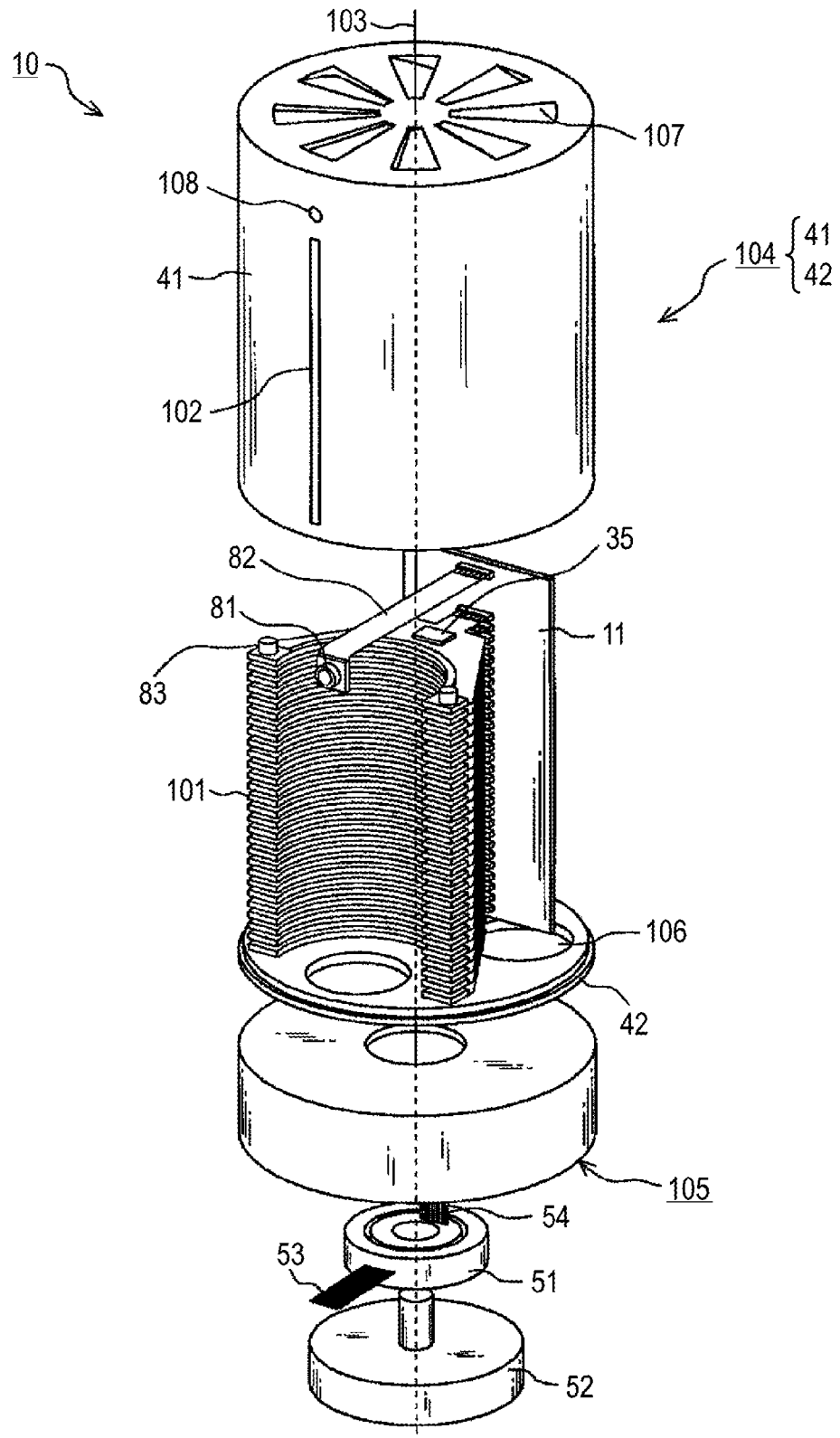
FIG. 2 is an exploded perspective view showing an example of assembly of the multi-directional three-dimensional image display device.

Subsequently, an assembly method of the multi-directional three-dimensional image display device 10 and a manufacturing method of each member will be described with reference to FIGS. 2 to 8. FIG. 2 is an exploded perspective view showing an example of assembly of the multi-directional three-dimensional image display device 10. According to the assembly method of the multi-directional three-dimensional image display device 10, first, the external body 41 with a slit and the turntable 42 with an intake port shown in FIG. 2 are prepared to form the rotating section 104. The cylindrical external body 41 with a predetermined aperture and a predetermined length is formed, for example, by cutting a cylindrical material with a predetermined aperture to have a predetermined length. In this example, a cylindrical body formed by an iron plate or an aluminum plate is used as the external body 41.

Then, the slit 102 and the hole 108 for a sensor are formed at predetermined positions of the peripheral surface of the external body 41. In this example, the slit 102 is punctured in a direction parallel to the rotary shaft 103 on the peripheral surface of the cylindrical material. The hole 108 is punctured above the slit 102. The external body 41 is used in a state attached on the turntable 42. Inside and outside portions of the external body 41 may be coated with a black color so that light is absorbed.

Then, the turntable 42 is formed using a disk-shaped metal material with a predetermined thickness. The rotary shaft 103 is formed at the center of the turntable 42. The rotary shaft 103 serves as a rotation center of the turntable 42 and also serves as a rotation center of the external body 41. In this example, a pair of rod-shaped members for positioning (not shown; hereinafter, referred to as a positioning pin 83) are formed so as to protrude onto the turntable 42. The positioning pin 83 is used when laminating the one-dimensional light emitting element substrate #1 or the like.

In addition, the slip ring 51 is provided at the rotary shaft 103, and the harness 54 is pulled out from the rotary side component. The intake port 106 is formed at the predetermined position of the turntable 42. The intake port 106 is an air intake when the air flows into the external body 41. The turntable 42 is also coated with a black color so as to absorb light.

Figure 3:
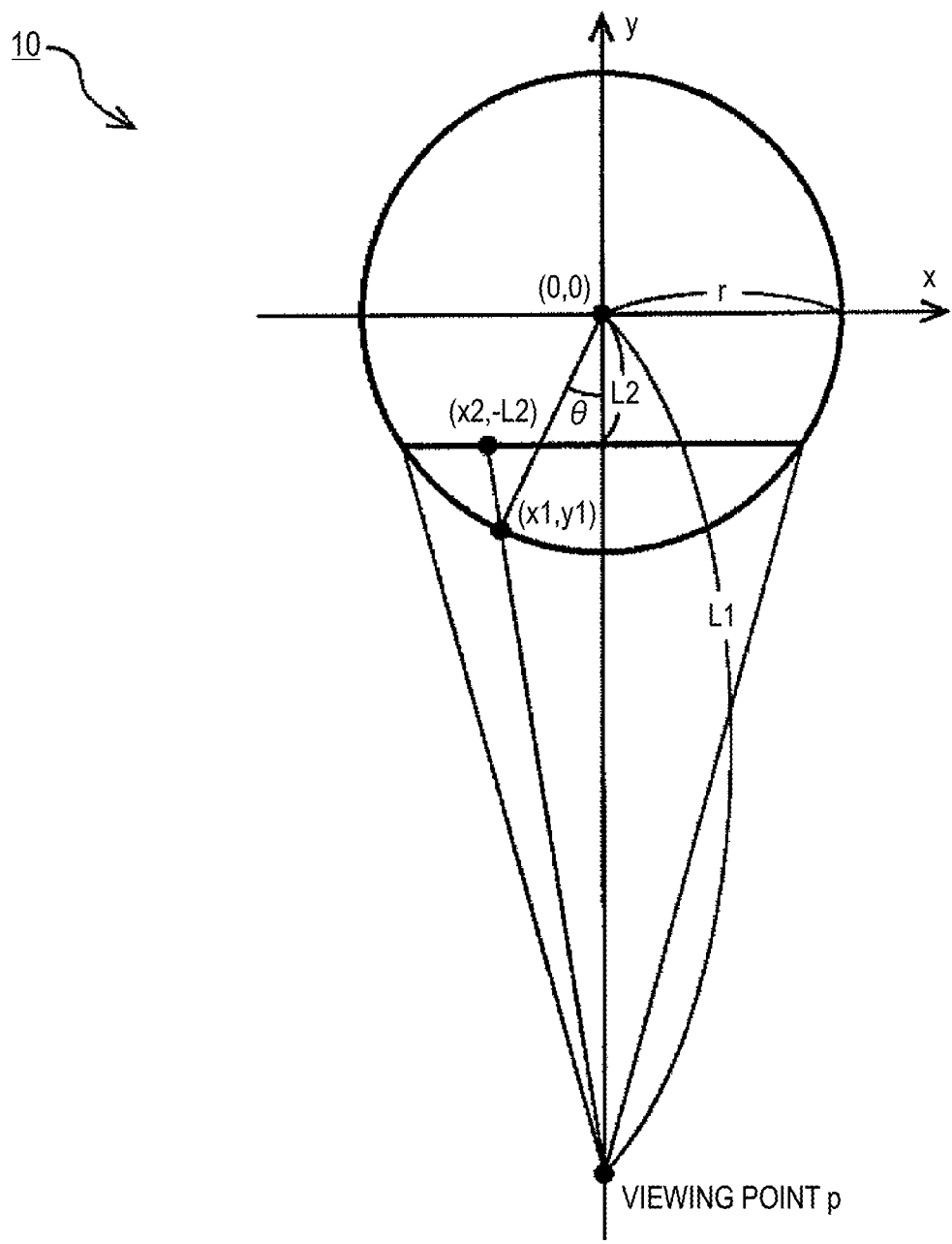
FIG. 3 is an explanatory view showing an example (first example) of calculating the shape of a light emitting surface of a two-dimensional light emitting element array.

On the other hand, the two-dimensional light emitting element array 101 with a predetermined shape for forming a three-dimensional image is formed. In this example, the two-dimensional light emitting element array 101 is formed such that a curved light emitting surface is formed. FIG. 3 is an explanatory view showing an example (first example) of calculating the shape of the light emitting surface of the two-dimensional light emitting element array 101.

In this example, the shape of the light emitting surface of the two-dimensional light emitting element array 101 is a curve drawn by the point $(x(\theta), y(\theta))$, which is expressed by the following expression, on the x-y coordinate plane (plane perpendicular to the rotary shaft 103) shown in FIG. 3. When forming the two-dimensional light emitting element array 101, the distance of a line segment from the rotary shaft 103 of the rotating section 104 to any viewing point p is set to L1. A shortest distance from the rotary shaft 104 to the two-dimensional light emitting element array 101 is set to L2. Moreover, in the multi-directional three-dimensional image display device 10, image display is performed such that the locus of light emitting points made by the two-dimensional light emitting element array 101, that is, the observed image display surface becomes, for example, a flat surface when observing the device from any viewing point p. In this case, L2 is equal to the distance from the rotary shaft 103 to a plane formed by the locus of light emitting points made by a plurality of light emitting elements.

In addition, the distance of a line segment from the rotary shaft 103 of the rotating section 104 to the slit 102 is set to r, and the angle between the line segment with the distance L1 and the line segment with the distance r, which is an angle indicating the position of the slit 102 with respect to the line segment with the distance L1, is set to θ. In addition, the x-axis coordinate value which forms the curved shape of the light emitting surface of the two-dimensional light emitting element array 101 is set to x(θ), and the y-axis coordinate value which forms the curved shape of the light emitting surface of the two-dimensional light emitting element array 101 is set to y(θ). That is, the x-axis coordinate value x(θ) is expressed by expression (1).

$$x(\theta) = r(L2-L1)\sin\theta\cos\theta/(L1-r\cos\theta) + L2\sin\theta \quad (1)$$

The y-axis coordinate value y(θ) is expressed by expression (2).

$$y(\theta) = r(L2-L1)\sin^2\theta/(L1-r\cos\theta) - L2\cos\theta \quad (2)$$

The x-axis coordinate value x(θ) and the y-axis coordinate value y(θ) determine the shape of the light emitting surface of the two-dimensional light emitting element array 101. In FIG. 3, (x1, y1) are the coordinates of the slit 102. (x2, −L2) are the coordinates of a light emitting point which is actually observed through the slit 102 from the viewing point p.

Thus, the locus of light emitting points observed through the slit 102 from the viewing point p can determine the shape of the light emitting surface of the two-dimensional light emitting element array 101 which is viewed as a flat surface. If the shape of the light emitting surface is determined, it is preferable to form the printed circuit board in a curved shape by cutting.

Figure 4:
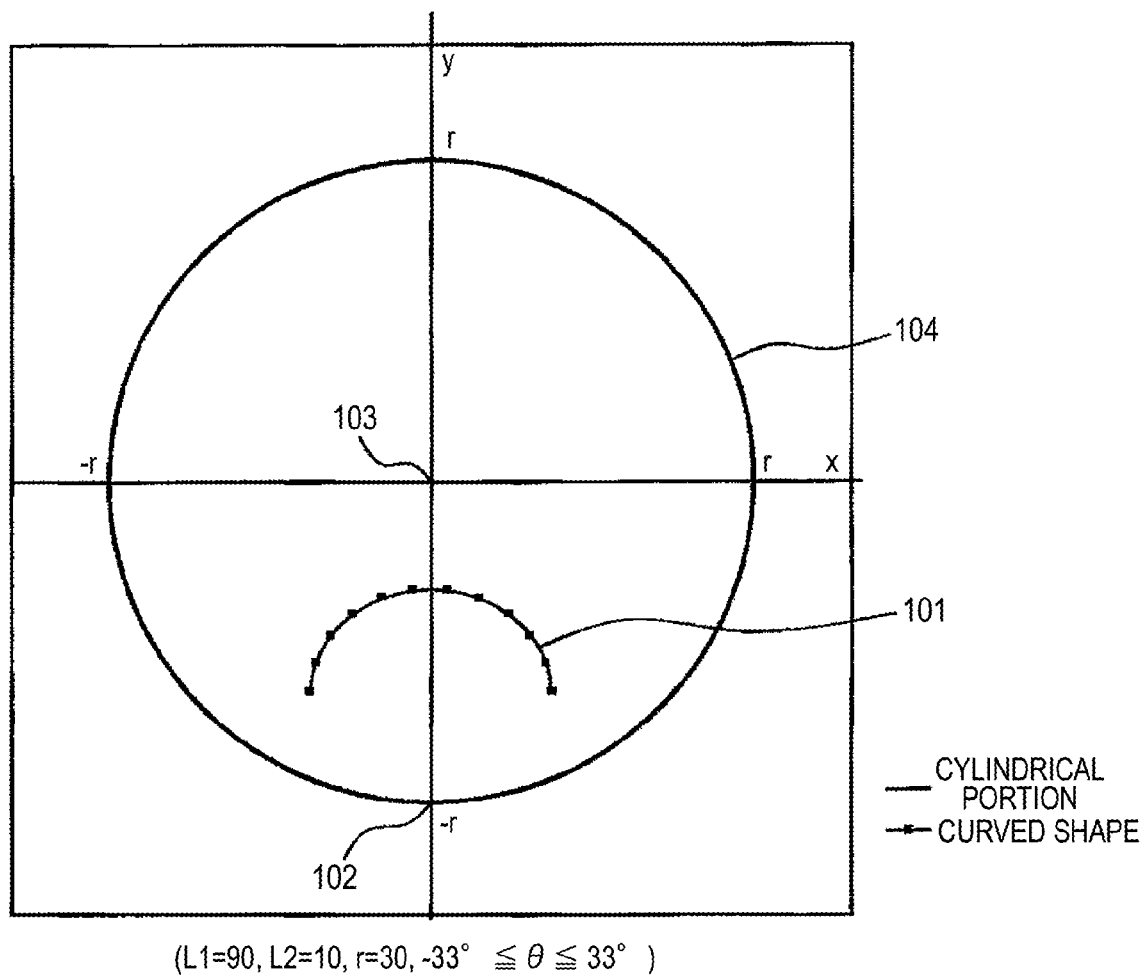
FIG. 4 is an explanatory view showing an example (second example) of calculating the shape of the light emitting surface of the two-dimensional light emitting element array.

FIG. 4 is an explanatory view showing an example of calculating the shape of the light emitting surface of the two-dimensional light emitting element array 101 obtained by the above-described expressions (1) and (2). According to the calculation example of the light emitting surface shape shown in FIG. 4, the distance L1 of a line segment from the rotary shaft 103 of the rotating section 104 shown in FIG. 3 to any viewing point p is 90 mm. The distance L2 from the rotary shaft 103 of the rotating section 104 to a virtual straight line is 10 mm. The distance r of a line segment from the rotary shaft 103 of the rotating section 104 to the slit 102 is 30 mm. The case is shown in which an angle θ, which is an angle between the line segment with the distance L1 and the line segment with the distance r and which indicates the position of the slit 102 with respect to the line segment with the distance L1, is shown −33°≤θ≤33°.

Figure 5:
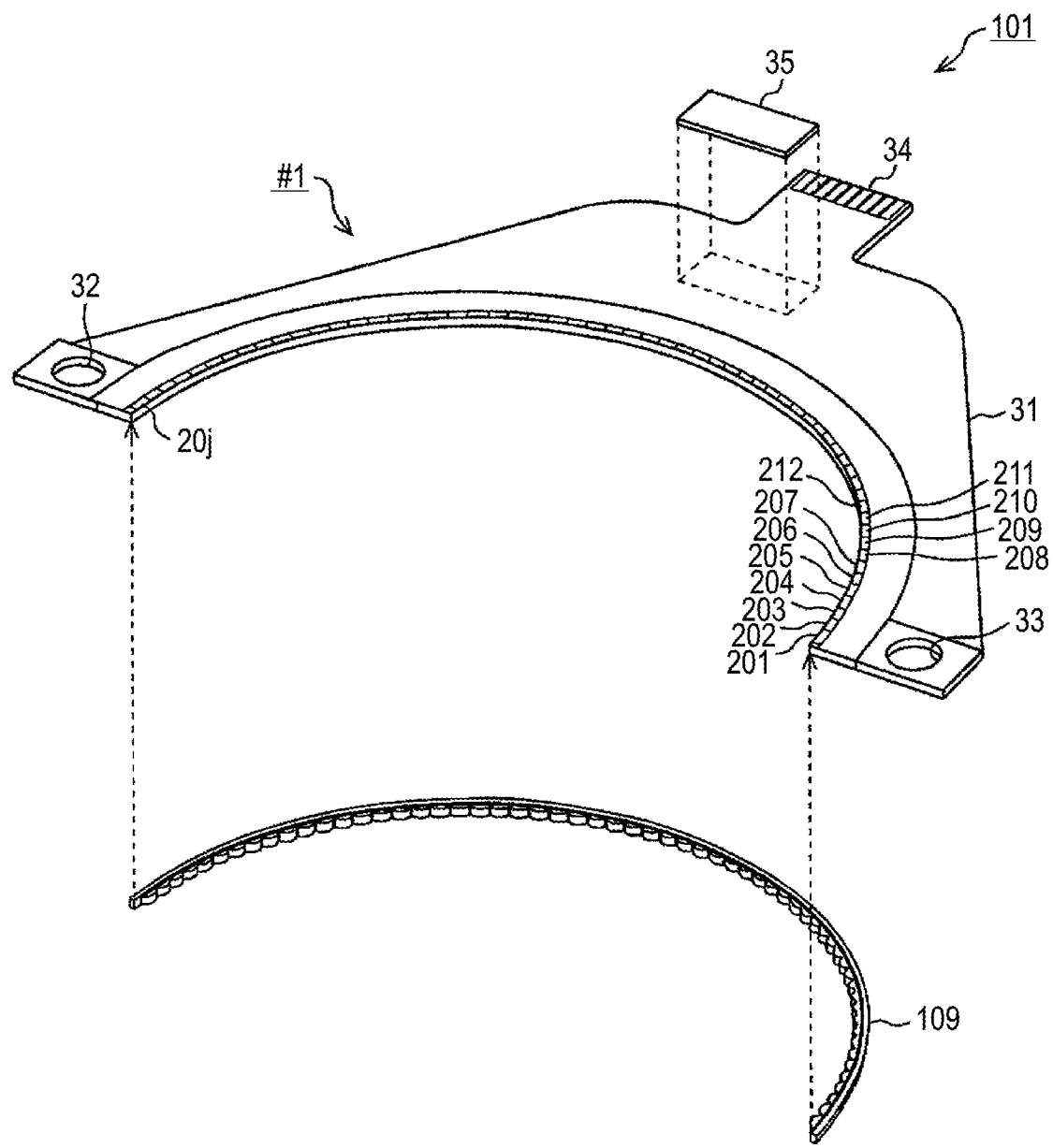
FIG. 5 is a perspective view showing an example (first example) of the shape of the two-dimensional light emitting element array.
Figure 6:
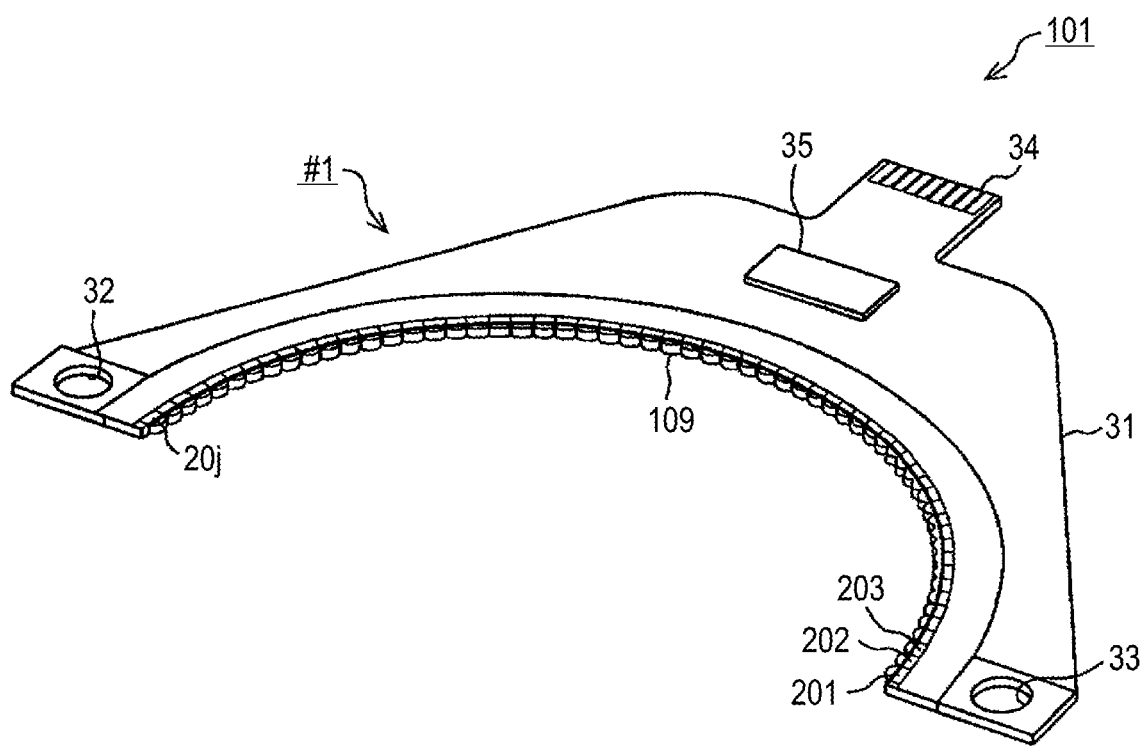
FIG. 6 is a perspective view showing an example (second example) of the shape of the two-dimensional light emitting element array.
Figure 7:
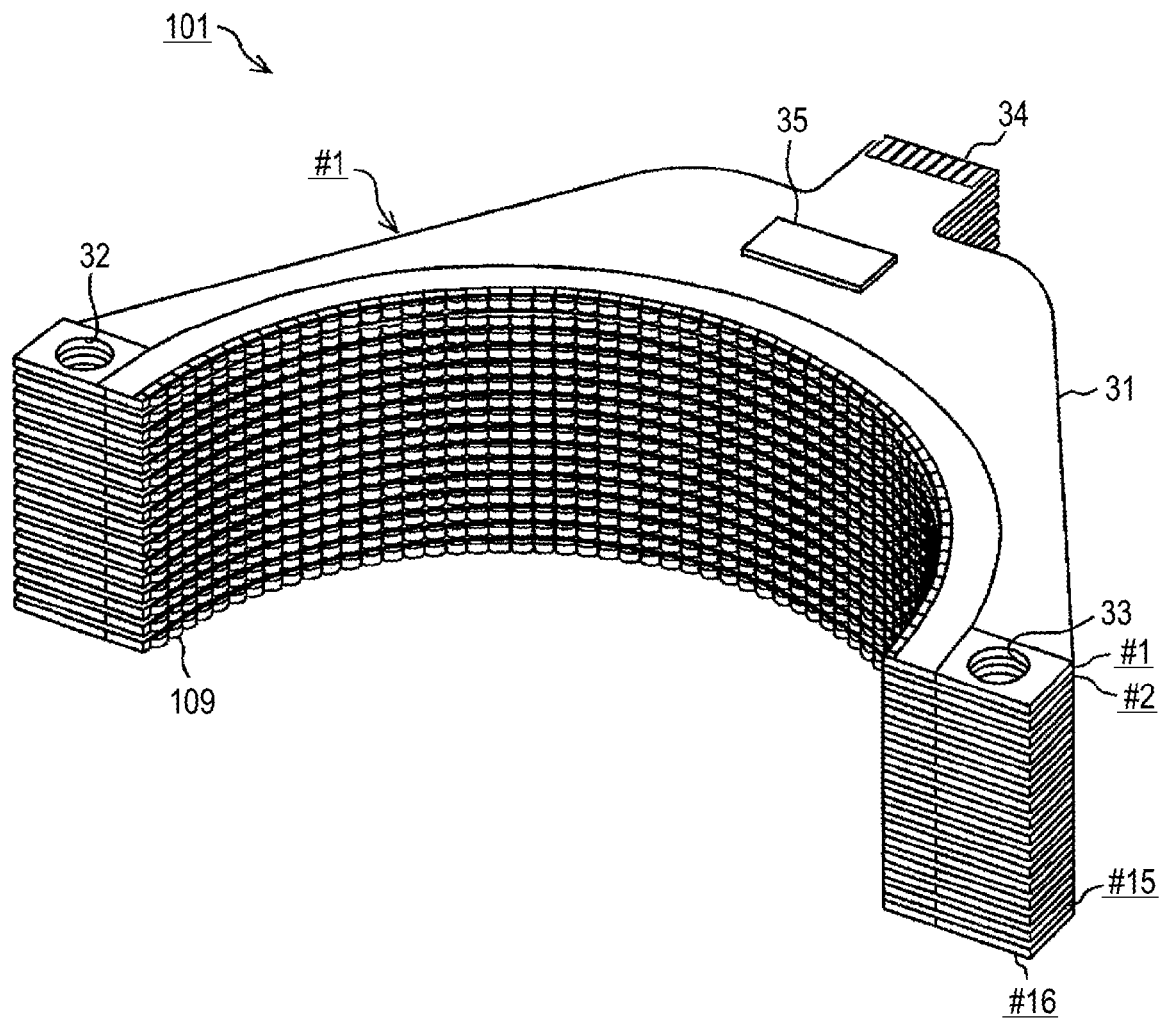
FIG. 7 is a perspective view showing an example (third example) of the shape of the two-dimensional light emitting element array.

FIGS. 5 to 7 are perspective views showing examples (first to third examples) of forming the two-dimensional light emitting element array 101. FIG. 5 is an exploded perspective view showing an example of forming the one-dimensional light emitting element substrate #1. In this example, when forming the two-dimensional light emitting element array 101, the one-dimensional light emitting element substrate #1 is formed first. The one-dimensional light emitting element substrate #1 is obtained by forming a wiring pattern by patterning a copper foil substrate (not shown), cutting the external appearance of a printed circuit board 31 formed with the wiring pattern into a Y shape, and cutting the inside into a curved shape (for example, in an arc shape) on the basis of the above-described expressions (1) and (2). In this example, a connector 34 with a wiring structure is formed at the opposite side of the curved portion.

In addition, positioning holes 32 and 33 are formed at both sides of the printed circuit board 31 of the one-dimensional light emitting element substrate #k. An IC 35 (semiconductor integrated circuit) for serial-to-parallel conversion and driver is mounted on the printed circuit board 31 which is cut such that the external appearance has a Y shape and the inside has a curved shape. Then, light emitting elements 20j are linearly arrayed in "j" rows on the edge or small opening surface of the printed circuit board 31 where the IC 35 is mounted. In addition, a linear lens member 109 is disposed on the front surfaces of the light emitting elements 20j. Thus, the one-dimensional light emitting element substrate #1 (substrate) is formed (refer to FIG. 6).

FIG. 6 is a perspective view showing an example of the configuration of the one-dimensional light emitting element substrate #1. In this example, "n" one-dimensional light emitting element substrates #1 shown in FIG. 6 are prepared. This is to form the two-dimensional light emitting element array 101 (m rows×n columns) by laminating the "n" one-dimensional light emitting element substrates #1.

As the two-dimensional light emitting element array 101 with a curved shape, it is possible to use a flexible flat panel display, which is bent in a U shape so that the light emitting surface has a curved shape, or a flat panel display which is formed in a curved shape in advance. It is difficult to use a flat panel display with a normal structure for the two-dimensional light emitting element array 101 according to the embodiment of the present invention. In addition, since wiring lines are arrayed in a matrix in a general-purpose flat panel display, a dynamic lighting method is adopted in which light emitting elements are sequentially scanned in the unit of m rows or n columns so as to be lighted.

For this reason, since updating of an image takes time, the update rate is about 240 to 1000 Hz at the fastest. Therefore, it is necessary to update an image sufficiently quickly at more than 1000 Hz. In this example, efforts are made to significantly increase the speed of a driving circuit of the light emitting element 20j using the light emitting element 20j which performs high-speed response or to reduce the number of scan lines in dynamic lighting by significantly increasing the number of light emitting elements 20j driven at a time.

In order to significantly increase the number of light emitting elements 20j driven at a time, it is preferable to divide wiring patterns, which are arrayed in a matrix, into small units and drive small matrices of the divided wiring patterns separately and in parallel or to perform static lighting for all of the light emitting elements 20j simultaneously.

FIG. 7 is a perspective view showing an example of laminating "k" one-dimensional light emitting element substrates #k (k=1 to n). In this example, the two-dimensional light emitting element array 101 with a curved shape in which the light emitting elements 20j are linearly arrayed in "j" rows is manufactured by laminating only a necessary number of one-dimensional light emitting element substrates #k.

For the two-dimensional light emitting element array 101 having a laminated structure shown in FIG. 7, first, one-dimensional light emitting element substrates #k are staked in a state where the positioning holes 32 and 33 of the printed circuit boards are aligned. By this stacking, insertion into the cylindrical positioning pin 83 protruding on the turntable 42 becomes easy. As a result, "k" one-dimensional light emitting element substrates #1 to #k can be laminated on the basis of self-alignment. Through such a forming sequence, the two-dimensional light emitting element array 101 having a curved light emitting surface can be easily formed.

In this example, if the image data Din is transmitted in parallel to the one-dimensional light emitting element substrates #k from the beginning, the number of wiring patterns increases significantly. For this reason, not only a driver IC (driving circuit) for driving the light emitting element 20j but also an IC (ASIC circuit) for serial-to-parallel conversion is mounted as the IC 35 on the one-dimensional light emitting element substrate #k. The IC for serial-to-parallel conversion operates for parallel conversion of the image data Din serially transmitted.

Thus, by the information transmission method using the structure where the one-dimensional light emitting element substrates #k are laminated, it is possible to transmit the image data Din up to the last light emitting element 20j through serial wiring patterns. As a result, the number of wiring patterns can be significantly reduced now compared with the case where the image data Din is transmitted in parallel to the one-dimensional light emitting element substrates #k. In addition, the two-dimensional light emitting element array 101 excellent in terms of assembly efficiency and maintenance can be formed with a good yield. In this manner, the two-dimensional light emitting element array 101 with a curved shape can be manufactured.

If the two-dimensional light emitting element array 101 shown in FIGS. 3 to 7 is prepared, the two-dimensional light emitting element array 101 is attached to a predetermined position of the rotating section 104 shown in FIG. 2, in this example, on the turntable 42. In this case, the cylindrical positioning pin 83 protruding on the turntable 42 are inserted into holes of the printed circuit boards of the "k" one-dimensional light emitting element substrates #k. Then, each one-dimensional light emitting element substrate #k is positioned by self-alignment. In order to maintain this state, the "k" one-dimensional light emitting element substrates #1 to #n are laminated and attached along the rotary shaft 103.

In this example, a connection substrate 11 mounted on a predetermined substrate is provided in an upright state on the turntable 42. A connector with an insertion structure for connection with connectors with a wiring structure of the one-dimensional light emitting element substrates #1 to #n is provided in the connection substrate 11. The connectors with a wiring structure of the one-dimensional light emitting element substrates #1 to #n are fitted into the connector with an insertion structure of the connection substrate 11, so that the "k" one-dimensional light emitting element substrates #1~#n are connected to the connection substrate 11.

Moreover, the two-dimensional light emitting element array 101 is disposed between the rotary shaft 103 of the rotating section 104 and the slit 102 of the external body 41 such that the curved light emitting surface (recessed surface side) faces the position of the slit 102. For example, the two-dimensional light emitting element array 101 is attached to the position where the rotary shaft 103 of the rotating section 104, the central portion of the two-dimensional light emitting element array 101, and the slit 102 are aligned in a straight line. The two-dimensional light emitting element array 101 is connected to the harness 54 pulled out from the rotary side component of the slip ring 51.

In this example, a viewer detecting sensor 81, which is an example of a viewer detector, is attached to the position where the outside can be viewed from the inside of the external body 41. The viewer detecting sensor 81 is attached to the connection substrate 11 through an arm member 82. The viewer detecting sensor 81 is attached to one end of the arm member 82 and is used when determining whether or not there is a viewer by detecting a viewer, who is watching the three-dimensional image outside the rotating section 104 rotated by the motor 52. A position sensitive detector (PSD sensor), an ultrasonic sensor, an infrared sensor, a face recognition camera, or the like is used as the viewer detecting sensor 81.

Preferably, the viewer detecting sensor 81 can detect the entire periphery at the resolution of a small angle. Since the viewer detecting sensor 81 rotates together with the rotating section 104 to detect a viewer, the entire periphery can be detected by one viewer detecting sensor 81. Accordingly, it is possible to make a system with a high angular resolution. As a result, since the number of sensors can be significantly reduced, both high resolution and low cost can be realized.

When a high-speed camera is applied as the viewer detecting sensor 81, the camera is attached to the rotary shaft 103 of the rotating section 104. By attaching such a high-speed camera to the rotary shaft 103 of the rotating section 104 and rotating it, the existence of a viewer can be detected over the entire region of 360°.

If the two-dimensional light emitting element array 101 is attached on the turntable 42, the external body 41 is attached so as to cover the two-dimensional light emitting element array 101 on the turntable 42. In this case, the emission angle of light can be restricted to a predetermined range by fixing the slit 102 ahead of the light emitting surface of the two-dimensional light emitting element array 101. Accordingly, the light emitting unit U1 can be formed by the slit 102 of the peripheral surface of the external body 41 and the two-dimensional light emitting element array 101 located further inside the slit 102.

In addition, the installation frame 105 for supporting the turntable 42 rotatably is provided. In this example, the slip ring 51 is provided in an upper portion of the installation frame 105, and a shaft receiving section (not shown) is mounted. The shaft receiving section is engaged with the rotary shaft 103 so that the rotary shaft 103 can rotate freely and also supports the rotating section 104. In the installation frame 105, the motor 52, a controller 55, an I/F substrate 56, and a power supply section 57, and the like are mounted in addition to the slip ring 51 (refer to FIG. 18). The motor 52 is directly connected with the rotary shaft 103.

The controller 55 and the power supply section 57 are connected to the fixed side component of the slip ring 51 through the harness 53. Accordingly, in the installation frame 105, electric power or the image data Din supplied from the outside can be transmitted to the two-dimensional light emitting element array 101 through the slip ring 51. If the installation frame 105 is prepared, the rotating section 104 to which the two-dimensional light emitting element array 101 is attached is attached to the installation frame 105. As a result, the multi-directional three-dimensional image display device 10 is completed.

[Example of a Function of the Lens Member 109 in the Two-Dimensional Light Emitting Element Array 101]

Figure 8:
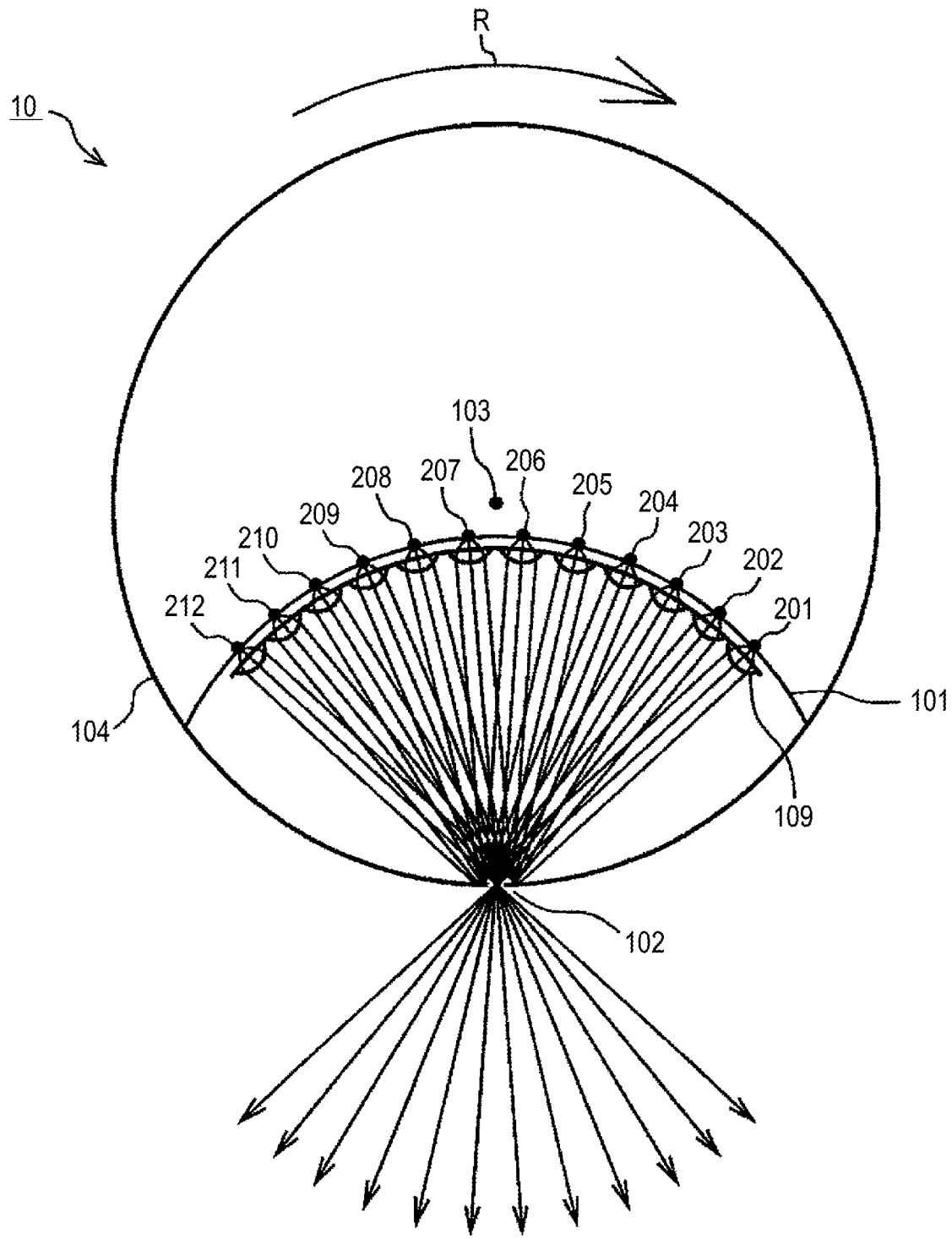
FIG. 8 is a schematic diagram showing an example of a function of a lens member in the two-dimensional light emitting element array when viewed from the rotary shaft direction.

FIG. 8 is a schematic diagram showing an example of a function of the lens member 109 in the two-dimensional light emitting element array 101 when viewed from the rotary shaft direction. In this example, the two-dimensional light emitting element array 101 shown in FIG. 8 is formed by laminating the plurality of one-dimensional light emitting element substrates #1. For the sake of convenience, twelve (m=12) light emitting elements 20j (j=1 to m) are arrayed in a first column, for example. The examples shown in FIGS. 5 to 7 are cases where the number of light emitting elements is 59 (m=59).

Most light beams emitted from the light emitting elements 201 to 212 are scattered in the external body 41 to become heat without arriving near the slit 102. For this reason, in the two-dimensional light emitting element array 101, the lens member 109 with a predetermined shape is attached to the light emitting surface of each of the light emitting elements 201 to 212. In this example, the lens member 109 is attached to each light emitting element 20j so that light beams emitted from the light emitting elements 201 to 212 become parallel beams. As a result, the light beams emitted from the light emitting elements 201 to 212 can be condensed near the slit 102.

A micro lens or a SELFOC lens is used as the lens member 109. Undoubtedly, in order to reduce the manufacturing costs, a sheet shaped lens or a plate shaped lens, such as a microlens array or a SELFOC lens array, may be attached to the two-dimensional light emitting element array 101 instead of attaching the lens member 109 to each of the light emitting elements 201 to 212.

If light beams are condensed only in the left and right direction, a lenticular lens may also be used. By attaching such a lens member 109, scattered light can be suppressed as much as possible. This is advantageous in that light can be efficiently used and the brightness or the contrast suitable for the multi-directional three-dimensional image display device 10 is acquired. As a result, an improvement in power efficiency can be expected.

[Principle of Operation of the Multi-Directional Three-Dimensional Image Display Device 10]

Next, the principle of an operation of the multi-directional three-dimensional image display device 10 will be described with reference to FIGS. 9 to 17. FIG. 9 is a schematic diagram showing an example of the operation of the multi-directional three-dimensional image display device 10 when viewed from the rotary shaft direction. In the drawing, the lens member 109 is omitted.

The multi-directional three-dimensional image display device 10 shown in FIG. 9 adopts a light reproduction method. The rotating section 104 rotates in a direction of an arrow R (refer to FIG. 1) or the opposite direction with the rotary shaft 103 as the rotation center.

In the multi-directional three-dimensional image display device 10, the slit 102 parallel to the rotary shaft 103 is provided in the external body 41 before the light emitting surface of the two-dimensional light emitting element array 101 so that light emitted from the two-dimensional light emitting element array 101 does not leak from portions other than the slit position. Due to this slit structure, the emission angle of light, which is emitted from each of the light emitting elements 201 to 212 of the two-dimensional light emitting element array 101, in the left and right direction is largely restricted by the slit 102.

Although the number of light emitting elements 201 to 212 is set to m=12 rows in this example, other numbers may also be By the twelve light emitting elements 201 to 212, light beams of a three-dimensional image formed with the rotary shaft 103 as a reference leak from the inside of the rotating section 104 to the outside through the slit 102. Here, a direction of a line segment obtained by connecting each of the twelve light emitting elements 201 to 212 to the slit 102 is expressed by a vector.

The direction indicated by a line segment obtained connecting the light emitting element 201 to the slit 102 is assumed to be a direction of light leaking from the light emitting element 201 through the slit 102. Hereinafter, this direction is described as a "vector 201V direction". Similarly, the direction indicated by a line segment obtained connecting the light emitting element 202 to the slit 102 is assumed to be a direction of light leaking from the light emitting element 202 through the slit 102. This direction is described as a "vector 202V direction". Similarly, the direction indicated by a line segment obtained connecting the light emitting element 212 to the slit 102 is assumed to be a direction of light leaking from the light emitting element 212 through the slit 102. This direction is described as a "vector 212V direction".

For example, light output from the light emitting element 201 passes through the slit 102 and is then emitted in the vector 201V direction. Light output from the light emitting element 202 passes through the slit 102 and is then emitted in the vector 202V direction. Similarly, light beams output from the light emitting elements 202 to 212 pass through the slit 102 and are then emitted in the directions of vectors 203V to 212V. Thus, since the light beams from the light emitting elements 201 to 212 are emitted in different directions, it is possible to reproduce light beams corresponding to one vertical line regulated by the slit 102.

By rotation scanning of the rotating section 104 with such a slit structure with respect to the viewing point p, the light reproduction surface with a cylindrical shape can be formed. In addition, arbitrary reproduction light can be output by reflecting the image data Din from the outside or the image data Din from a storage device located in a rotating section, such as a ROM, on the light emitting unit U1 of the two-dimensional light emitting element array 101 according to the angle of rotation scanning with respect to the viewing point p.

[Example of the Locus of Light Emitting Points]

Subsequently, an example of the locus of light emitting points observed from the viewing point p will be described.

In this multi-directional three-dimensional image display device 10, for example, twelve (m=12) light emitting elements are disposed at different positions as described above on the plane perpendicular to the rotary shaft 103 in the two-dimensional light emitting element array 101. Each of the "m" light emitting elements emits light for different viewing positions to the outside through the slit 102 according to the rotation of the rotating section 104. Here, it is assumed that observation is performed in a direction from any viewing position around the rotating section 104 toward the rotary shaft 103 while the rotating section 104 is rotating. In this case, the display controller 15 (FIG. 18), which will be described later, controls the light emission of a plurality of light emitting elements such that, for example, a planar image corresponding to any viewing position is formed in the rotating section 104 by the locus of light emitting points formed by the plurality of light emitting elements. At the respective viewing positions, for example, planar images corresponding to the viewing positions with slight parallax are observed. Accordingly, when observed from any two viewing positions equivalent to the positions of both eyes, for example, planar images corresponding to the viewing positions with parallax are observed. As a result, a viewer can recognize a three-dimensional image at any position around the rotating section.

FIGS. 10A to 12D are explanatory views showing examples of the locus of light emitting points observed from the viewing point p. As shown in FIGS. 10A to 10D, when the rotating section 104 having the light emitting unit U1 rotates at the constant speed for rotation scanning with respect to a viewing point p=300 is performed, the light emitting element observed from the viewing point p=300 moves from the light emitting element 201 sequentially to the light emitting elements 202, 203, . . . , 212 at intervals of a time T.

The structure where the locus (small black round mark in the drawings) of light emitting points forms a flat surface is realized by adjusting the light emitting surface shape of the two-dimensional light emitting element array 101 and the position of the slit 102. For example, at time t=0 shown in FIG. 10A, light leaking from the light emitting element 201 is observed when the two-dimensional light emitting element array 101 is observed at the viewing point 300 through the slit 102.

Figure 10A:
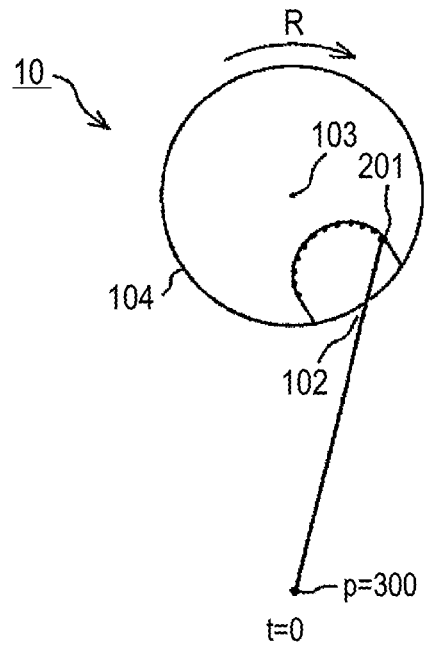
FIGS. 10A to 10D are explanatory views showing an example (first example) of the locus of light emitting points observed from the viewing point.
Figure 10B:
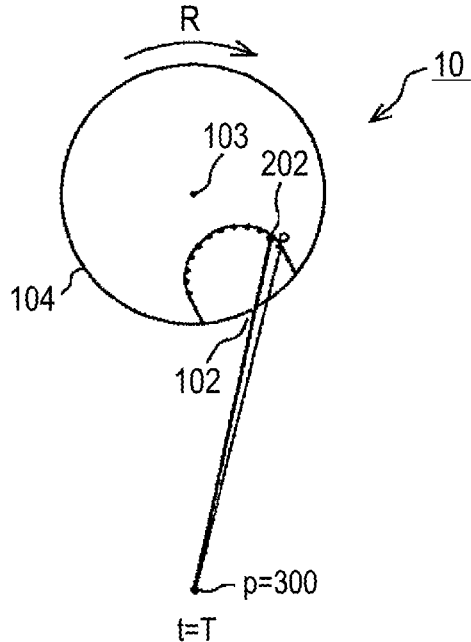
Figure 10C:
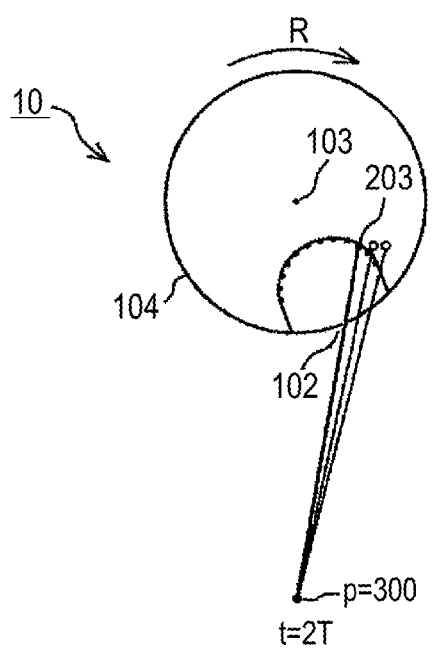

At time t=T shown in FIG. 10B, light leaking from the light emitting element 202 is observed when the two-dimensional light emitting element array 101 is observed at the viewing point 300 through the slit 102. A small white round mark located at the first from the right side in the drawing indicates a light emitting point of the light emitting element 201. At time t=2T shown in FIG. 10C, light leaking from the light emitting element 203 is observed when the two-dimensional light emitting element array 101 is observed at the viewing point 300 through the slit 102. A second small round mark in FIG. 10C indicates a light emitting point of the light emitting element 202.

Figure 10D:
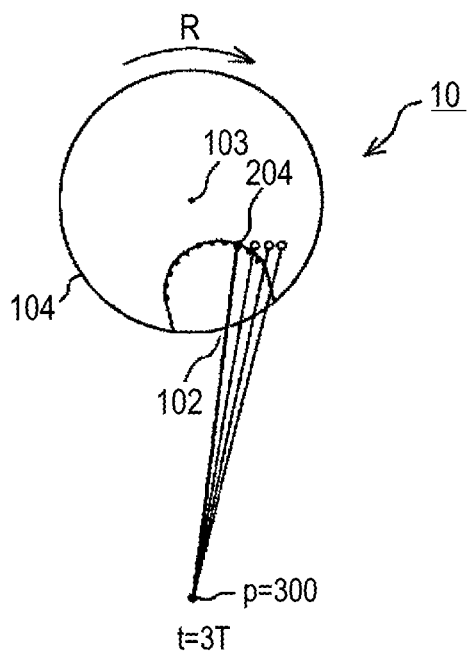

At time t=3T shown in FIG. 10D, light leaking from the light emitting element 204 is observed when the two-dimensional light emitting element array 101 is observed at the viewing point 300 through the slit 102. A third small round mark in FIG. 10D indicates a light emitting point of the light emitting element 203.

Figure 11A:
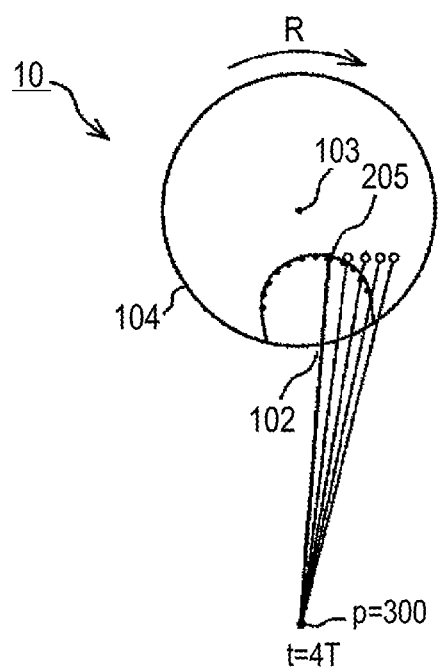
FIGS. 11A to 11D are explanatory views showing an example (second example) of the locus of light emitting points observed from the viewing point.
Figure 11B:
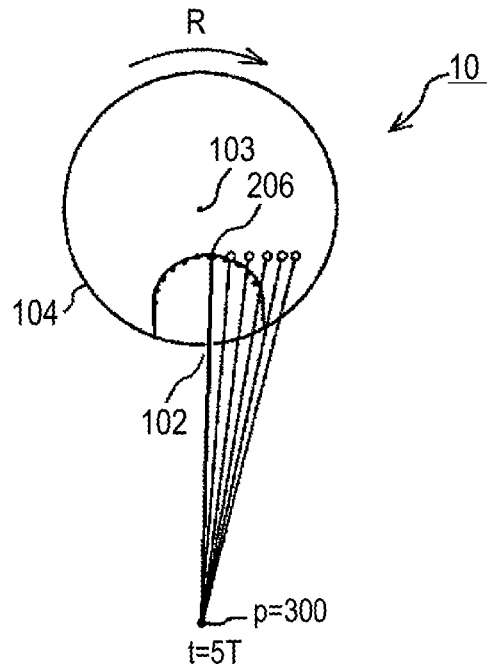

Moreover, at time t=4T shown in FIG. 11A, light leaking from the light emitting element 205 is observed when the two-dimensional light emitting element array 101 is observed at the viewing point 300 through the slit 102. A fourth small round mark in FIG. 11A indicates a light emitting point of the light emitting element 204. At time t=5T shown in FIG. 11B, light leaking from the light emitting element 206 is observed when the two-dimensional light emitting element array 101 is observed at the viewing point 300 through the slit 102. A fifth small round mark in FIG. 11B indicates a light emitting point of the light emitting element 205.

Figure 11C:
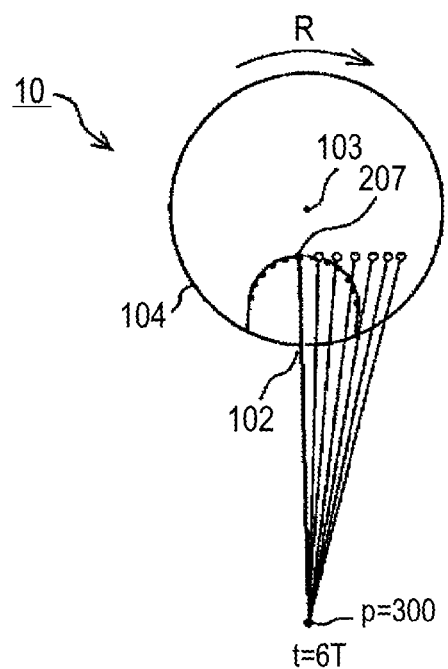
Figure 11D:
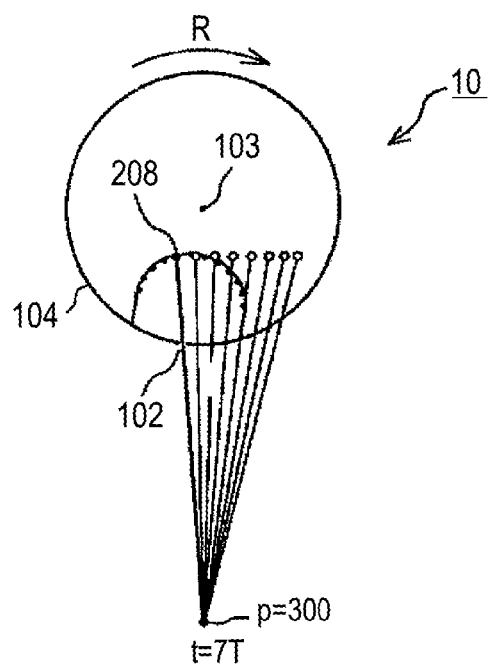

At time t=6T shown in FIG. 11C, light leaking from the light emitting element 207 is observed when the two-dimensional light emitting element array 101 is observed at the viewing point 300 through the slit 102. A sixth small round mark in FIG. 11C indicates a light emitting point of the light emitting element 206. At time t=7T shown in FIG. 11D, light leaking from the light emitting element 208 is observed when the two-dimensional light emitting element array 101 is observed at the viewing point 300 through the slit 102. A seventh small round mark in FIG. 11D indicates a light emitting point of the light emitting element 207.

Figure 12A:
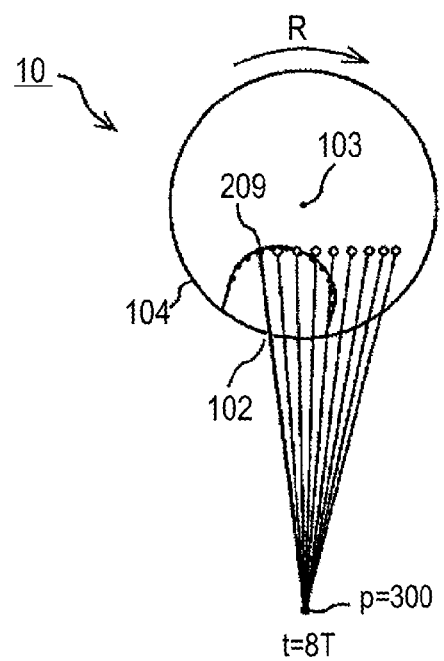
FIGS. 12A to 12D are explanatory views showing an example (third example) of the locus of light emitting points observed from the viewing point.
Figure 12B:
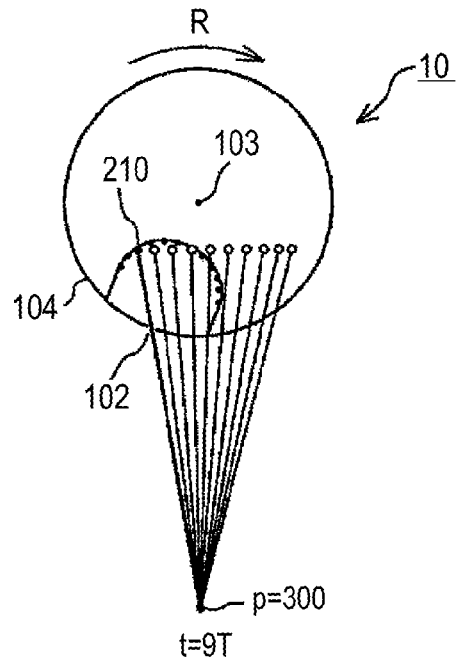

At time t=8T shown in FIG. 12A, light leaking from the light emitting element 209 is observed when the two-dimensional light emitting element array 101 is observed at the viewing point 300 through the slit 102. An eighth small round mark in FIG. 12A indicates a light emitting point of the light emitting element 208. At time t=9T shown in FIG. 12B, light leaking from the light emitting element 210 is observed when the two-dimensional light emitting element array 101 is observed at the viewing point 300 through the slit 102. A ninth small round mark in FIG. 12B indicates a light emitting point of the light emitting element 209.

Figure 12C:
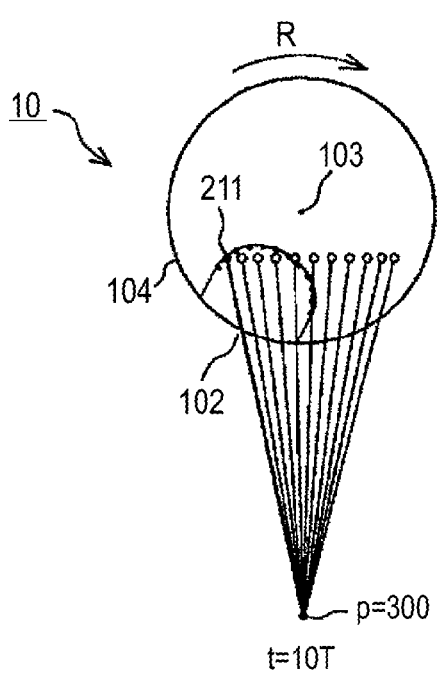
Figure 12D:
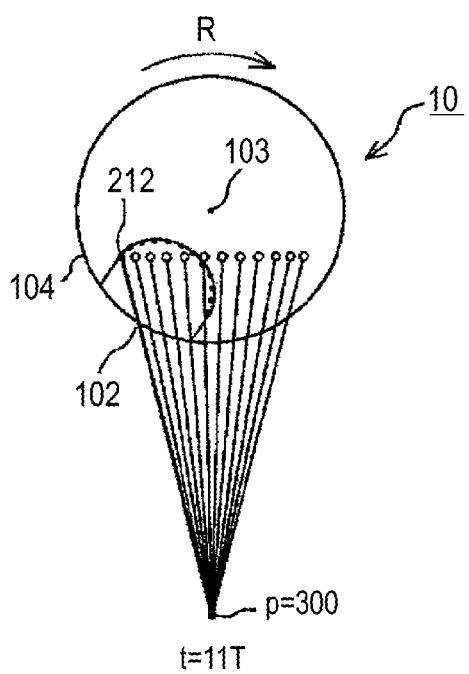

At time t=10T shown in FIG. 12C, light leaking from the light emitting element 211 is observed when the two-dimensional light emitting element array 101 is observed at the viewing point 300 through the slit 102. A tenth small round mark in FIG. 12C indicates a light emitting point of the light emitting element 210. At time t=11T shown in FIG. 12D, light leaking from the light emitting element 212 is observed when the two-dimensional light emitting element array 101 is observed at the viewing point 300 through the slit 102. An eleventh small round mark in FIG. 12D indicates a light emitting point of the light emitting element 211. A twelfth small black round mark in FIG. 12D indicates a light emitting point of the light emitting element 212.

[Output Form of Light]

Next, how light beams are output to a plurality of viewing points through the slit 102 will be described. FIGS. 13A to 16 are explanatory views showing the situations (first to fourth situations) where light beams are output to the plurality of viewing points p through the slit 102. In this example, a situation of a section from time t=0 to time t=5T (1/12 round), in which the rotating section 104 rotates by 30° from any reference position, is shown in the case where sixty viewing points p=300 to 359 are set every 6° around the entire periphery)(360°) of the light emitting unit U1.

According to such a light emitting unit U1, as shown in FIGS. 13A to 15B, light beams are output to the plurality of (twelve) viewing points p for as many as the number of light emitting elements 201 to 212 at a time. Through this output, the locus of light emitting points forms a flat surface and is observed not only at the viewing point p=300 but also at the other viewing points p=349 to 359.

Figure 13A:
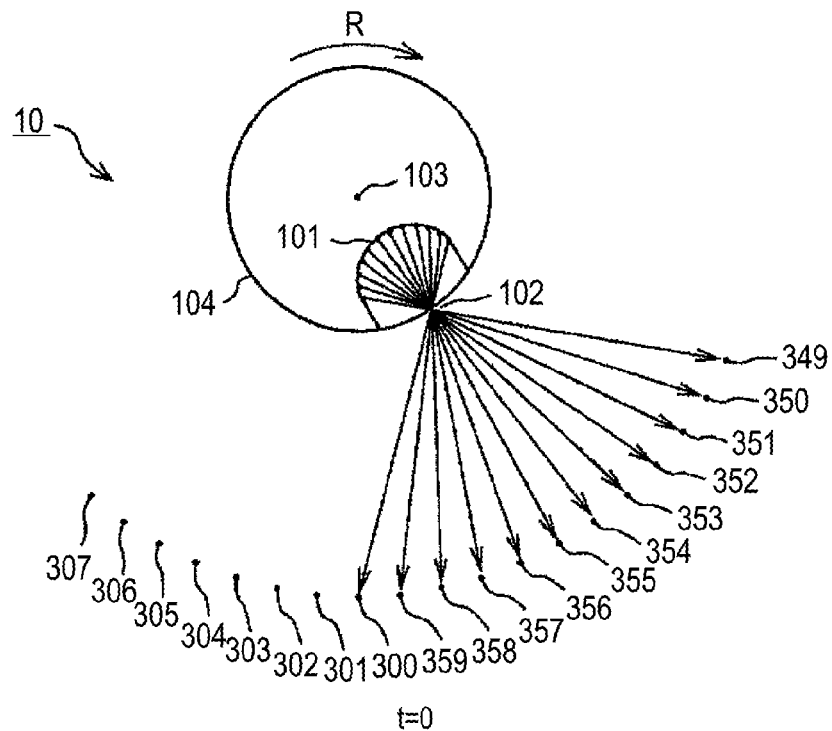
FIGS. 13A and 13B are explanatory views showing a situation (first situation) where light beams are output to a plurality of viewing points through a slit.

For example, at time t=0 shown in FIG. 13A, light leaking from the light emitting element 201 is observed when the two-dimensional light emitting element array 101 is observed at the viewing point 300 (p is omitted) through the slit 102. This example is a case where the rotating section 104 rotates clockwise and the viewing point is shifted by 6° with the viewing point 300 as a reference. When the two-dimensional light emitting element array 101 is observed through the slit 102 at another viewing point 359 which exists counterclockwise by 6° from the viewing point 300 shown in FIG. 13A, light leaking from the light emitting element 202 is observed.

When the two-dimensional light emitting element array 101 is observed through the slit 102 at the viewing point 358 which exists counterclockwise by 12° from the viewing point 300 shown in FIG. 13A, light leaking from the light emitting element 203 is observed. When the two-dimensional light emitting element array 101 is observed through the slit 102 at the viewing point 357 which exists counterclockwise by 18° from the viewing point 300 shown in FIG. 13A, light leaking from the light emitting element 204 is observed.

When the two-dimensional light emitting element array 101 is observed through the slit 102 at the viewing point 356 which exists counterclockwise by 24° from the viewing point 300 shown in FIG. 13A, light leaking from the light emitting element 205 is observed. When the two-dimensional light emitting element array 101 is observed through the slit 102 at the viewing point 355 which exists counterclockwise by 30° from the viewing point 300 shown in FIG. 13A, light leaking from the light emitting element 206 is observed.

When the two-dimensional light emitting element array 101 is observed through the slit 102 at the viewing point 354 which exists counterclockwise by 36° from the viewing point 300 shown in FIG. 13A, light leaking from the light emitting element 207 is observed. When the two-dimensional light emitting element array 101 is observed through the slit 102 at the viewing point 353 which exists counterclockwise by 42° from the viewing point 300 shown in FIG. 13A, light leaking from the light emitting element 208 is observed.

When the two-dimensional light emitting element array 101 is observed through the slit 102 at the viewing point 352 which exists counterclockwise by 48° from the viewing point 300 shown in FIG. 13A, light leaking from the light emitting element 209 is observed. When the two-dimensional light emitting element array 101 is observed through the slit 102 at the viewing point 351 which exists counterclockwise by 54° from the viewing point 300 shown in FIG. 13A, light leaking from the light emitting element 210 is observed.

When the two-dimensional light emitting element array 101 is observed through the slit 102 at the viewing point 350 which exists counterclockwise by 60° from the viewing point 300 shown in FIG. 13A, light leaking from the light emitting element 211 is observed. When the two-dimensional light emitting element array 101 is observed through the slit 102 at the viewing point 349 which exists counterclockwise by 66° from the viewing point 300 shown in FIG. 13A, light leaking from the light emitting element 212 is observed.

Figure 13B:
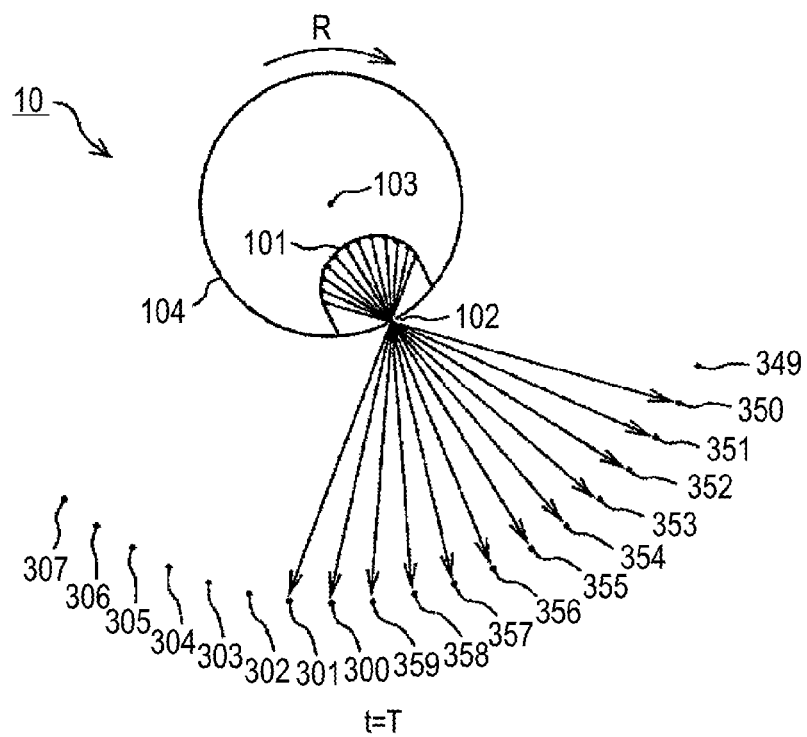

Moreover, at time t=T shown in FIG. 13B, light leaking from the light emitting element 202 is observed when the two-dimensional light emitting element array 101 is observed at the viewing point 300 through the slit 102. When the two-dimensional light emitting element array 101 is observed through the slit 102 at another viewing point 301 which exists clockwise by 6° from the viewing point 300 shown in FIG. 13B, light leaking from the light emitting element 201 is observed.

When the two-dimensional light emitting element array 101 is observed through the slit 102 at another viewing point 359 which exists counterclockwise by 6° from the viewing point 300 shown in FIG. 13B, light leaking from the light emitting element 203 is observed. When the two-dimensional light emitting element array 101 is observed through the slit 102 at the viewing point 358 which exists counterclockwise by 12° from the viewing point 300 shown in FIG. 13B, light leaking from the light emitting element 204 is observed.

When the two-dimensional light emitting element array 101 is observed through the slit 102 at the viewing point 357 which exists counterclockwise by 18° from the viewing point 300 shown in FIG. 13B, light leaking from the light emitting element 205 is observed. When the two-dimensional light emitting element array 101 is observed through the slit 102 at the viewing point 356 which exists counterclockwise by 24° from the viewing point 300 shown in FIG. 13B, light leaking from the light emitting element 206 is observed.

When the two-dimensional light emitting element array 101 is observed through the slit 102 at the viewing point 355 which exists counterclockwise by 30° from the viewing point 300 shown in FIG. 13B, light leaking from the light emitting element 207 is observed. When the two-dimensional light emitting element array 101 is observed through the slit 102 at the viewing point 354 which exists counterclockwise by 36° from the viewing point 300 shown in FIG. 13B, light leaking from the light emitting element 208 is observed.

When the two-dimensional light emitting element array 101 is observed through the slit 102 at the viewing point 353 which exists counterclockwise by 42° from the viewing point 300 shown in FIG. 13B, light leaking from the light emitting element 209 is observed. When the two-dimensional light emitting element array 101 is observed through the slit 102 at the viewing point 352 which exists counterclockwise by 48° from the viewing point 300 shown in FIG. 13B, light leaking from the light emitting element 210 is observed.

When the two-dimensional light emitting element array 101 is observed through the slit 102 at the viewing point 351 which exists counterclockwise by 54° from the viewing point 300 shown in FIG. 13B, light leaking from the light emitting element 211 is observed. When the two-dimensional light emitting element array 101 is observed through the slit 102 at the viewing point 350 which exists counterclockwise by 60° from the viewing point 300 shown in FIG. 13B, light leaking from the light emitting element 212 is observed.

Figure 14A:
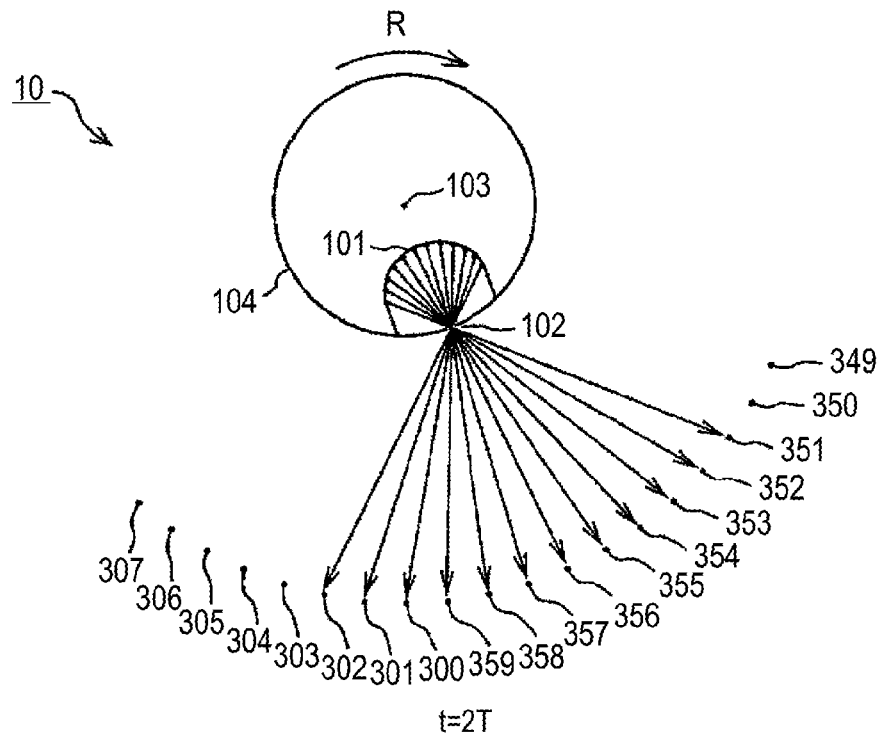
FIGS. 14A and 14B are explanatory views showing a situation (second situation) where light beams are output to a plurality of viewing points through a slit.

Moreover, at time t=2T shown in FIG. 14A, light leaking from the light emitting element 203 is observed when the two-dimensional light emitting element array 101 is observed at the viewing point 300 through the slit 102. When the two-dimensional light emitting element array 101 is observed through the slit 102 at another viewing point 301 which exists clockwise by 6° from the viewing point 300 shown in FIG. 14A, light leaking from the light emitting element 202 is observed.

When the two-dimensional light emitting element array 101 is observed through the slit 102 at another viewing point 302 which exists clockwise by 12° from the viewing point 300 shown in FIG. 14A, light leaking from the light emitting element 201 is observed. When the two-dimensional light emitting element array 101 is observed through the slit 102 at another viewing point 359 which exists counterclockwise by 6° from the viewing point 300 shown in FIG. 14A, light leaking from the light emitting element 204 is observed.

When the two-dimensional light emitting element array 101 is observed through the slit 102 at the viewing point 358 which exists counterclockwise by 12° from the viewing point 300 shown in FIG. 14A, light leaking from the light emitting element 205 is observed. When the two-dimensional light emitting element array 101 is observed through the slit 102 at the viewing point 357 which exists counterclockwise by 18° from the viewing point 300 shown in FIG. 14A, light leaking from the light emitting element 206 is observed.

When the two-dimensional light emitting element array 101 is observed through the slit 102 at the viewing point 356 which exists counterclockwise by 24° from the viewing point 300 shown in FIG. 14A, light leaking from the light emitting element 207 is observed. When the two-dimensional light emitting element array 101 is observed through the slit 102 at the viewing point 355 which exists counterclockwise by 30° from the viewing point 300 shown in FIG. 14A, light leaking from the light emitting element 208 is observed.

When the two-dimensional light emitting element array 101 is observed through the slit 102 at the viewing point 354 which exists counterclockwise by 36° from the viewing point 300 shown in FIG. 14A, light leaking from the light emitting element 209 is observed. When the two-dimensional light emitting element array 101 is observed through the slit 102 at the viewing point 353 which exists counterclockwise by 42° from the viewing point 300 shown in FIG. 14A, light leaking from the light emitting element 210 is observed.

When the two-dimensional light emitting element array 101 is observed through the slit 102 at the viewing point 352 which exists counterclockwise by 48° from the viewing point 300 shown in FIG. 14A, light leaking from the light emitting element 211 is observed. When the two-dimensional light emitting element array 101 is observed through the slit 102 at the viewing point 351 which exists counterclockwise by 54° from the viewing point 300 shown in FIG. 14A, light leaking from the light emitting element 212 is observed.

Figure 14B:
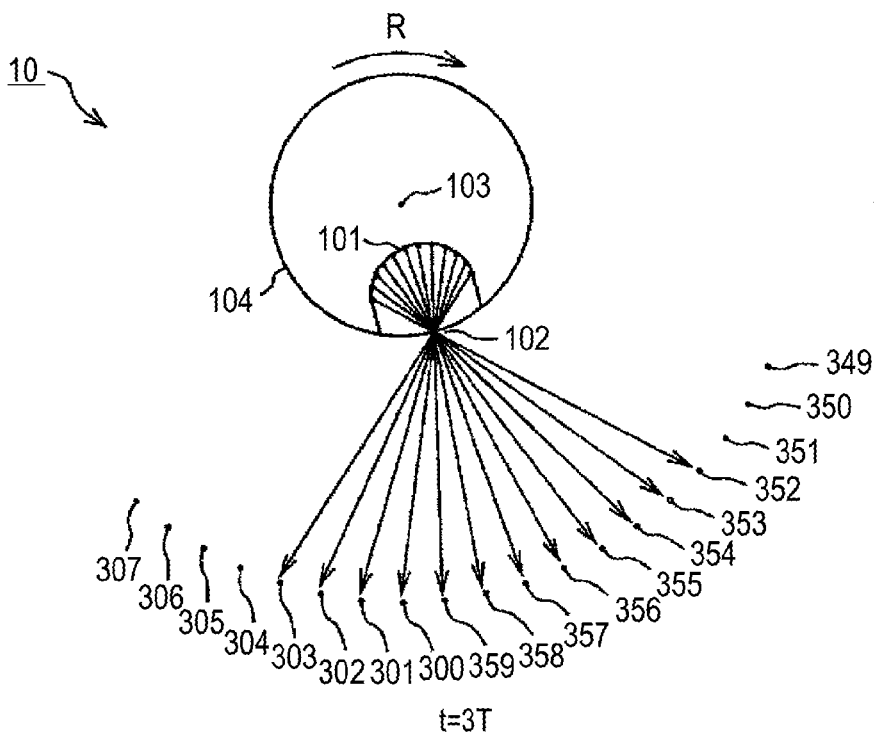

Moreover, at time t=3T shown in FIG. 14B, light leaking from the light emitting element 204 is observed when the two-dimensional light emitting element array 101 is observed at the viewing point 300 through the slit 102. When the two-dimensional light emitting element array 101 is observed through the slit 102 at another viewing point 301 which exists clockwise by 6° from the viewing point 300 shown in FIG. 14B, light leaking from the light emitting element 203 is observed.

When the two-dimensional light emitting element array 101 is observed through the slit 102 at another viewing point 302 which exists clockwise by 12° from the viewing point 300 shown in FIG. 14B, light leaking from the light emitting element 202 is observed. When the two-dimensional light emitting element array 101 is observed through the slit 102 at another viewing point 303 which exists clockwise by 18° from the viewing point 300 shown in FIG. 14B, light leaking from the light emitting element 201 is observed.

When the two-dimensional light emitting element array 101 is observed through the slit 102 at another viewing point 359 which exists counterclockwise by 6° from the viewing point 300 shown in FIG. 14B, light leaking from the light emitting element 205 is observed. When the two-dimensional light emitting element array 101 is observed through the slit 102 at the viewing point 358 which exists counterclockwise by 12° from the viewing point 300 shown in FIG. 14B, light leaking from the light emitting element 206 is observed.

When the two-dimensional light emitting element array 101 is observed through the slit 102 at the viewing point 357 which exists counterclockwise by 18° from the viewing point 300 shown in FIG. 14B, light leaking from the light emitting element 207 is observed. When the two-dimensional light emitting element array 101 is observed through the slit 102 at the viewing point 356 which exists counterclockwise by 24° from the viewing point 300 shown in FIG. 14B, light leaking from the light emitting element 208 is observed.

When the two-dimensional light emitting element array 101 is observed through the slit 102 at the viewing point 355 which exists counterclockwise by 30° from the viewing point 300 shown in FIG. 14B, light leaking from the light emitting element 209 is observed. When the two-dimensional light emitting element array 101 is observed through the slit 102 at the viewing point 354 which exists counterclockwise by 36° from the viewing point 300 shown in FIG. 14B, light leaking from the light emitting element 210 is observed.

When the two-dimensional light emitting element array 101 is observed through the slit 102 at the viewing point 353 which exists counterclockwise by 42° from the viewing point 300 shown in FIG. 14B, light leaking from the light emitting element 211 is observed. When the two-dimensional light emitting element array 101 is observed through the slit 102 at the viewing point 352 which exists counterclockwise by 48° from the viewing point 300 shown in FIG. 14B, light leaking from the light emitting element 212 is observed.

Figure 15A:
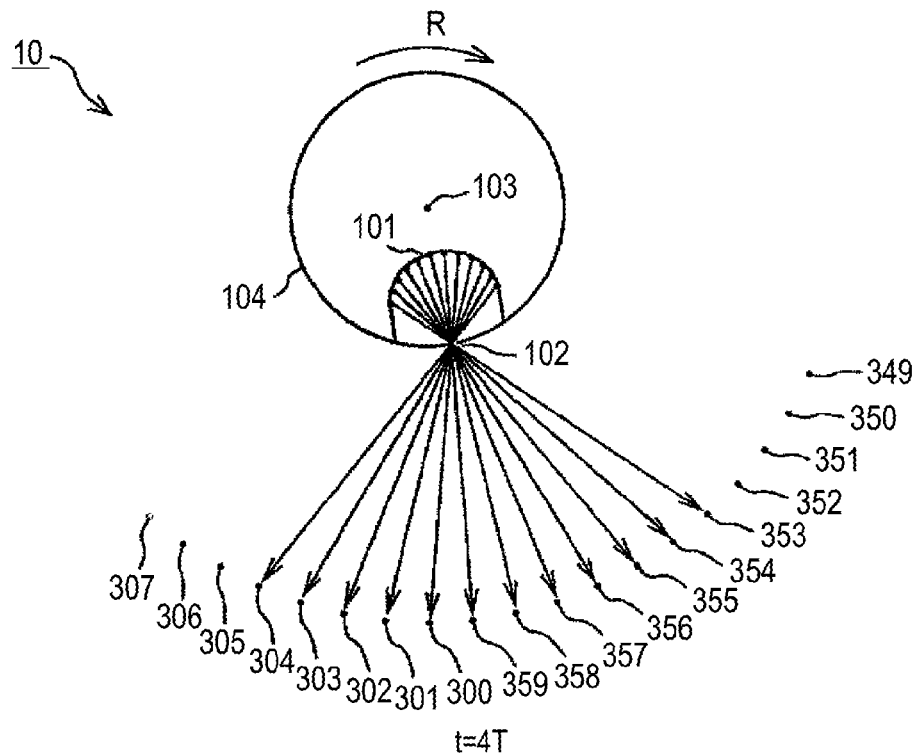
FIGS. 15A and 15B are explanatory views showing a situation (third situation) where light beams are output to a plurality of viewing points through a slit.

Moreover, at time t=4T shown in FIG. 15A, light leaking from the light emitting element 205 is observed when the two-dimensional light emitting element array 101 is observed at the viewing point 300 through the slit 102. When the two-dimensional light emitting element array 101 is observed through the slit 102 at another viewing point 301 which exists clockwise by 6° from the viewing point 300 shown in FIG. 15A, light leaking from the light emitting element 204 is observed.

When the two-dimensional light emitting element array 101 is observed through the slit 102 at another viewing point 302 which exists clockwise by 12° from the viewing point 300 shown in FIG. 15A, light leaking from the light emitting element 203 is observed. When the two-dimensional light emitting element array 101 is observed through the slit 102 at another viewing point 303 which exists clockwise by 18° from the viewing point 300 shown in FIG. 15A, light leaking from the light emitting element 202 is observed.

When the two-dimensional light emitting element array 101 is observed through the slit 102 at another viewing point 304 which exists clockwise by 24° from the viewing point 300 shown in FIG. 15A, light leaking from the light emitting element 201 is observed. When the two-dimensional light emitting element array 101 is observed through the slit 102 at another viewing point 359 which exists counterclockwise by 6° from the viewing point 300 shown in FIG. 15A, light leaking from the light emitting element 206 is observed.

When the two-dimensional light emitting element array 101 is observed through the slit 102 at the viewing point 358 which exists counterclockwise by 12° from the viewing point 300 shown in FIG. 15A, light leaking from the light emitting element 207 is observed. When the two-dimensional light emitting element array 101 is observed through the slit 102 at the viewing point 357 which exists counterclockwise by 18° from the viewing point 300 shown in FIG. 15A, light leaking from the light emitting element 208 is observed.

When the two-dimensional light emitting element array 101 is observed through the slit 102 at the viewing point 356 which exists counterclockwise by 24° from the viewing point 300 shown in FIG. 15A, light leaking from the light emitting element 209 is observed. When the two-dimensional light emitting element array 101 is observed through the slit 102 at the viewing point 355 which exists counterclockwise by 30° from the viewing point 300 shown in FIG. 15A, light leaking from the light emitting element 210 is observed.

When the two-dimensional light emitting element array 101 is observed through the slit 102 at the viewing point 354 which exists counterclockwise by 36° from the viewing point 300 shown in FIG. 15A, light leaking from the light emitting element 211 is observed. When the two-dimensional light emitting element array 101 is observed through the slit 102 at the viewing point 353 which exists counterclockwise by 42° from the viewing point 300 shown in FIG. 15A, light leaking from the light emitting element 212 is observed.

Figure 15B:
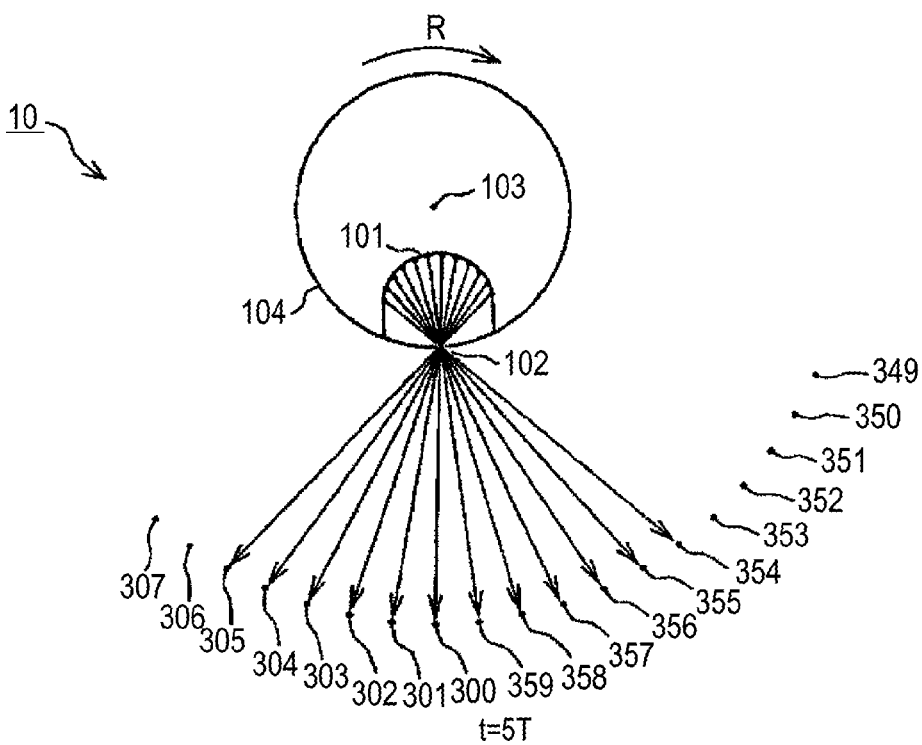

Moreover, at time t=5T shown in FIG. 15B, light leaking from the light emitting element 206 is observed when the two-dimensional light emitting element array 101 is observed at the viewing point 300 through the slit 102. When the two-dimensional light emitting element array 101 is observed through the slit 102 at another viewing point 301 which exists clockwise by 6° from the viewing point 300 shown in FIG. 15B, light leaking from the light emitting element 205 is observed.

When the two-dimensional light emitting element array 101 is observed through the slit 102 at another viewing point 302 which exists clockwise by 12° from the viewing point 300 shown in FIG. 15B, light leaking from the light emitting element 204 is observed. When the two-dimensional light emitting element array 101 is observed through the slit 102 at another viewing point 303 which exists clockwise by 18° from the viewing point 300 shown in FIG. 15B, light leaking from the light emitting element 203 is observed.

When the two-dimensional light emitting element array 101 is observed through the slit 102 at another viewing point 304 which exists clockwise by 24° from the viewing point 300 shown in FIG. 15B, light leaking from the light emitting element 202 is observed. When the two-dimensional light emitting element array 101 is observed through the slit 102 at another viewing point 305 which exists clockwise by 30° from the viewing point 300 shown in FIG. 15B, light leaking from the light emitting element 201 is observed.

When the two-dimensional light emitting element array 101 is observed through the slit 102 at another viewing point 359 which exists counterclockwise by 6° from the viewing point 300 shown in FIG. 15B, light leaking from the light emitting element 207 is observed. When the two-dimensional light emitting element array 101 is observed through the slit 102 at the viewing point 358 which exists counterclockwise by 12° from the viewing point 300 shown in FIG. 15B, light leaking from the light emitting element 208 is observed.

When the two-dimensional light emitting element array 101 is observed through the slit 102 at the viewing point 357 which exists counterclockwise by 18° from the viewing point 300 shown in FIG. 15B, light leaking from the light emitting element 209 is observed. When the two-dimensional light emitting element array 101 is observed through the slit 102 at the viewing point 356 which exists counterclockwise by 24° from the viewing point 300 shown in FIG. 15B, light leaking from the light emitting element 210 is observed.

When the two-dimensional light emitting element array 101 is observed through the slit 102 at the viewing point 355 which exists counterclockwise by 30° from the viewing point 300 shown in FIG. 15B, light leaking from the light emitting element 211 is observed. When the two-dimensional light emitting element array 101 is observed through the slit 102 at the viewing point 354 which exists counterclockwise by 36° from the viewing point 300 shown in FIG. 15B, light leaking from the light emitting element 212 is observed.

Similarly, also at time t=6T to 11T, light beams leaking from the twelve light emitting elements 201 to 212 are shifted one by one to be observed. In the meantime, the rotating section 104 reaches from the angle of 30° to the angle of 60° and rotates. Accordingly, if the rotating section 104 rotates around the entire periphery (1 round), that is, rotates by 360°, light beams emitted from the twelve light emitting elements 201 to 212 at time t=0 to 59T are observed. In this way, the two-dimensional light emitting element array 101 is observed, through the slit 102, at another viewing point which exists clockwise or/and counterclockwise by the angle of 6° as a reference from the viewing point 300. As a result, light beams leaking from the twelve light emitting elements 201 to 212 can be shifted one by one to be observed (refer to FIG. 16).

Figure 16:
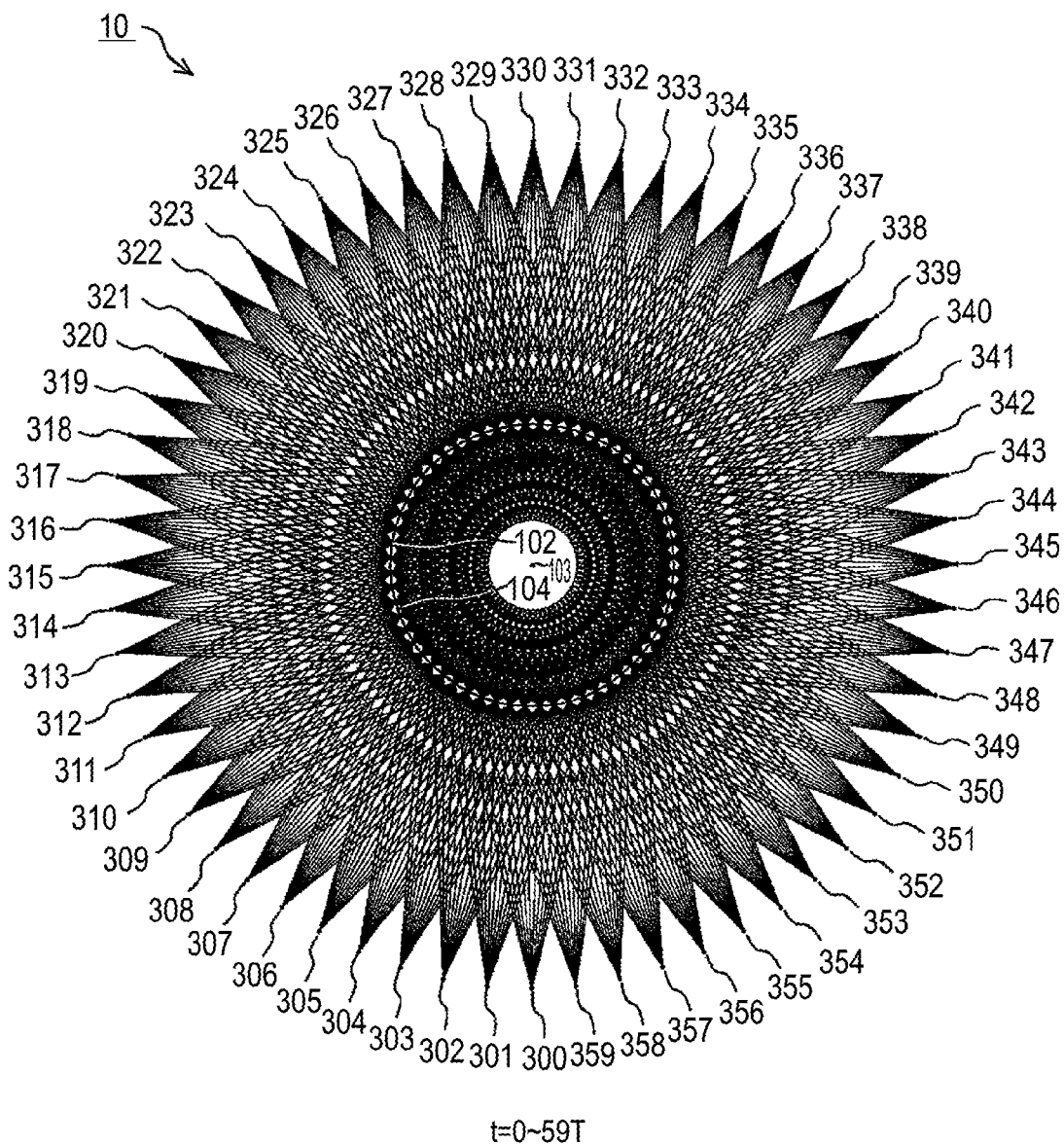
FIG. 16 is an explanatory view showing a situation (fourth situation) where light beams are output to a plurality of viewing points through a slit.

FIG. 16 is a view showing an example of the entire locus of light emitting points formed by the two-dimensional light emitting element array 101. According to the example of the locus of light emitting points formed by the two-dimensional light emitting element array 101 shown in FIG. 16, the locus of light emitting points at time t=0 to 59T forms a flat surface and is observed at all (sixty) viewing points 300 to 359. In this example, the number of viewing points is 60 (arrangement pitch of an angle of 6°). Since a reproduced image observed from the sixty viewing points 300 to 359 is flat, processing for converting the imaged data into emission light data in a predetermined order is reduced. Accordingly, the structure of the light emitting unit U1 described above is very advantageous in generating the image data for reproduction of light beams.

[Example of Creation of Image Data for Three-Dimensional Image Display]

Figure 17:
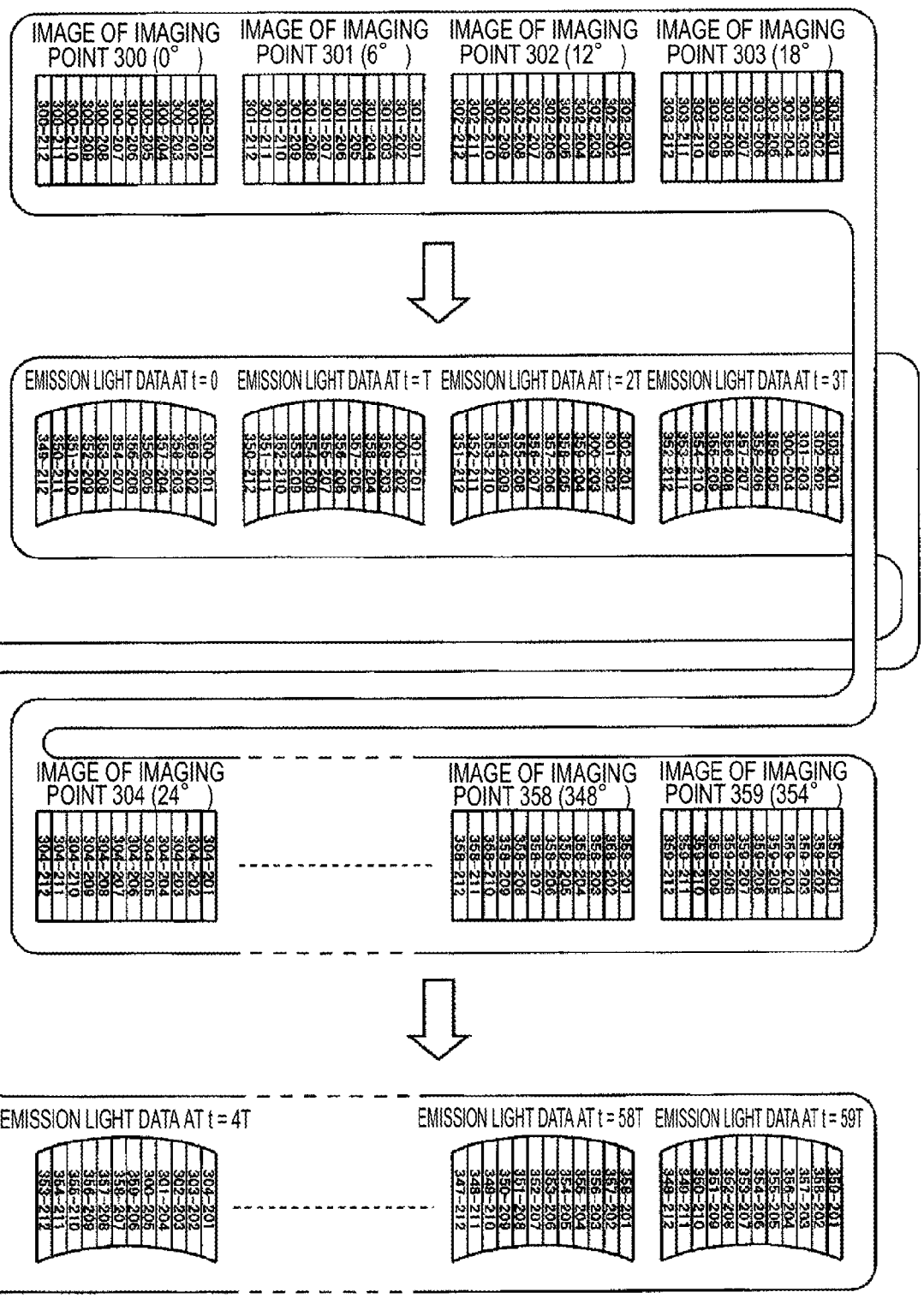
FIG. 17 is a data format showing an example of conversion of imaged data into emission light data.

Next, an example of creation of the image data for three-dimensional image display which can be applied to the multi-directional three-dimensional image display device 10 will be described. FIG. 17 is a data format showing an example of conversion of imaged data into emission light data.

In this example, an object (subject to be imaged) to be displayed on the multi-directional three-dimensional image display device 10 shown in FIG. 16 is imaged from its entire periphery. For example, an object is disposed at the imaging center, and sixty imaging points (equivalent to the viewing points 300 to 359) are set every 6° around the entire periphery with the arrangement center as a rotation center.

Then, a camera is actually used to take an image of the object from each of the viewing points 300 to 359 toward the central position (equivalent to the rotary shaft 103) in the object imaging. By this imaging, the imaging data over the entire periphery which is necessary for light reproduction of the object can be collected.

Then, arrangement operation processing is executed in units of line data in the slit direction (longitudinal direction) such that the imaging data collected as shown in FIG. 17 becomes emission light data for every emission timing of the light emitting elements 201 to 212 at twelve rows in the two-dimensional light emitting element array 101.

Here, the imaging data of an image (0°) obtained by taking image at the imaging point 300 is expressed as follows. The imaging point 300 is imaging data (300-201, 300-202, 300-203, 300-204, 300-205, 300-206, 300-207, 300-208, 300-209, 300-210, 300-211, 300-212).

Moreover, the imaging data of an image (6°) obtained by taking image at the imaging point 301 is shown as follows. The imaging point 301 is imaging data (301-201, 301-202, 301-203, 301-204, 301-205, 301-206, 301-207, 301-208, 301-209, 301-210, 301-211, 301-212).

The imaging data of an image (12°) obtained by taking image at the imaging point 302 is expressed as follows. The imaging point 302 is imaging data (302-201, 302-202, 302-203, 302-204, 302-205, 302-206, 302-207, 302-208, 302-209, 302-210, 302-211, 302-212).

The imaging data of an image (18°) obtained by taking image at the imaging point 303 is expressed as follows. The imaging point 303 is imaging data (303-201, 303-202, 303-203, 303-204, 303-205, 303-206, 303-207, 303-208, 303-209, 303-210, 303-211, 303-212).

The imaging data of an image (24°) obtained by taking image at the imaging point 304 is expressed as follows. The imaging point 304 is imaging data (304-201, 304-202, 304-203, 304-204, 304-205, 304-206, 304-207, 304-208, 304-209, 304-210, 304-211, 304-212). Similarly, the imaging data of an image (348°) obtained by taking image at the imaging point 358 is expressed as follows. The imaging point 358 is imaging data (358-201, 358-202, 358-203, 358-204, 358-205, 358-206, 358-207, 358-208, 358-209, 358-210, 358-211, 358-212).

Here, the imaging data of an image (354°) obtained by taking image at the imaging point 359 is expressed as follows. The imaging point 359 is imaging data (359-201, 359-202, 359-203, 359-204, 359-205, 359-206, 359-207, 359-208, 359-209, 359-210, 359-211, 359-212).

The imaging data obtained as described above is converted into the emission light data at time t=0 to t=59T by executing the following arrangement operation. First, regarding the emission light data of the light emitting element 201 at time t=0, the imaging data (300-201) of the image (0°) of the object is arrayed. Regarding the emission light data of the light emitting element 202 at the same time t=0, the imaging data (359-202) of the image (354°) of the object is arrayed. Regarding the emission light data of the light emitting element 203 at the same time t=0, the imaging data (358-203) of the image (348°) of the object is arrayed.

Regarding the emission light data of the light emitting element 204 at the same time t=0, the imaging data (357-204) of the image (342°) of the object is arrayed. Regarding the emission light data of the light emitting element 205 at the same time t=0, the imaging data (356-205) of the image (336°) of the object is arrayed. Regarding the emission light data of the light emitting element 206 at the same time t=0, the imaging data (355-206) of the image (330°) of the object is arrayed.

Regarding the emission light data of the light emitting element 207 at the same time t=0, the imaging data (354-207) of the image (324°) of the object is arrayed. Regarding the emission light data of the light emitting element 208 at the same time t=0, the imaging data (353-208) of the image (318°) of the object is arrayed. Regarding the emission light data of the light emitting element 209 at the same time t=0, the imaging data (352-209) of the image (312°) of the object is arrayed.

Regarding the emission light data of the light emitting element 210 at the same time t=0, the imaging data (351-210) of the image (306°) of the object is arrayed. Regarding the emission light data of the light emitting element 211 at the same time t=0, the imaging data (350-211) of the image (300°) of the object is arrayed. Regarding the emission light data of the light emitting element 212 at the same time t=0, the imaging data (349-212) of the image (294°) of the object is arrayed.

Through this arrangement operation, the emission light data of the light emitting elements 201 to 212 at time t=0 can be created. The created data is emission light data (300-201, 359-202, 358-203, 357-204, 356-205, 355-206, 354-207, 353-208, 352-209, 351-210, 350-211, 349-212).

Then, regarding the emission light data of the light emitting element 201 at time t=T, the imaging data (301-201) of the image (6°) of the object is arrayed. Regarding the emission light data of the light emitting element 202 at the same time t=T, the imaging data (300-202) of the image (0°) of the object is arrayed. Regarding the emission light data of the light emitting element 203 at the same time t=T, the imaging data (359-203) of the image (354°) of the object is arrayed. Regarding the emission light data of the light emitting element 204 at the same time t=T, the imaging data (358-204) of the image (348°) of the object is arrayed.

Regarding the emission light data of the light emitting element 205 at the same time t=T, the imaging data (357-205) of the image (342°) of the object is arrayed. Regarding the emission light data of the light emitting element 206 at the same time t=T, the imaging data (356-206) of the image (336°) of the object is arrayed. Regarding the emission light data of the light emitting element 207 at the same time t=T, the imaging data (355-207) of the image (330°) of the object is arrayed. Regarding the emission light data of the light emitting element 208 at the same time t=T, the imaging data (354-208) of the image (324°) of the object is arrayed.

Regarding the emission light data of the light emitting element 209 at the same time t=T, the imaging data (353-209) of the image (318°) of the object is arrayed. Regarding the emission light data of the light emitting element 210 at the same time t=T, the imaging data (352-210) of the image (312°) of the object is arrayed. Regarding the emission light data of the light emitting element 211 at the same time t=T, the imaging data (351-211) of the image (306°) of the object is arrayed. Regarding the emission light data of the light emitting element 212 at the same time t=T, the imaging data (350-212) of the image (300°) of the object is arrayed.

Through this arrangement operation, the emission light data of the light emitting elements 201 to 212 at time t=T can be created. The created data is emission light data (301-201, 300-202, 359-203, 358-204, 357-205, 356-206, 355-207, 354-208, 353-209, 352-210, 351-211, 350-212).

Then, regarding the emission light data of the light emitting element 201 at time t=2T, the imaging data (302-201) of the image (12°) of the object is arrayed. Regarding the emission light data of the light emitting element 202 at the same time t=2T, the imaging data (301-202) of the image (6°) of the object is arrayed. Regarding the emission light data of the light emitting element 203 at the same time t=2T, the imaging data (300-203) of the image (0°) of the object is arrayed. Regarding the emission light data of the light emitting element 204 at the same time t=2T, the imaging data (359-204) of the image (354°) of the object is arrayed.

Regarding the emission light data of the light emitting element 205 at the same time t=2T, the imaging data (358-205) of the image (348°) of the object is arrayed. Regarding the emission light data of the light emitting element 206 at the same time t=2T, the imaging data (357-206) of the image (342°) of the object is arrayed. Regarding the emission light data of the light emitting element 207 at the same time t=2T, the imaging data (356-207) of the image (336°) of the object is arrayed. Regarding the emission light data of the light emitting element 208 at the same time t=2T, the imaging data (355-208) of the image (330°) of the object is arrayed.

Regarding the emission light data of the light emitting element 209 at the same time t=2T, the imaging data (354-209) of the image (324°) of the object is arrayed. Regarding the emission light data of the light emitting element 210 at the same time t=2T, the imaging data (353-210) of the image (318°) of the object is arrayed. Regarding the emission light data of the light emitting element 211 at the same time t=2T, the imaging data (352-211) of the image (312°) of the object is arrayed. Regarding the emission light data of the light emitting element 212 at the same time t=2T, the imaging data (351-212) of the image (306°) of the object is arrayed.

Through this arrangement operation, the emission light data of the light emitting elements 201 to 212 at time t=2T can be created. The created data is emission light data (302-201, 301-202, 300-203, 359-204, 358-205, 357-206, 356-207, 355-208, 354-209, 353-210, 352-211, 351-212).

Then, regarding the emission light data of the light emitting element 201 at time t=3T, the imaging data (303-201) of the image (18°) of the object is arrayed. Regarding the emission light data of the light emitting element 202 at the same time t=3T, the imaging data (302-202) of the image (12°) of the object is arrayed. Regarding the emission light data of the light emitting element 203 at the same time t=3T, the imaging data (301-203) of the image (6°) of the object is arrayed. Regarding the emission light data of the light emitting element 204 at the same time t=3T, the imaging data (300-204) of the image (0°) of the object is arrayed.

Regarding the emission light data of the light emitting element 205 at the same time t=3T, the imaging data (359-205) of the image (354°) of the object is arrayed. Regarding the emission light data of the light emitting element 206 at the same time t=3T, the imaging data (358-206) of the image (348°) of the object is arrayed. Regarding the emission light data of the light emitting element 207 at the same time t=3T, the imaging data (357-207) of the image (342°) of the object is arrayed.

Regarding the emission light data of the light emitting element 208 at the same time t=3T, the imaging data (356-208) of the image (336°) of the object is arrayed. Regarding the emission light data of the light emitting element 209 at the same time t=3T, the imaging data (355-209) of the image (330°) of the object is arrayed. Regarding the emission light data of the light emitting element 210 at the same time t=3T, the imaging data (354-210) of the image (324°) of the object is arrayed.

Regarding the emission light data of the light emitting element 211 at the same time t=3T, the imaging data (353-211) of the image (318°) of the object is arrayed. Regarding the emission light data of the light emitting element 212 at the same time t=3T, the imaging data (352-212) of the image (312°) of the object is arrayed.

Through this arrangement operation, the emission light data of the light emitting elements 201 to 212 at time t=3T can be created. The created data is emission light data (303-201, 302-202, 301-203, 300-204, 359-205, 358-206, 357-207, 356-208, 355-209, 354-210, 353-211, 352-212).

Then, regarding the emission light data of the light emitting element 201 at time t=4T, the imaging data (304-201) of the image (24°) of the object is arrayed. Regarding the emission light data of the light emitting element 202 at the same time t=4T, the imaging data (303-202) of the image (18°) of the object is arrayed. Regarding the emission light data of the light emitting element 203 at the same time t=4T, the imaging data (302-203) of the image (12°) of the object is arrayed. Regarding the emission light data of the light emitting element 204 at the same time t=4T, the imaging data (301-204) of the image (6°) of the object is arrayed.

Regarding the emission light data of the light emitting element 205 at the same time t=4T, the imaging data (300-205) of the image (0°) of the object is arrayed. Regarding the emission light data of the light emitting element 206 at the same time t=4T, the imaging data (359-206) of the image (354°) of the object is arrayed. Regarding the emission light data of the light emitting element 207 at the same time t=4T, the imaging data (358-207) of the image (348°) of the object is arrayed. Regarding the emission light data of the light emitting element 208 at the same time t=4T, the imaging data (357-208) of the image (342°) of the object is arrayed.

Regarding the emission light data of the light emitting element 209 at the same time t=4T, the imaging data (356-209) of the image (336°) of the object is arrayed. Regarding the emission light data of the light emitting element 210 at the same time t=4T, the imaging data (355-210) of the image (330°) of the object is arrayed. Regarding the emission light data of the light emitting element 211 at the same time t=4T, the imaging data (354-211) of the image (324°) of the object is arrayed. Regarding the emission light data of the light emitting element 212 at the same time t=4T, the imaging data (353-212) of the image (318°) of the object is arrayed.

Through this arrangement operation, the emission light data of the light emitting elements 201 to 212 at time t=4T can be created. The created data is emission light data (304-201, 303-202, 302-203, 301-204, 300-205, 359-206, 358-207, 357-208, 356-209, 355-210, 354-211, 353-212).

Similarly, regarding the emission light data of the light emitting element 201 at time t=58T, the imaging data (358-201) of the image (348°) of the object is arrayed. Regarding the emission light data of the light emitting element 202 at the same time t=58T, the imaging data (357-202) of the image (342°) of the object is arrayed. Regarding the emission light data of the light emitting element 203 at the same time t=58T, the imaging data (356-203) of the image (336°) of the object is arrayed. Regarding the emission light data of the light emitting element 204 at the same time t=58T, the imaging data (355-204) of the image (330°) of the object is arrayed.

Regarding the emission light data of the light emitting element 205 at the same time t=58T, the imaging data (354-205) of the image (324°) of the object is arrayed. Regarding the emission light data of the light emitting element 206 at the same time t=58T, the imaging data (353-206) of the image (318°) of the object is arrayed. Regarding the emission light data of the light emitting element 207 at the same time t=58T, the imaging data (352-207) of the image (312°) of the object is arrayed. Regarding the emission light data of the light emitting element 208 at the same time t=58T, the imaging data (351-208) of the image (306°) of the object is arrayed.

Regarding the emission light data of the light emitting element 209 at the same time t=58T, the imaging data (350-209) of the image (300°) of the object is arrayed. Regarding the emission light data of the light emitting element 210 at the same time t=58T, the imaging data (349-210) of the image (294°) of the object is arrayed. Regarding the emission light data of the light emitting element 211 at the same time t=58T, the imaging data (348-211) of the image (288°) of the object is arrayed. Regarding the emission light data of the light emitting element 212 at the same time t=58T, the imaging data (347-212) of the image (282°) of the object is arrayed.

Through this arrangement operation, the emission light data of the light emitting elements 201 to 212 at time t=58T can be created. The created data is emission light data (358-201, 357-202, 356-203, 355-204, 354-205, 353-206, 352-207, 351-208, 350-209, 349-210, 348-211, 347-212).

Then, regarding the emission light data of the light emitting element 201 at time t=59T, the imaging data (359-201) of the image (354°) of the object is arrayed. Regarding the emission light data of the light emitting element 202 at the same time t=59T, the imaging data (358-202) of the image (348°) of the object is arrayed. Regarding the emission light data of the light emitting element 203 at the same time t=59T, the imaging data (357-203) of the image (342°) of the object is arrayed. Regarding the emission light data of the light emitting element 204 at the same time t=59T, the imaging data (356-204) of the image (336°) of the object is arrayed.

Regarding the emission light data of the light emitting element 205 at the same time t=59T, the imaging data (355-205) of the image (330°) of the object is arrayed. Regarding the emission light data of the light emitting element 206 at the same time t=59T, the imaging data (354-206) of the image (324°) of the object is arrayed. Regarding the emission light data of the light emitting element 207 at the same time t=59T, the imaging data (353-207) of the image (318°) of the object is arrayed. Regarding the emission light data of the light emitting element 208 at the same time t=59T, the imaging data (352-208) of the image (312°) of the object is arrayed.

Regarding the emission light data of the light emitting element 209 at the same time t=59T, the imaging data (351-209) of the image (306°) of the object is arrayed. Regarding the emission light data of the light emitting element 210 at the same time t=59T, the imaging data (350-210) of the image (300°) of the object is arrayed. Regarding the emission light data of the light emitting element 211 at the same time t=59T, the imaging data (349-211) of the image (294°) of the object is arrayed. Regarding the emission light data of the light emitting element 212 at the same time t=59T, the imaging data (348-212) of the image (288°) of the object is arrayed.

Through this arrangement operation, it is possible to create the emission light data (359-201, 358-202, 357-203, 356-204, 355-205, 354-206, 353-207, 352-208, 351-209, 350-210, 349-211, 348-212) of the light emitting elements 201 to 212 at time t=59T.

Only by such arrangement operation processing, the emission light data (hereinafter, referred to as image data Din) for three-dimensional image display applicable to the multi-directional three-dimensional image display device 10 can be easily created. In addition, the image data Din for three-dimensional image display can be created in a short time by a small signal processing circuit by making the light emitting unit U1 have an internal structure in which the creation of the image data Din is taken into consideration.

In the above example, a method of taking image of an actual imaging subject (object) with a camera has been described. However, the image data Din for three-dimensional image display may be generated by computer graphics without being limited thereto. Also in display of a virtual object using computer graphics, the image data Din can be easily created by rendering an image in a direction from each of the sixty viewing points 300 to 359 to the rotary shaft 103 and performing the same processing.

Here, rendering means visualizing the information regarding an object, a figure, and the like given as numeric data by calculation. In rendering of three-dimensional graphics, an image is created by performing shading, and the like in consideration of the position of a viewing point, the number, positions, or types of light sources, the shape of an object or the coordinates of an apex, and a material. Techniques of the rendering include a ray tracing method, a radiosity method, and the like.

[Example of the Configuration of a Control System]

Figure 18:
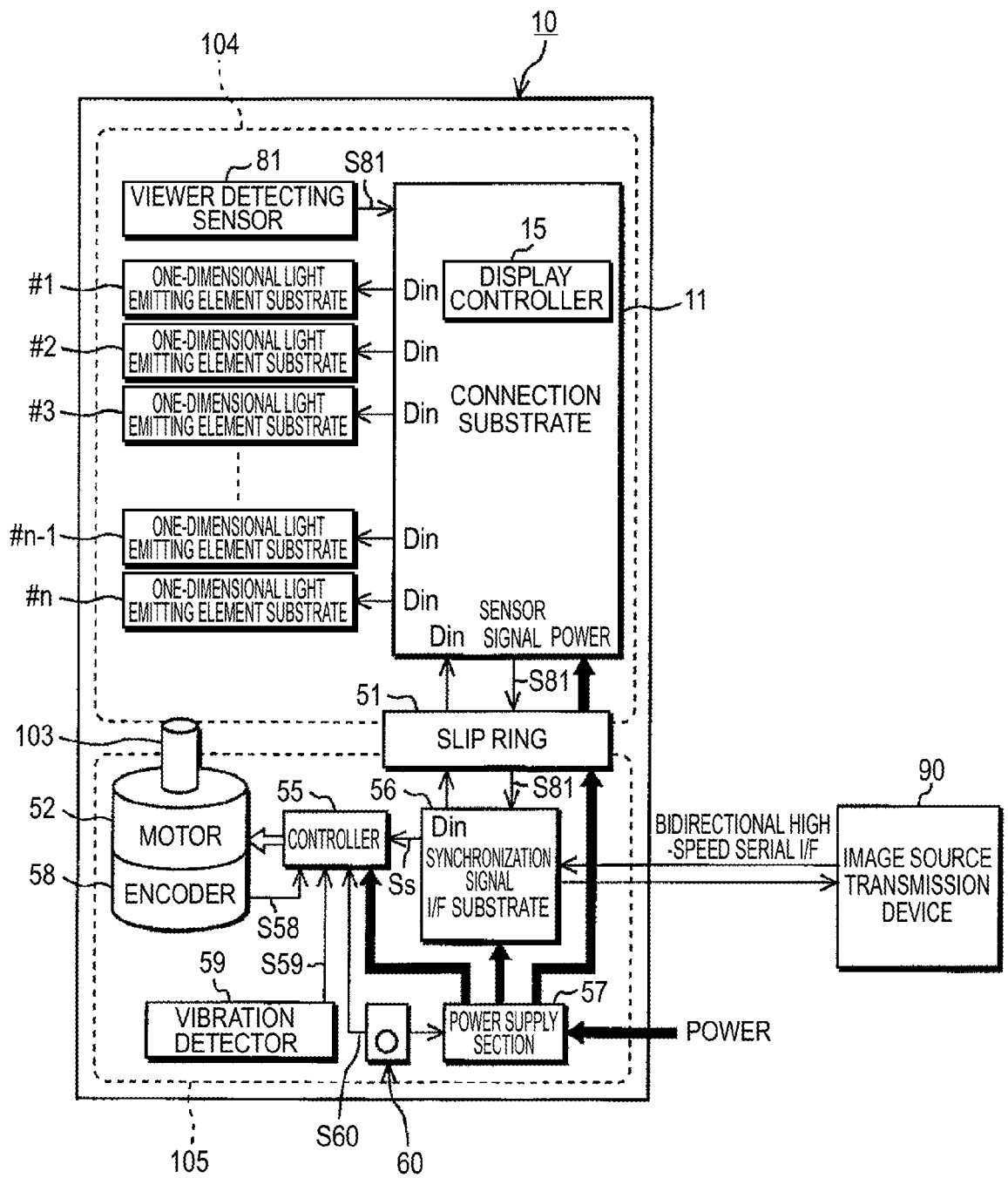
FIG. 18 is a block diagram showing an example of the configuration of a control system of the multi-directional three-dimensional image display device.

Next, an example of the configuration of a control system of the multi-directional three-dimensional image display device 10 will be described. FIG. 18 is a block diagram showing an example of the configuration of the control system of the multi-directional three-dimensional image display device 10. The three-dimensional image display device in this example, which makes possible watching from its entire periphery, has a structure in which light beams are output to many regions where there is no viewer. Accordingly, it is concerned that useless power consumption is large in terms of power efficiency. For this reason, an improvement in the power efficiency and a reduction in the amount of information are realized through viewer detection.

An image source transmission device 90 is connected to the multi-directional three-dimensional image display device 10 shown in FIG. 18, and the serial image data Din for three-dimensional image display is input. The control system of the multi-directional three-dimensional image display device 10 is divided into the rotating section 104 and the installation frame 105, and these two control systems are electrically connected to each other through the slip ring 51.

The control system in the rotating section 104 has the connection substrate 11. "k" one-dimensional light emitting element substrates #k (k=1 to n), which form n lines, and one viewer detecting sensor 81 are connected to the connection substrate 11. The one-dimensional light emitting element substrates #1 to #n are configured to make light emitting elements at m rows to emit light sequentially on the basis of the serial image data Din for three-dimensional image display of n lines (refer to FIG. 19).

The display controller 15 is mounted on the connection substrate 11. The display controller 15 inputs the image data Din for three-dimensional images in units of one pixel and controls the emission intensity of the light emitting element in units of one pixel on the basis of the image data Din. The serial image data Din the emission intensity of which has been adjusted in units of one pixel is transmitted to the IC 35 for serial-to-parallel conversion and driver and the like of the one-dimensional light emitting element substrate #1 shown in FIG. 5. Through this control, the emission intensity of the two-dimensional light emitting element array 101 can be controlled in units of one pixel.

In this example, since the multi-directional three-dimensional image display device 10 is a light reproduction type display device, a large amount of image data Din is transmitted to the IC 35 and the like of the one-dimensional light emitting element substrate #1 in order to perform display over the entire periphery. However, transmitting the image data Din which is not viewed is useless in terms of a transmission band or image creation. Therefore, light is output in a pinpoint manner only to a region where a viewer is present.

The viewer detecting sensor 81 is connected to the connection substrate 11. The viewer detecting sensor 81 detects a viewer (for example, viewer's pupils), who is watching the three-dimensional image, outside the rotating section 104 rotated by the motor 52 shown in FIG. 1, and generates a viewer detection signal S81. The viewer detection signal S81 is output to the display controller 15 and is used when determining whether or not there is a viewer.

The display controller 15 receives the viewer detection signal S81 from the viewer detecting sensor 81 to acquire a viewer detection value, compares the viewer detection value with a predetermined viewer determination value, and controls the emission intensity of the light emitting element according to the comparison result. Specifically, the two-dimensional light emitting element array 101 is made to operate in a section where a viewer detection value equal to or larger than the viewer determination value is detected. In a section where a viewer detection value less than the viewer determination value is detected, the display controller 15 controls the emission intensities of the one-dimensional light emitting element substrates #1 to #n to stop the two-dimensional light emitting element array 101.

The viewer detecting sensor 81 corresponds to one specific example of an "object detector" and a "viewer detector" in one embodiment of the present invention.

Thus, by adopting a structure in which light is output only to a region where a viewer is present and detecting whether or not there is a viewer by using the viewer detecting sensor 81, the emission intensities of the one-dimensional light emitting element substrates #1 to #n can be controlled in a region where a viewer is present. Since the emission of the one-dimensional light emitting element substrates #1 to #n can be stopped in other regions, it is possible to reduce power consumption. Therefore, a three-dimensional image can be displayed with much better power efficiency than in a flat panel display in the related art. Moreover, since the amount of information to be transmitted can be significantly reduced, a transmission circuit or an image creating circuit becomes small. As a result, the cost can be reduced.

On the other hand, a driving control system is provided in the installation frame 105. This driving control system includes a controller 55, an I/F substrate 56, a power supply section 57, and an encoder 58. The I/F substrate 56 is connected to the external image source transmission device 90 through a bidirectional high-speed serial interface (I/F). The image source transmission device 90 outputs the serial image data Din for three-dimensional image display based on the bidirectional high-speed serial I/F specification to the connection substrate 11 through the I/F substrate 56 and the slip ring 51.

The controller 55 corresponds to one specific example of a "driving controller" in one embodiment of the present invention.

For example, the multi-directional three-dimensional image display device 10 transmits the region of a viewer, which has been detected by the viewer detecting sensor 81, sequentially to the image source transmission device 90. The image source transmission device 90 transmits only a corresponding region image to the multi-directional three-dimensional image display device 10. In this example, when a plurality of viewers watch a three-dimensional image around the multi-directional three-dimensional image display device 10, image sources which are different for every watching area can be reproduced. In this case, each viewer may select an image source to be reproduced, or it is possible to specify a viewer by facial recognition using a camera and to reproduce a video source set beforehand (refer to FIG. 33B). If this is used for digital signage applications, a plurality of different information items can be sent out by one multi-directional three-dimensional image display device 10.

Here, digital signage refers to various kinds of information display using electronic data. The digital signage is suitable for displays for customer attraction, advertisement, and sales promotion which are set as public displays in stores/commercial facilities, transport facilities, and the like. For example, if the display area corresponding to one round of 360° of the multi-directional three-dimensional image display device 10 is divided into three watching areas of 120° and different image data is reproduced in the respective watching areas, it is possible to watch different display information items in the three watching areas.

For example, if a three-dimensional image of a front side of a first character is displayed in the display area (0° to 120° on the front side of the multi-directional three-dimensional image display device 10, a viewer located at the front side can watch the three-dimensional image of the front side of the first character. Similarly, if a three-dimensional image of a front side of a second character is displayed in the display area (121° to 240°) on the right side, a viewer located at the right side can watch the three-dimensional image of the front side of the second character. Similarly, if a three-dimensional image of a front side of a third character is displayed in the display area (241° to 360°) on the left side, a viewer located at the left side can watch the three-dimensional image of the front side of the third character. In this way, a plurality of different display information items can be sent out by one multi-directional three-dimensional image display device 10 or the like.

The controller 55 is connected to the I/F substrate 56. The image source transmission device 90 outputs a synchronization signal Ss to the controller 55 through the I/F substrate 56. The motor 52, the encoder 58, and a switch section 60 are connected to the controller 55. The encoder 58 is attached to the motor 52, and detects the rotation speed of the motor 52 and outputs to the controller 55 a speed detection signal S58 indicating the rotation speed of the rotating section 104. The switch section 60 outputs a switch signal S60 to the controller 55 when a power supply is turned on. The switch signal S60 indicates the information regarding power OFF or power ON. The switch section 60 is on/off controlled by the user.

The encoder 58 corresponds to one specific example of a "rotation detector" in one embodiment of the present invention.

The controller 55 controls the motor 52 to rotate at a predetermined rotation (modulation) speed on the basis of the synchronization signal Ss and the speed detection signal S58. The power supply section 57 is connected to the slip ring 51, the controller 55, and the I/F substrate 56 and supplies power for substrate driving to the connection substrate 11, the controller 55, and the I/F substrate 56.

In this example, the controller 55 controls the rotating section 104 to quickly stop the rotation operation when the amount of error of the servo control system, which controls the rotation of the rotating section 104, exceeds a predetermined value and uneven rotation occurs accordingly. The encoder 58 detects the rotation of the rotating section 104 rotated by the motor 52.

The controller 55 compares the rotation detection value acquired from the encoder 58 with a predetermined rotation reference value and controls the motor 52 according to the comparison result. Specifically, when the rotation detection value equal to or larger than the rotation reference value is detected, the controller 55 controls the motor 52 to stop the rotation operation of the rotating section 104. Thus, according to the multi-directional three-dimensional image display device 10, the rotation operation can be quickly stopped if the amount of error of the servo control system, which controls the rotation of the rotating section 104, exceeds the predetermined value. Therefore, since excessive rotation of the rotating section 104 is prevented in advance, safety can be ensured. As a result, it is possible to prevent the multi-directional three-dimensional image display device 10 from being damaged.

Figure 19:
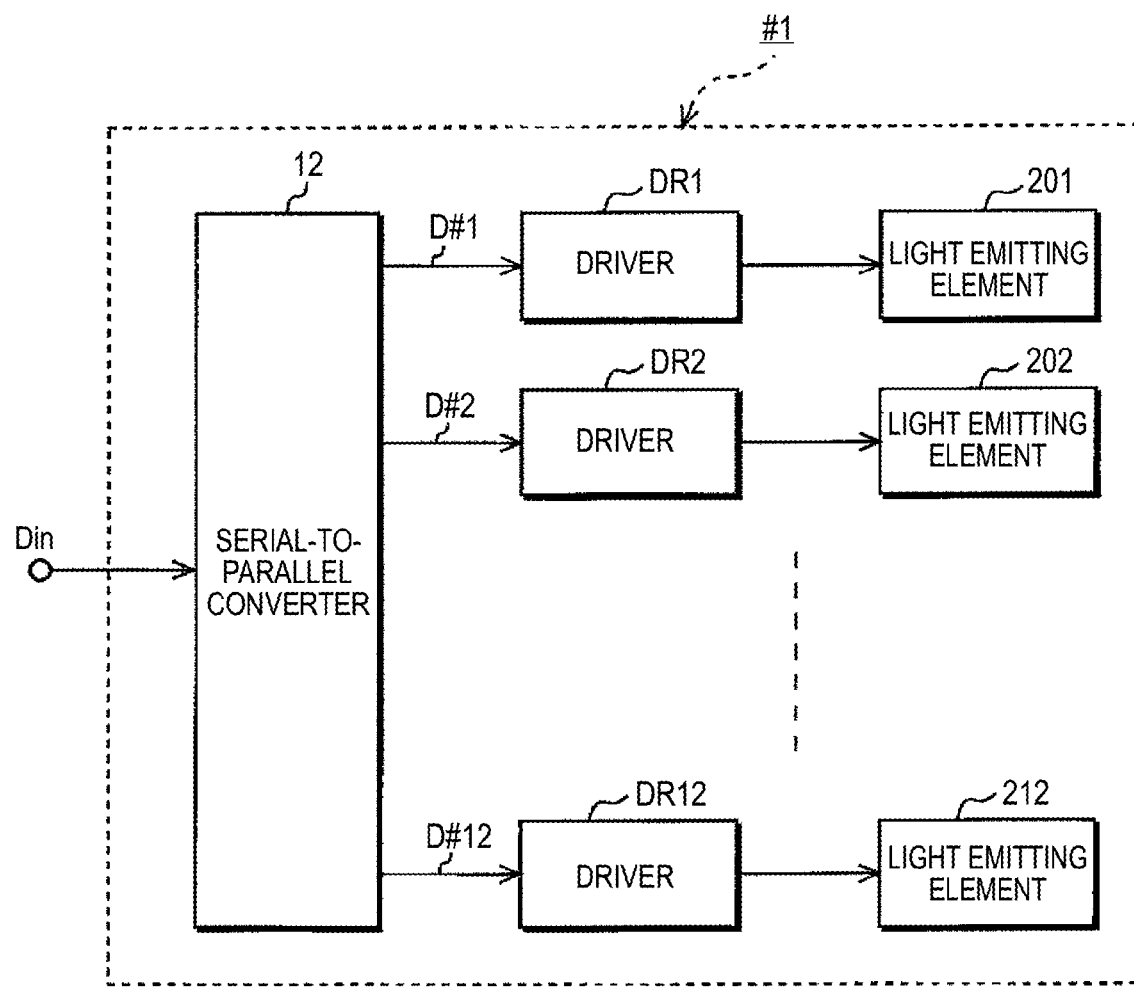
FIG. 19 is a block diagram showing an example of the configuration of one one-dimensional light emitting element substrate.

FIG. 19 is a block diagram showing an example of the configuration of one one-dimensional light emitting element substrate #1. The one-dimensional light emitting element substrate #1 shown in FIG. 19 is configured to include one serial-to-parallel converter 12, "m" drivers DRj (j=1 to m), and "m" light emitting elements 20j (j=1 to m). In this example, the case of m=12 (rows) will be described. The serial-to-parallel converter 12 is connected to the connection substrate 11 and converts the serial image data Din for three-dimensional image display of the first line into parallel image data D#j for three-dimensional image display of first to twelfth lines (j=1 to m).

The twelve drivers DR1 to DR12 (driving circuits) are connected to the serial-to-parallel converter 12. The light emitting element 201 of the first row is connected to the driver DR1. The light emitting element 201 emits light on the basis of the image data D#1 for three-dimensional image display of the first row. The light emitting element 202 of the second row is connected to the driver DR2. The light emitting element 202 emits light on the basis of the image data D#2 for three-dimensional image display of the second row.

Similarly, the light emitting elements 203 to 212 of the third to twelfth rows are connected to the drivers DR3 to DR12, respectively. The light emitting elements 203 to 212 emit light on the basis of the image data D#3 to D#12 for three-dimensional image display of the third to twelfth rows. As a result, the twelve light emitting elements 201 to 212 emit light in a sequential manner on the basis of the serial image data Din for three-dimensional image display of the first line. In this example, one serial-to-parallel converter 12 and "m" drivers DRj form the IC 35 for serial-to-parallel conversion and driver shown in FIG. 5. Since the other one-dimensional light emitting element substrates #2 to #n also have the configuration and the function of the one-dimensional light emitting element substrate #1, an explanation thereof will be omitted.

[Example of Three-Dimensional Image Display]

Figure 20:
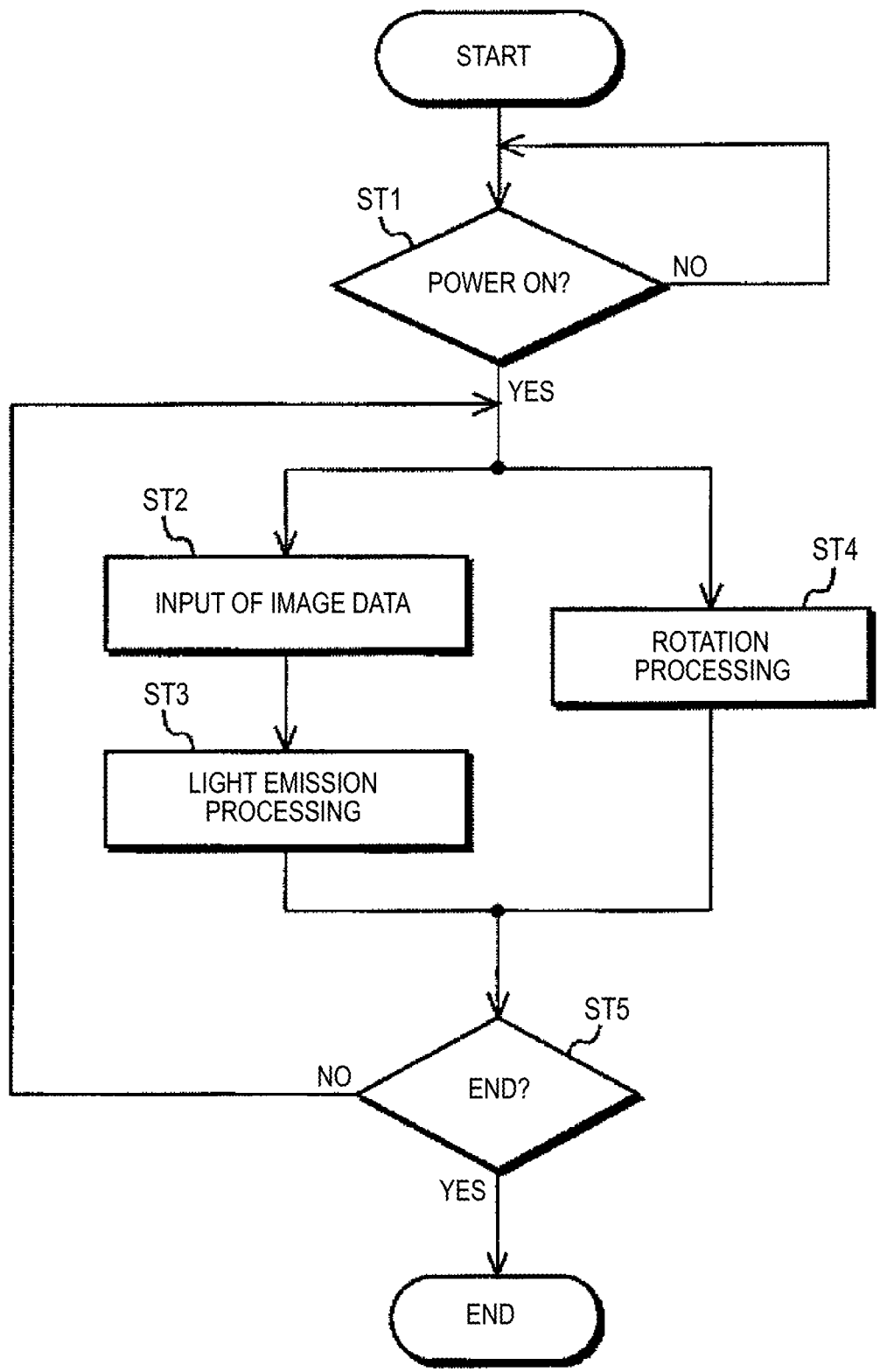
FIG. 20 is an operation flow chart showing an example of three-dimensional image display in the multi-directional three-dimensional image display device.

Next, an example of the operation of the multi-directional three-dimensional image display device 10 in the three-dimensional image display method according to the embodiment of the present invention will be described. FIG. 20 is an operation flow chart showing an example of three-dimensional image display in the multi-directional three-dimensional image display device 10. According to the multi-directional three-dimensional image display device 10, the rotating section 104 has a predetermined aperture and a predetermined length and also has the slit 102 in a direction of the peripheral surface parallel to the rotary shaft 103, as shown in FIG. 1. In this example, the case is assumed in which the two-dimensional light emitting element array 101 is attached to the rotating section 104 and a three-dimensional image is displayed by rotating the rotating section 104.

The image data Din for a three-dimensional image applied in this case is obtained by imaging any imaging subject at N places at equal distances over the entire periphery, for example, using one imaging system which has "m (rows)×n (columns)" imaging elements. The two-dimensional image data Din corresponding to "N places×m (rows)" obtained by this imaging is input. In addition, by one light emitting unit U1 formed by the two-dimensional light emitting element array 101 and the slit 102, a three-dimensional image is reproduced over the entire periphery of a imaging subject. When observation is performed in a direction from any viewing position, which is equivalent to one of the "N" imaging positions, toward the rotary shaft 103, the display controller 15 controls the light emission of a plurality of light emitting elements such that, for example, a planar image based on the two-dimensional image data Din is formed in the rotating section 104 by the locus of light emitting points formed by the plurality of light emitting elements.

Under these operating conditions, first, the controller 55 of the multi-directional three-dimensional image display device 10 detects whether or not the power supply has been turned on in step ST1. In this case, the user turns on the switch section 60 when viewing a three-dimensional image. When the power supply is turned on, the switch section 60 outputs to the controller 55 the switch signal S60 indicating power ON information. The controller 55 executes three-dimensional image display processing when power ON information based on the switch signal S60 is detected.

Then, in step ST2, the connection substrate 11 is input with the image data Din for a three-dimensional image which is to be supplied to the two-dimensional light emitting element array 101 attached to the rotating section 104. As shown in FIG. 16, the image data Din is set in the order in which the light emitting elements 201 to 212 of twelve (m=12) rows in the two-dimensional light emitting element array 101 continuously reproduce the sixty (N=60) imaging positions and in the order in which sixty imaging positions continue. In the image source transmission device 90, the corresponding image data Din for three-dimensional image display is extracted from the two-dimensional image data Din corresponding to "60 places×12 (rows)".

The image source transmission device 90 executes arrangement operation processing of rearranging the arrangement of data in units of line data in the slit direction (longitudinal direction) shown in FIG. 17. Then, the image source transmission device 90 converts the collected imaging data into the emission light data for every emission timing of the light emitting elements 201 to 212 at twelve rows in the two-dimensional light emitting element array 101. The emission light data reproduced at time t=0 to t=59T, which has been obtained as described above, is the image data Din for a three-dimensional image. The image data Din is supplied from the image source transmission device 90 to the installation frame 105 and is then transmitted to the two-dimensional light emitting element array 101 of the rotating section 104 through the slip ring 51, in the installation frame 105, together with electric power.

Then, in step ST3, the light emitting elements 201 to 212 emit light on the basis of the image data Din. Since the arc shaped light emitting surface is provided in the two-dimensional light emitting element array 101 in this example, light beams emitted from the light emitting surface are condensed in the direction of the slit 102 (refer to FIG. 16). Light beams output from the light emitting elements 201 to 212 are condensed near the slit 102 of the rotating section 104.

In addition, in step ST4, the rotating section 104 to which the two-dimensional light emitting element array 101 is attached is rotated at a predetermined speed. In this case, the motor 52 in the installation frame 105 rotates the turntable 42 at a predetermined rotation (modulation) speed. By the rotation of the turntable 42, the rotating section 104 rotates.

The encoder 58 attached to the motor 52 detects the rotation speed of the motor 52 and outputs the speed detection signal S58, which indicates the rotation speed of the rotating section 104, to the controller 55. The controller 55 controls the motor 52 to rotate at the predetermined rotation (modulation) speed on the basis of the speed detection signal S58. Accordingly, the rotating section 104 can be rotated at the predetermined modulation rate. In the multi-directional three-dimensional image display device 10, light beams of a three-dimensional image formed with the rotary shaft 103 of the rotating section 104 as a reference leak from the inside of the rotating section 104 to the outside through the slit 102. These light beams leaking to the outside provide a three-dimensional image to a plurality of viewing points.

Then, in step ST5, the controller 55 determines whether to end the three-dimensional image display processing. For example, the controller 55 ends the three-dimensional image display processing by detecting power OFF information based on the switch signal S60 from the switch section 60. When power OFF information from the switch section 60 is not detected, the process returns to steps ST2 and ST4 to continue the three-dimensional image display processing.

Thus, according to the multi-directional three-dimensional image display device 10 as the first embodiment, light beams output from the light emitting elements 201 to 212 are condensed near the slit 102 of the rotating section 104. By this condensing, the light beams of the three-dimensional image formed with the rotary shaft 103 of the rotating section 104 as a reference leak from the inside of the rotating section 104 to the outside through the slit 102.

Accordingly, since the light emitting surface of the two-dimensional light emitting element array 101 can be rotation-scanned with a viewing point of a viewer as a reference, the three-dimensional image formed with the rotary shaft 103 as a reference can be observed at the outside of the rotating section 104. As a result, it is possible to easily realize the multi-directional three-dimensional image display device which has a simple structure compared with a three-dimensional image display mechanism based on a method in the related art and which makes possible watching from its entire periphery with good power efficiency. In addition, since various 3D polygons, which were not possible with flat panel displays in the related art, can be displayed, a three-dimensional character brand service may be provided.

In the above embodiment, the case has been described in which the image data Din is transmitted to the two-dimensional light emitting element array 101 through the slip ring 51 together with electric power. However, the present invention is not limited thereto. The image data Din may also be transmitted from the installation frame 105 to the rotating section 104 together with electric power using a radio communications system.

For example, a coil for power reception or a wireless receiver for image signals is provided in the rotating section 104. In the installation frame 105, a coil for power transmission or a wireless transmitter for image signals is provided. A device with an antenna is used as each of the wireless receiver and the wireless transmitter. A power supply line is connected to the coil for power reception, and this power supply line is connected to the two-dimensional light emitting element array 101. A signal line is connected to the wireless receiver, and this signal line is connected to the two-dimensional light emitting element array 101.

In the installation frame 105, the coil for power transmission is disposed at the position linked with the coil for power reception of the rotating section 104. A cable for power supply is connected to the coil for power transmission so that the electric power is supplied from the outside. Similarly, the wireless transmitter is disposed at the position where communication with the wireless receiver of the rotating section 104 is possible. A cable for image signals is connected to the wireless transmitter so that the image data Din is supplied from the image source transmission device 90 or the like.

Then, the electric power supplied from the outside can be transmitted to the two-dimensional light emitting element array 101 by electromagnetic induction. In addition, the image data Din supplied from the image source transmission device 90 can be transmitted to the two-dimensional light emitting element array 101 through electromagnetic waves. In addition, the antenna of the wireless receiver may also be used as a coil for power reception, and the antenna of the wireless transmitter may also be used as a coil for power transmission. In this case, it is preferable to set the frequency of a voltage (current) supplied by electromagnetic induction to the carrier frequency of an electromagnetic wave. Undoubtedly, a battery, image data, or the like may be built into the rotating section 104. Preferably, the image data Din is written in the storage device and is read into the two-dimensional light emitting element array 101 in the rotating section 104.

When there is only one light emitting unit U1, a phenomenon that it vibrates due to deflection is considered. In this case, it is preferable to provide a balancer and to match the center of gravity of the balancer with the rotary shaft 103. Preferably, the balancer has almost the same weight as the two-dimensional light emitting element array 101 and is disposed at the position shifted by 180° from the position of the two-dimensional light emitting element array 101. Undoubtedly, the number of balancers is not limited to 1, and one balancer may be disposed every 120°. Through this configuration, the rotating section 104 can be rotated smoothly.

In addition, the case is assumed in which, for example, a balancer deviates while operating the multi-directional three-dimensional image display device 10 to rotate and accordingly, it vibrates due to deflection, or the case is assumed in which large vibration or the like is given from the outside while operating the multi-directional three-dimensional image display device 10 to rotate. In such cases, since the rotating section 104 rotates in a state where the center of gravity is not matched with the rotary shaft 103, there is a concern about a situation (damage) where it is difficult to maintain the rotating section 104 or the two-dimensional light emitting element array 101 in a predetermined shape.

In this case, it is preferable that a vibration detector 59, such as an acceleration sensor or a vibration sensor, is attached to the installation frame 105 and the controller 55 controls the rotating section 104 to quickly stop the rotation operation when the amount of vibration equal to or larger than the set value is detected.

The multi-directional three-dimensional image display device 10 shown in FIG. 18 includes the controller 55 and the vibration detector 59. The vibration detector 59 detects vibration of the rotating section 104, which is rotated by the motor 52, on the installation frame 105 and outputs a vibration detection signal S59. The controller 55 compares the vibration detection value based on the vibration detection signal S59 acquired from the vibration detector 59 with the predetermined vibration reference value which is set and controls the motor 52 according to the comparison result. Specifically, when the vibration detection value equal to or larger than the vibration reference value is detected, the controller 55 controls the motor 52 to stop the rotation operation of the rotating section 104.

Thus, it is possible to detect the vibration of the installation frame 105 using the vibration detector 59, such as an acceleration sensor, and to quickly stop the rotation operation if the amount of vibration exceeds a predetermined value. Therefore, since excessive rotation of the rotating section 104 is prevented in advance, safety can be ensured. As a result, it is possible to prevent the multi-directional three-dimensional image display device 10 from being damaged.

Second Embodiment

[Example of the Configuration of a Multi-Directional Three-Dimensional Image Display Device 20]

Figure 21A:
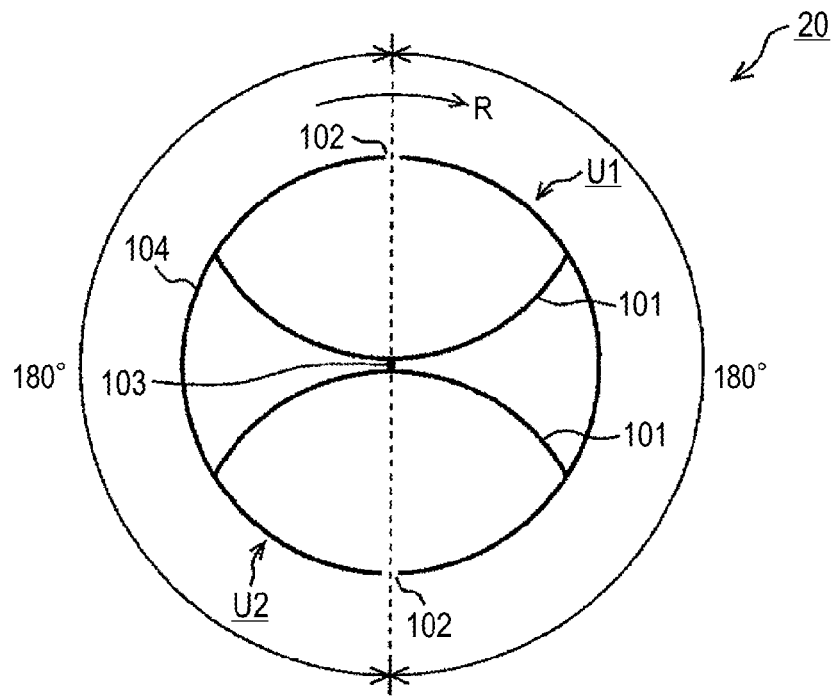
FIG. 21A is an explanatory view showing an example of the configuration of a multi-directional three-dimensional image display device according to a second embodiment.
Figure 21B:
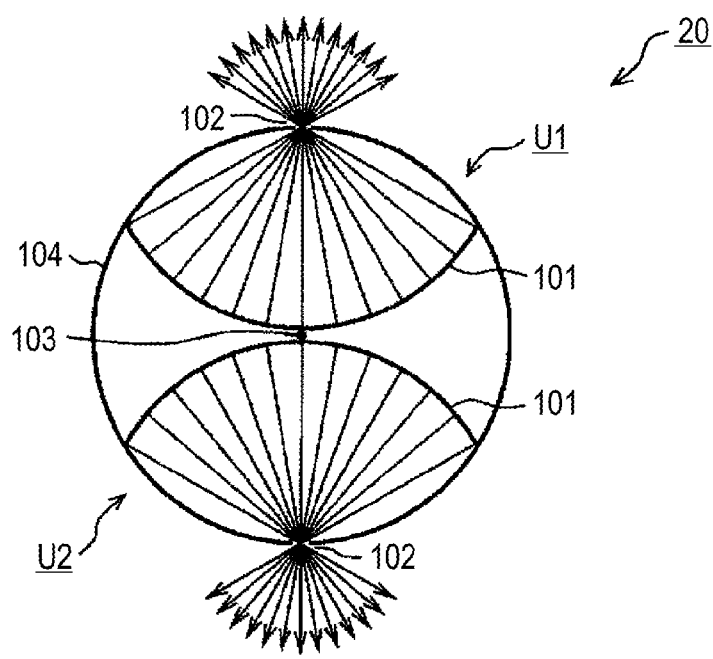
FIG. 21B is an explanatory view showing an example of the operation.

FIG. 21A is a sectional view showing an example of the configuration of a multi-directional three-dimensional image display device 20 as a second embodiment, and FIG. 21B is an explanatory view showing an example of the operation. Regarding the number of light emitting units U1 formed by the two-dimensional light emitting element array 101 and the slit 102, various configurations may be adopted other than the configuration described above. For example, a configuration may also be considered in which two sets of light emitting units U1 using the cylindrical two-dimensional light emitting element array 101 are used.

The multi-directional three-dimensional image display device 20 shown in FIG. 21A adopts a light reproduction method and includes two light emitting units U1 and U2. The rotating section 104 rotates in a direction of an arrow R or the opposite direction with the rotary shaft 103 as the rotation center.

In the multi-directional three-dimensional image display device 20, two slits 102 are provided at equal angles (180°) in the external body 41 with the rotary shaft 103 of the rotating section 104 as the origin. The light emitting unit U1 has one slit 102, and the light emitting unit U2 has the other slit 102. The two-dimensional light emitting element array 101 of the light emitting unit U1 is disposed between the external body 41 and the rotary shaft 103 such that the light emitting surface faces the one slit 102 of the rotating section 104. The two-dimensional light emitting element array 101 of the light emitting unit U2 is disposed between the external body 41 and the rotary shaft 103 such that the light emitting surface faces the other slit 102 of the rotating section 104.

In the multi-directional three-dimensional image display device 20, the slit 102 parallel to the rotary shaft 103 is provided in the external body 41 before the light emitting surface of the two-dimensional light emitting element array 101 of the light emitting unit U1. Also in this example, a structure is adopted in which light beams emitted from the two-dimensional light emitting element array 101 do not leak from portions other than the slit positions. The other light emitting unit U2 is similarly formed.

[Example of Operation]

Due to the two-slit structure, the emission angle of light, which is emitted from the two-dimensional light emitting element array 101 of the light emitting unit U1 shown in FIG. 21B, in the left and right direction is largely restricted by the slit 102. Similarly, the emission angle of light, which is emitted from the two-dimensional light emitting element array 101 of the light emitting unit U2, in the left and right direction is largely restricted by the slit 102. By rotation scanning of the rotating section 104 with such a two-slit structure with respect to a viewing point, the light reproduction surface with a cylindrical shape can be formed. Light beams of a three-dimensional image formed with the rotary shaft 103 as a reference leak from the inside of the rotating section 104 to the outside through the two slits 102.

Thus, according to the multi-directional three-dimensional image display device 20 as the second embodiment, light beams from the two two-dimensional light emitting element arrays 101 are emitted in different directions. Accordingly, it is possible to reproduce light beams corresponding to two vertical lines regulated by the two slits 102. As a result, it is possible to observe a three-dimensional image with high resolution which is formed by the light beams emitted from the two two-dimensional light emitting element arrays 101.

Third Embodiment

[Example of the Configuration of a Multi-Directional Three-Dimensional Image Display Device 30]

Figure 22A:
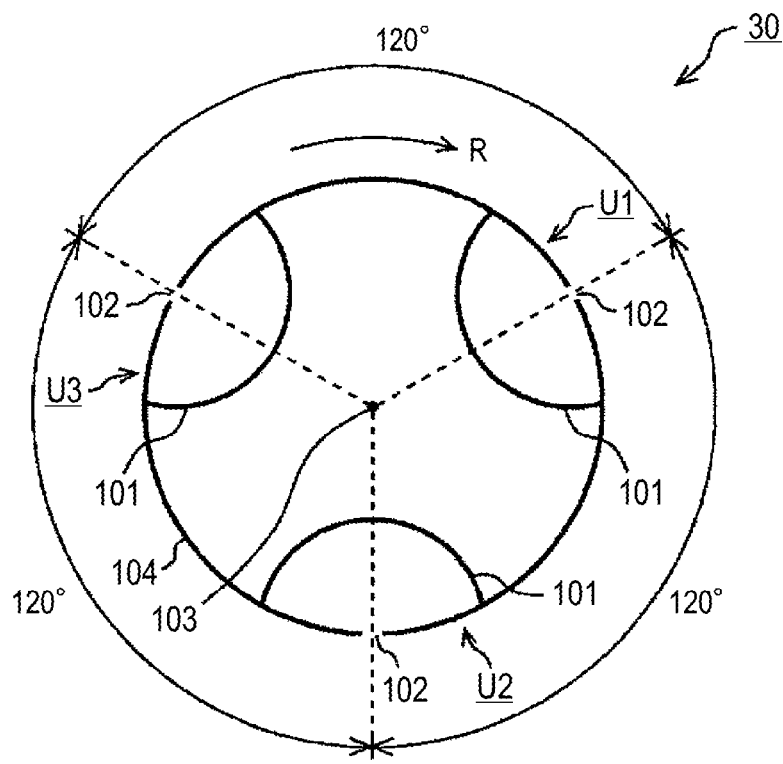
FIG. 22A is an explanatory view showing an example of the configuration of a multi-directional three-dimensional image display device according to a third embodiment.
Figure 22B:
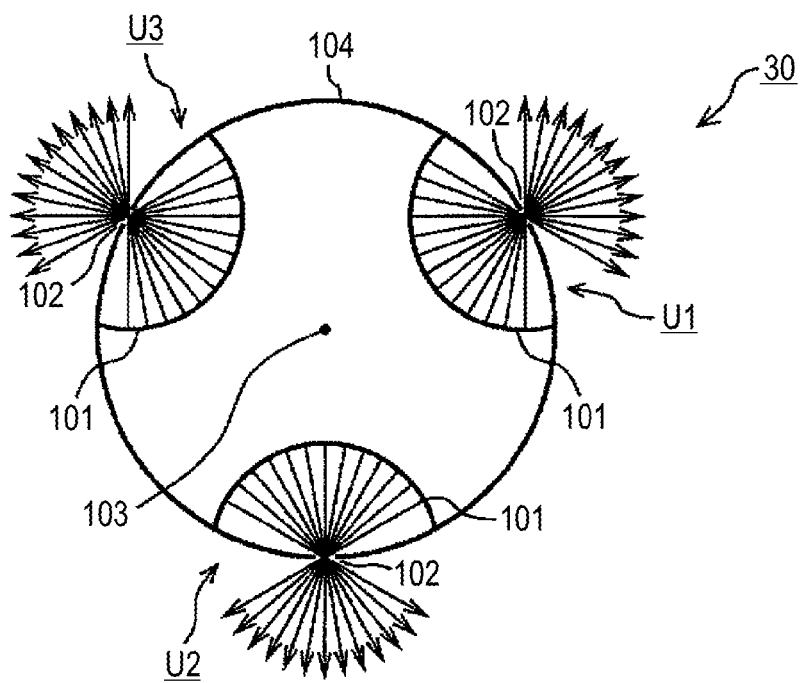
FIG. 22B is an explanatory view showing an example of the operation.

FIG. 22A is a sectional view showing an example of the configuration of the multi-directional three-dimensional image display device 30 as a third embodiment, and FIG. 22B is an explanatory view showing an example of the operation. In the present embodiment, several two-dimensional light emitting element arrays 101 of single colors with different wavelengths are mounted, so that color display can be executed without complicating the structure of the two-dimensional light emitting element array 101.

The multi-directional three-dimensional image display device 30 shown in FIG. 22A adopts a light reproduction method and includes three light emitting units U1, U2 and U3. The rotating section 104 rotates in a direction of an arrow R or the opposite direction with the rotary shaft 103 as the rotation center. In the multi-directional three-dimensional image display device 30, three slits 102 are provided at equal angles (120°) in the external body 41 with the rotary shaft 103 of the rotating section 104 as the origin. The light emitting unit U1 has the first slit 102, the light emitting unit U2 has the second slit 102, and the light emitting unit U3 has the third slit 102.

In this example, the two-dimensional light emitting element array 101 is disposed between the rotary shaft 103 of the rotating section 104 and the slit 102 such that the light emitting surface faces the slit 102 of the rotating section 104. For example, the two-dimensional light emitting element array 101 of the light emitting unit U1 is disposed between the external body 41 and the rotary shaft 103 such that the light emitting surface faces the first slit 102 of the rotating section 104.

The two-dimensional light emitting element array 101 of the light emitting unit U2 is disposed between the external body 41 and the rotary shaft 103 such that the light emitting surface faces the second slit 102 of the rotating section 104. The two-dimensional light emitting element array 101 of the light emitting unit U3 is disposed between the external body 41 and the rotary shaft 103 such that the light emitting surface faces the third slit 102 of the rotating section 104. Light emitting elements for different wavelengths are mounted in the three two-dimensional light emitting element arrays 101. Accordingly, color display of a three-dimensional image is executed by combining light beams with different wavelengths emitted from the three two-dimensional light emitting element arrays 101.

In the multi-directional three-dimensional image display device 30, the slit 102 parallel to the rotary shaft 103 is provided in the external body 41 before the light emitting surface of the two-dimensional light emitting element array 101 of the light emitting unit U1. Also in this example, a structure is adopted in which light beams emitted from the two-dimensional light emitting element array 101 do not leak from portions other than the slit positions. The other light emitting units U2 and U3 are similarly formed.

[Example of Operation]

Due to the three-slit structure, the emission angle of light, which is emitted from the two-dimensional light emitting element array 101 of the light emitting unit U1 shown in FIG. 22B, in the left and right direction is largely restricted by the slit 102. The emission angle of light, which is emitted from the two-dimensional light emitting element array 101 of the light emitting unit U2, in the left and right direction is largely restricted by the slit 102. Similarly, the emission angle of light, which is emitted from the two-dimensional light emitting element array 101 of the light emitting unit U3, in the left and right direction is largely restricted by the slit 102.

By rotation scanning of the rotating section 104 with such a three-slit structure with respect to a viewing point, the light reproduction surface with a cylindrical shape can be formed. Light beams of a three-dimensional image formed with the rotary shaft 103 as a reference leak from the inside of the rotating section 104 to the outside through the three slits 102.

Thus, according to the multi-directional three-dimensional image display device 30 as the third embodiment, light beams from the three two-dimensional light emitting element arrays 101 are emitted in different directions. Accordingly, it is possible to reproduce light beams corresponding to three vertical lines regulated by the three slits 102. As a result, it is possible to observe a three-dimensional color image with high resolution which is formed by light beams of, for example, R, G, and B colors emitted from the three two-dimensional light emitting element arrays 101 for different wavelengths.

Fourth Embodiment

[Example of the Configuration of a Multi-Directional Three-Dimensional Image Display Device 40]

Figure 23A:
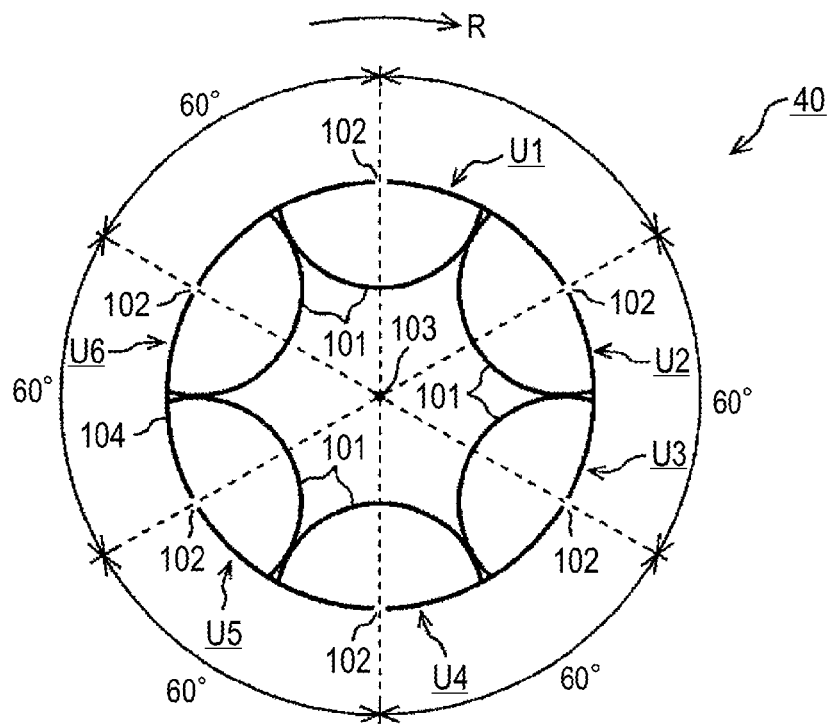
FIG. 23A is an explanatory view showing an example of the configuration of a multi-directional three-dimensional image display device according to a fourth embodiment.
Figure 23B:
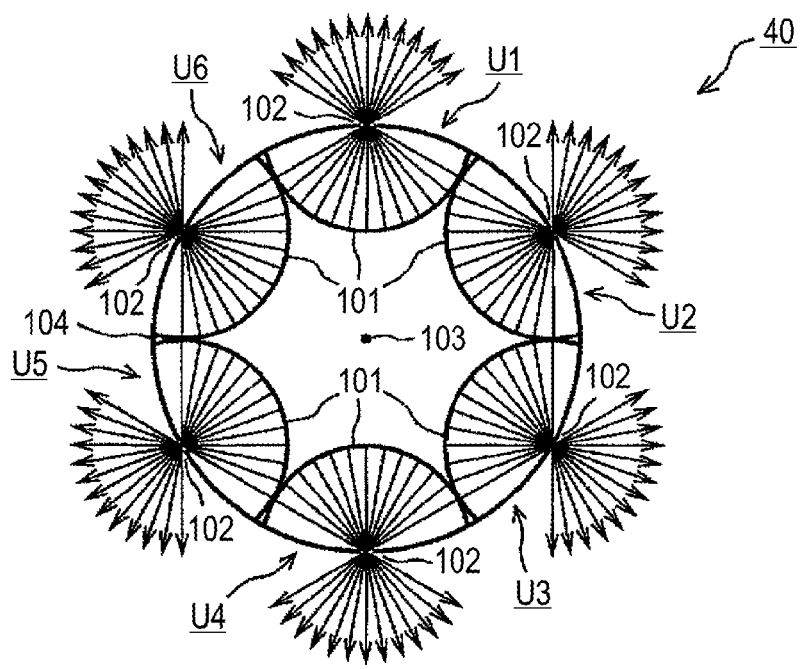
FIG. 23B is an explanatory view showing an example of the operation.

FIG. 23A is a sectional view showing an example of the configuration of the multi-directional three-dimensional image display device 40 as a fourth embodiment, and FIG. 23B is an explanatory view showing an example of the operation. The multi-directional three-dimensional image display device 30 shown in FIG. 22A adopts a light reproduction method and includes six light emitting units U1 to U6. The rotating section 104 rotates in a direction of an arrow R or the opposite direction with the rotary shaft 103 as the rotation center.

In the multi-directional three-dimensional image display device 40, six slits 102 are provided at equal angles (60°) in the external body 41 with the rotary shaft 103 of the rotating section 104 as the origin. The light emitting unit U1 has the first slit 102, the light emitting unit U2 has the second slit 102, and the light emitting unit U3 has the third slit 102. The light emitting unit U4 has the fourth slit 102, the light emitting unit U5 has the fifth slit 102, and the light emitting unit U6 has the sixth slit 102.

In this example, the two-dimensional light emitting element array 101 is disposed between the rotary shaft 103 of the rotating section 104 and the slit 102 such that the light emitting surface faces the slit 102 of the rotating section 104. For example, the two-dimensional light emitting element array 101 of the light emitting unit U1 is disposed between the external body 41 and the rotary shaft 103 such that the light emitting surface faces the first slit 102 of the rotating section 104.

The two-dimensional light emitting element array 101 of the light emitting unit U2 is disposed between the external body 41 and the rotary shaft 103 such that the light emitting surface faces the second slit 102 of the rotating section 104. The two-dimensional light emitting element array 101 of the light emitting unit U3 is disposed between the external body 41 and the rotary shaft 103 such that the light emitting surface faces the third slit 102 of the rotating section 104.

The two-dimensional light emitting element array 101 of the light emitting unit U4 is disposed between the external body 41 and the rotary shaft 103 such that the light emitting surface faces the fourth slit 102 of the rotating section 104.

The two-dimensional light emitting element array 101 of the light emitting unit U5 is disposed between the external body 41 and the rotary shaft 103 such that the light emitting surface faces the fifth slit 102 of the rotating section 104. The two-dimensional light emitting element array 101 of the light emitting unit U6 is disposed between the external body 41 and the rotary shaft 103 such that the light emitting surface faces the sixth slit 102 of the rotating section 104.

In the multi-directional three-dimensional image display device 40, the slit 102 parallel to the rotary shaft 103 is provided in the external body 41 before the light emitting surface of the two-dimensional light emitting element array 101 of the light emitting unit U1. Also in this example, a structure is adopted in which light beams emitted from the two-dimensional light emitting element array 101 do not leak from portions other than the slit positions. The other light emitting units U2 to U6 are similarly formed.

[Example of Operation]

Due to the six-slit structure, the emission angle of light, which is emitted from the two-dimensional light emitting element array 101 of the light emitting unit U1 shown in FIG. 23B, in the left and right direction is largely restricted by the slit 102. The emission angle of light, which is emitted from the two-dimensional light emitting element array 101 of the light emitting unit U2, in the left and right direction is largely restricted by the slit 102. The emission angle of light, which is emitted from the two-dimensional light emitting element array 101 of the light emitting unit U3, in the left and right direction is largely restricted by the slit 102.

The emission angle of light, which is emitted from the two-dimensional light emitting element array 101 of the light emitting unit U4, in the left and right direction is largely restricted by the slit 102. The emission angle of light, which is emitted from the two-dimensional light emitting element array 101 of the light emitting unit U5, in the left and right direction is largely restricted by the slit 102. Similarly, the emission angle of light, which is emitted from the two-dimensional light emitting element array 101 of the light emitting unit U6, in the left and right direction is largely restricted by the slit 102.

By rotation scanning of the rotating section 104 with such a six-slit structure with respect to a viewing point, the light reproduction surface with a cylindrical shape can be formed. In addition, light beams of a three-dimensional image formed with the rotary shaft 103 as a reference leak from the inside of the rotating section 104 to the outside through the six slits 102.

Thus, according to the multi-directional three-dimensional image display device 40 as the fourth embodiment, light beams from the six two-dimensional light emitting element arrays 101 are emitted in different directions. As a result, it is possible to reproduce light beams corresponding to six vertical lines regulated by the six slits 102.

Fifth Embodiment

[Example of the Configuration of a Multi-Directional Three-Dimensional Image Display Device 50]

Figure 24A:
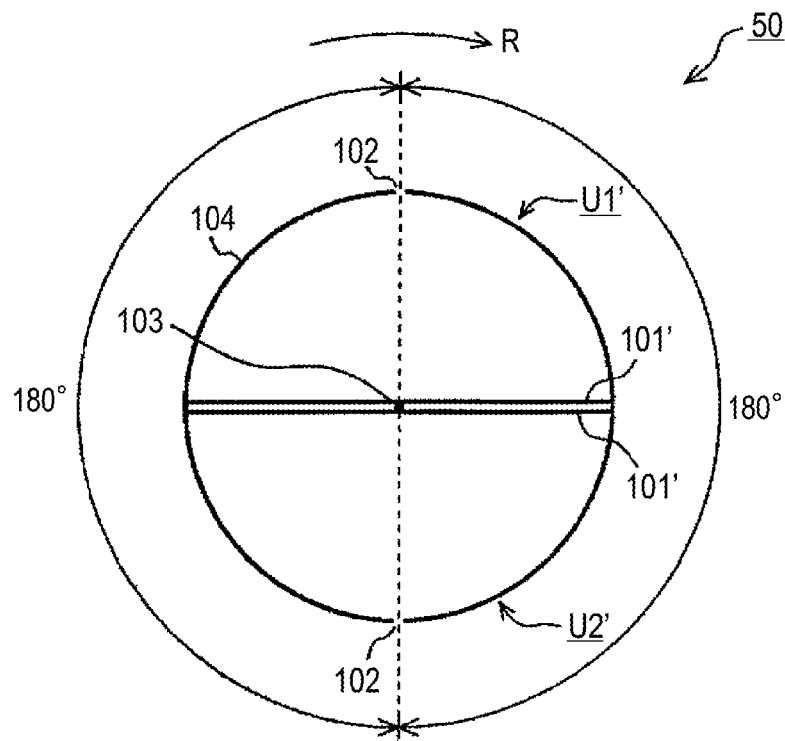
FIG. 24A is an explanatory view showing an example of the configuration of a multi-directional three-dimensional image display device according to a fifth embodiment.
Figure 24B:
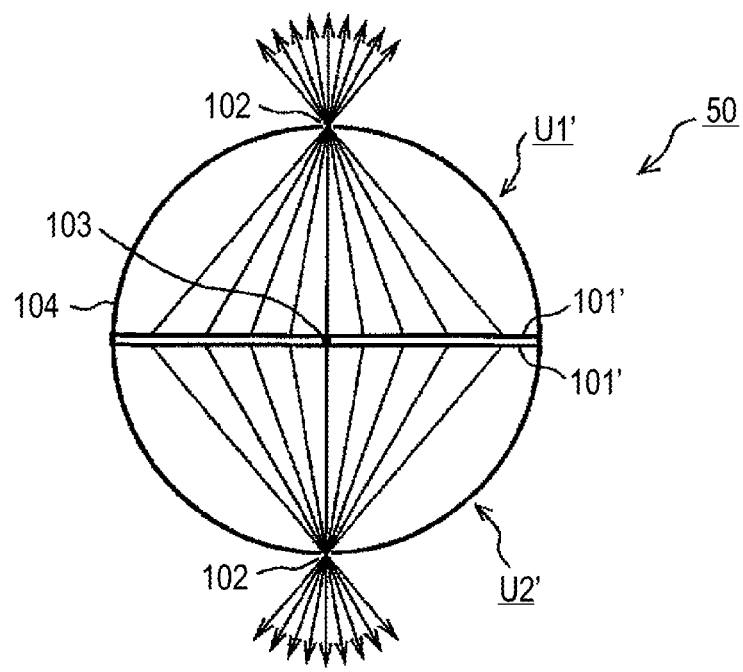
FIG. 24B is an explanatory view showing an example of the operation.

FIG. 24A is a sectional view showing an example of the configuration of the multi-directional three-dimensional image display device 50 as a fifth embodiment, and FIG. 24B is an explanatory view showing an example ecution of the operation. Regarding the shape of the light emitting unit U1 formed by the two-dimensional light emitting element array 101 and the slit 102, various configurations may be adopted other than the configuration described above. For example, a configuration may also be considered in which two sets of light emitting units U1' using a planar two-dimensional light emitting element array 101' are used.

The multi-directional three-dimensional image display device 50 shown in FIG. 24A adopts a light reproduction method and includes two light emitting units U1' and U2'. The rotating section 104 rotates in a direction of an arrow R or the opposite direction with the rotary shaft 103 as the rotation center.

In the multi-directional three-dimensional image display device 50, two slits 102 are provided at equal angles (180°) in the external body 41 with the rotary shaft 103 of the rotating section 104 as the origin. The light emitting unit U1' has one slit 102, and the light emitting unit U2' has the other slit 102. The two-dimensional light emitting element array 101' of the light emitting unit U1' has a planar (flat) light emitting surface, and is disposed between the external body 41 and the rotary shaft 103 such that the light emitting surface faces the one slit 102 of the rotating section 104. The two-dimensional light emitting element array 101' of the light emitting unit U2' is disposed between the external body 41 and the rotary shaft 103 such that the light emitting surface faces the other slit 102 of the rotating section 104.

In the multi-directional three-dimensional image display device 50, the slit 102 parallel to the rotary shaft 103 is provided in the external body 41 before the light emitting surface of the two-dimensional light emitting element array 101' of the light emitting unit U1'. Also in this example, a structure is adopted in which light beams emitted from the two-dimensional light emitting element array 101' do not leak from portions other than the slit positions. The other light emitting unit U2' is similarly formed.

[Example of Operation]

Due to the two-slit structure, the emission angle of light, which is emitted from the two-dimensional light emitting element array 101' of the light emitting unit U1' shown in FIG. 24B, in the left and right direction is restricted by the slit 102. Similarly, the emission angle of light, which is emitted from the two-dimensional light emitting element array 101' of the light emitting unit U2', in the left and right direction is largely restricted by the slit 102. By rotation scanning of the rotating section 104 with such a two-slit structure with respect to a viewing point, the light reproduction surface with a cylindrical shape can be formed. In this example, light beams of a three-dimensional image formed with the rotary shaft 103 as a reference leak from the inside of the rotating section 104 to the outside through the two slits 102.

Thus, according to the multi-directional three-dimensional image display device 50 as the fifth embodiment, light beams from the two planar two-dimensional light emitting element arrays 101' are emitted in different directions. Accordingly, it is possible to reproduce light beams corresponding to two vertical lines regulated by the two slits 102. As a result, similar to the second embodiment, it is possible to observe a three-dimensional image with high resolution which is formed by the light beams emitted from the two two-dimensional light emitting element arrays 101'.

Sixth Embodiment

[Example of the Configuration of a Multi-Directional Three-Dimensional Image Display Device 60]

Figure 25A:
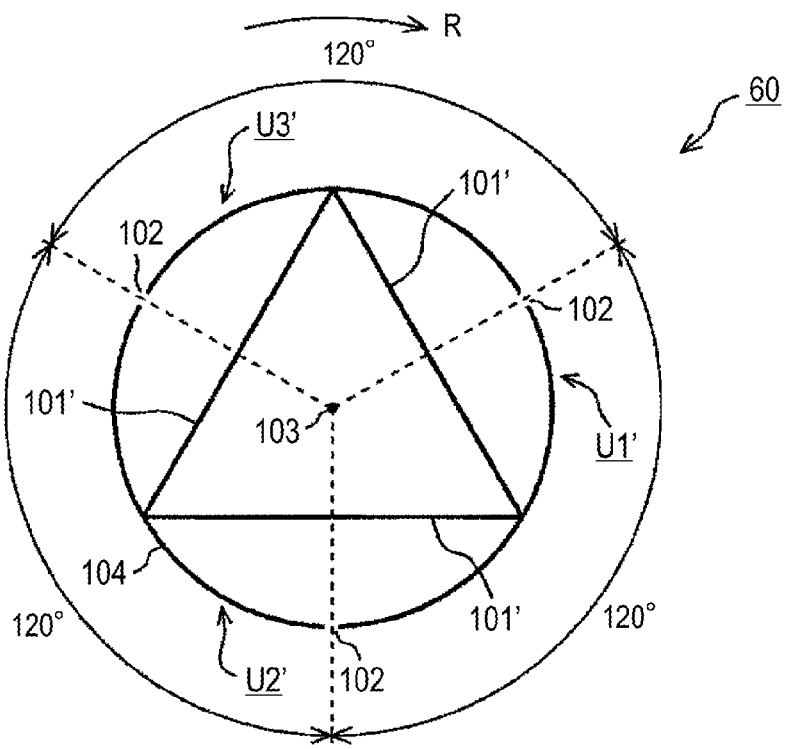
FIG. 25A is an explanatory view showing an example of the configuration of a multi-directional three-dimensional image display device according to a sixth embodiment.
Figure 25B:
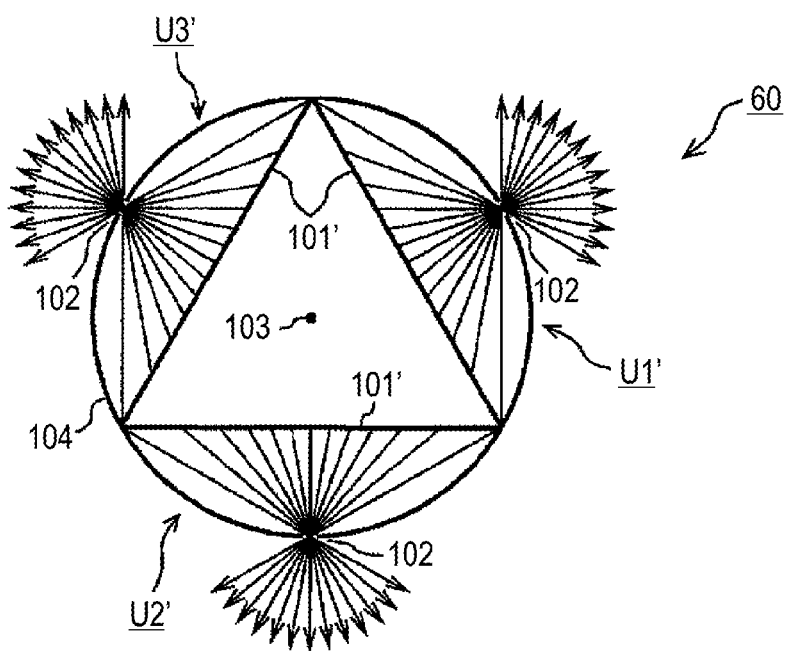
FIG. 25B is an explanatory view showing an example of the operation.

FIG. 25A is a sectional view showing an example of the configuration of the multi-directional three-dimensional image display device 60 as a sixth embodiment, and FIG. 25B is an explanatory view showing an example of the operation. In the present embodiment, several planar two-dimensional light emitting element arrays 101' of single colors with different wavelengths are mounted, so that color display can be executed without complicating the structure of the two-dimensional light emitting element array 101'.

The multi-directional three-dimensional image display device 60 shown in FIG. 25A adopts a light reproduction method and includes three light emitting units U1', U2' and U3'. The rotating section 104 rotates in a direction of an arrow R or the opposite direction with the rotary shaft 103 as the rotation center. In the multi-directional three-dimensional image display device 60, three slits 102 are provided at equal angles (120°) in the external body 41 with the rotary shaft 103 of the rotating section 104 as the origin. The light emitting unit U1' has the first slit 102, the light emitting unit U2' has the second slit 102, and the light emitting unit U3' has the third slit 102.

In this example, the planar two-dimensional light emitting element arrays 101' are disposed in the shape of an equilateral triangle in the external body 41. Each two-dimensional light emitting element array 101' is disposed between the rotary shaft 103 of the rotating section 104 and the slit 102 such that the light emitting surface faces the slit 102 of the rotating section 104. For example, the two-dimensional light emitting element array 101' of the light emitting unit U1' is disposed between the external body 41 and the rotary shaft 103 such that the light emitting surface faces the first slit 102 of the rotating section 104.

The two-dimensional light emitting element array 101' of the light emitting unit U2' is disposed between the external body 41 and the rotary shaft 103 such that the light emitting surface faces the second slit 102 of the rotating section 104. The two-dimensional light emitting element array 101' of the light emitting unit U3' is disposed between the external body 41 and the rotary shaft 103 such that the light emitting surface faces the third slit 102 of the rotating section 104. Light emitting elements for different wavelengths are mounted in the three two-dimensional light emitting element arrays 101' and accordingly, color display of a three-dimensional image is executed.

In the multi-directional three-dimensional image display device 60, the slit 102 parallel to the rotary shaft 103 is provided in the external body 41 before the light emitting surface of the two-dimensional light emitting element array 101' of the light emitting unit U1'. Also in this example, a structure is adopted in which light beams emitted from the two-dimensional light emitting element array 101' do not leak from portions other than the slit positions. The other light emitting units U2' and U3' are similarly formed.

[Example of Operation]

Due to the three-slit structure, the emission angle of light, which is emitted from the two-dimensional light emitting element array 101' of the light emitting unit U1' shown in FIG. 25B, in the left and right direction is restricted by the slit 102. The emission angle of light, which is emitted from the two-dimensional light emitting element array 101' of the light emitting unit U2', in the left and right direction is largely restricted by the slit 102. Similarly, the emission angle of light, which is emitted from the two-dimensional light emitting element array 101' of the light emitting unit U3', in the left and right direction is largely restricted by the slit 102.

By rotation scanning of the rotating section 104 with such a three-slit structure with respect to a viewing point, the light reproduction surface with a cylindrical shape can be formed. Light beams of a three-dimensional image formed with the rotary shaft 103 as a reference leak from the inside of the rotating section 104 to the outside through the three slits 102.

Thus, according to the multi-directional three-dimensional image display device 60 as the sixth embodiment, light beams from the three planar two-dimensional light emitting element arrays 101' are emitted in different directions. Accordingly, it is possible to reproduce light beams corresponding to three vertical lines regulated by the three slits 102. As a result, similar to the third embodiment, it is possible to observe a three-dimensional color image with high resolution which is formed by light beams of, for example, R, G, and B colors emitted from the three two-dimensional light emitting element arrays 101' for different wavelengths.

Seventh Embodiment

[Optimization of Slit Width]

In the present embodiment, using the configuration of the multi-directional three-dimensional image display device 10 according to the above-described first embodiment as an example, optimization of the width of the slit 102 in the rotating section 104 will be described with reference to FIGS. 26A and 26B. In addition, the same optimization may also be performed for the multi-directional three-dimensional image display devices according to the other embodiments.

Preferably, the width Ws of the slit 102 in the short-axis direction is set such that when the two-dimensional light emitting element array 101 is observed through the slit 102 from any viewing point p at a certain moment, the observed width is exactly the same as the mounting pitch Wp between light emitting elements in the horizontal direction. If it is observed with the same width as the mounting pitch Wp, a state can be made in which a light emitting point only from approximately one light emitting element can be observed when the two-dimensional light emitting element array 101 is observed from a predetermined direction. As the observed width becomes larger than the mounting pitch Wp, the emission patterns of adjacent light emitting elements are gradually mixed. As a result, image blur occurs. This is because the display data is updated such that one light emitting element corresponds to one certain viewing point p at a certain moment. On the contrary, if the slit width Ws decreases and the observed width decreases accordingly, the amount of light is reduced to create a dark image although image blur is difficult to occur.

In practice, the slit width Ws and the mounting pitch Wp change with an observation timing or the position of the viewing point p. Therefore, it is preferable to make an adjustment such that, for example, a middle portion is optimal on an image observed from the certain viewing point p. For example, as shown in FIG. 26A, the distance between the slit 102 and the middle portion of the two-dimensional light emitting element array 101 is set to a and the distance between the slit 102 and the viewing point p is set to b. In addition, it is assumed that the distance b is sufficiently larger than the distance a and the slit width Ws is equal to the mounting pitch Wp. In this case, as shown in FIG. 26A, when the middle portion of the two-dimensional light emitting element array 101 is observed through the slit 102 from the viewing point p, the two-dimensional light emitting element array 101 is observed in approximately the same size as the mounting pitch Wp. In the same configuration, a state is considered in which the end of the two-dimensional light emitting element array 101 is observed through the slit 102 from the viewing point pas shown in FIG. 26B. In this case, the two-dimensional light emitting element array 101 is observed through the slit 102 from the oblique direction. In this case, since the two-dimensional light emitting element array 101 is observed from the oblique direction, the slit width Ws is observed seemingly small compared with the state shown in FIG. 26A. In addition, the size of the observed two-dimensional light emitting element array 101 is also observed seemingly small compared with the state shown in FIG. 26A. Eventually, even if the two-dimensional light emitting element array 101 is observed from the oblique direction as shown in FIG. 26B, the two-dimensional light emitting element array 101 is observed seemingly in approximately the same size as the mounting pitch Wp.

Eighth Embodiment

As described in the first embodiment, in the multi-directional three-dimensional image display device 10, image display is performed, for example, for each of the sixty viewing points p 300 to 359 such that the locus of light emitting points made by the two-dimensional light emitting element array 101, that is, the observed image display screen becomes, for example, a flat surface. Here, it is assumed that in the two-dimensional light emitting element array 101, a plurality of light emitting elements are arrayed at equal distances within the curved surface and image update (emission control) of all of the plurality of light emitting elements is performed at the same timing. In this case, an example of a display screen 120 observed from any viewing point p is shown in FIG. 27A. In FIG. 27A, black points correspond to pixels (locus of light emitting points). In this case, there is a problem in that the width w1 between pixels at left and right ends in the horizontal direction on the observed display screen 120 looks smaller than the width w0 between pixels in the middle portion. Ideally, however, it is preferable that the width w between pixels in the middle portion is the same as that at the left and right ends (light emitting points are arrayed at equal distances) as shown in FIG. 27B.

In the present embodiment, a method of realizing the ideal image display shown in FIG. 27B on the basis of the configuration of the multi-directional three-dimensional image display device 10 according to the first embodiment will be described. In addition, image display may also be performed for the multi-directional three-dimensional image display devices according to the other embodiments using the same method.

First, referring to FIGS. 28 and 29, the curved shape of the two-dimensional light emitting element array 101 for realizing the ideal image display shown in FIG. 27B and an example of calculating the position of a light emitting point (light emitting element) will be described. The meaning of reference numerals given in FIGS. 28 and 29 is basically the same as that in FIGS. 3 and 4.

Figure 28:
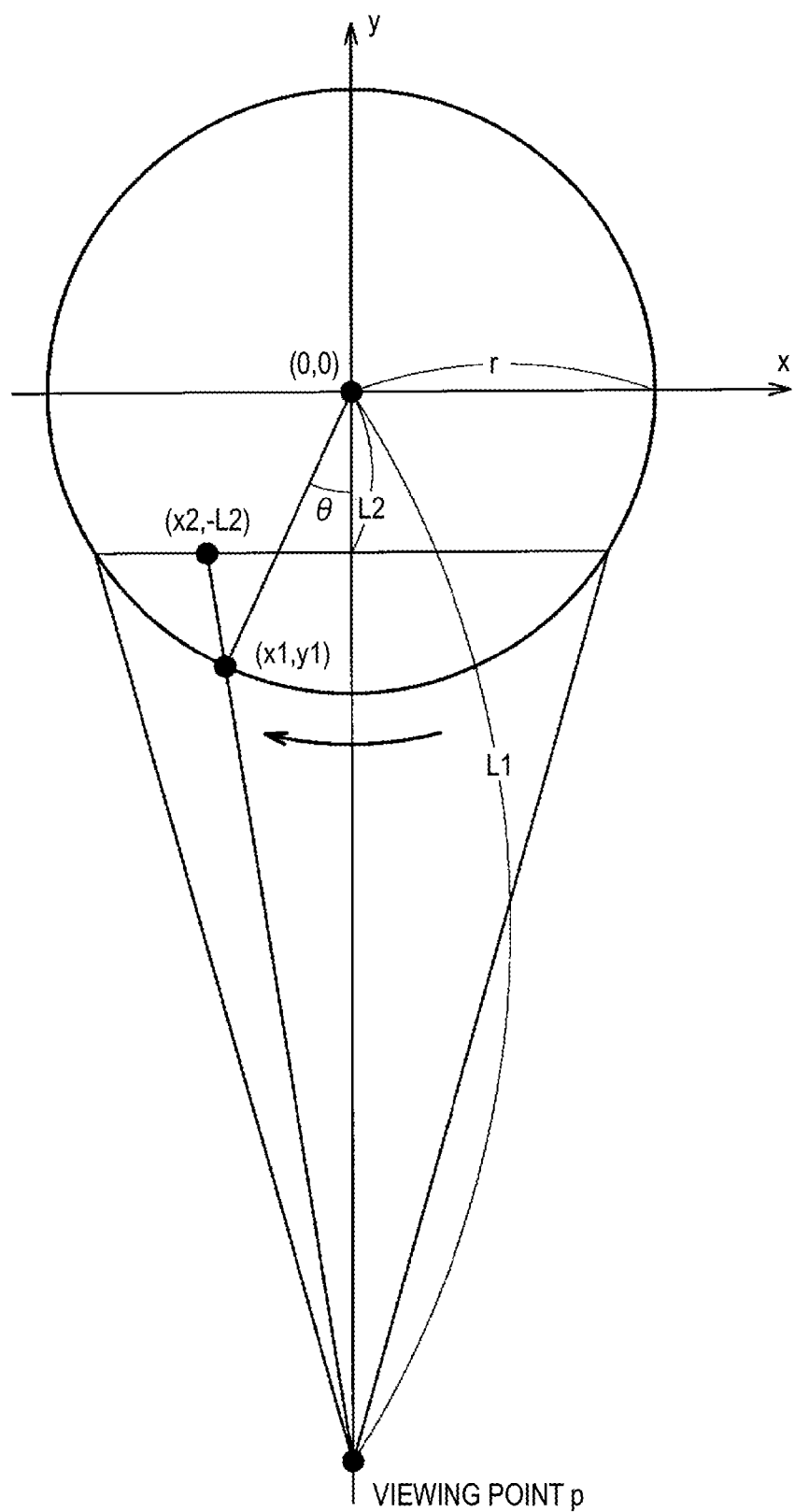
FIG. 28 is an explanatory view showing the curved shape of the two-dimensional light emitting element array and an example of calculating the position of a light emitting point (light emitting element)
Figure 29:
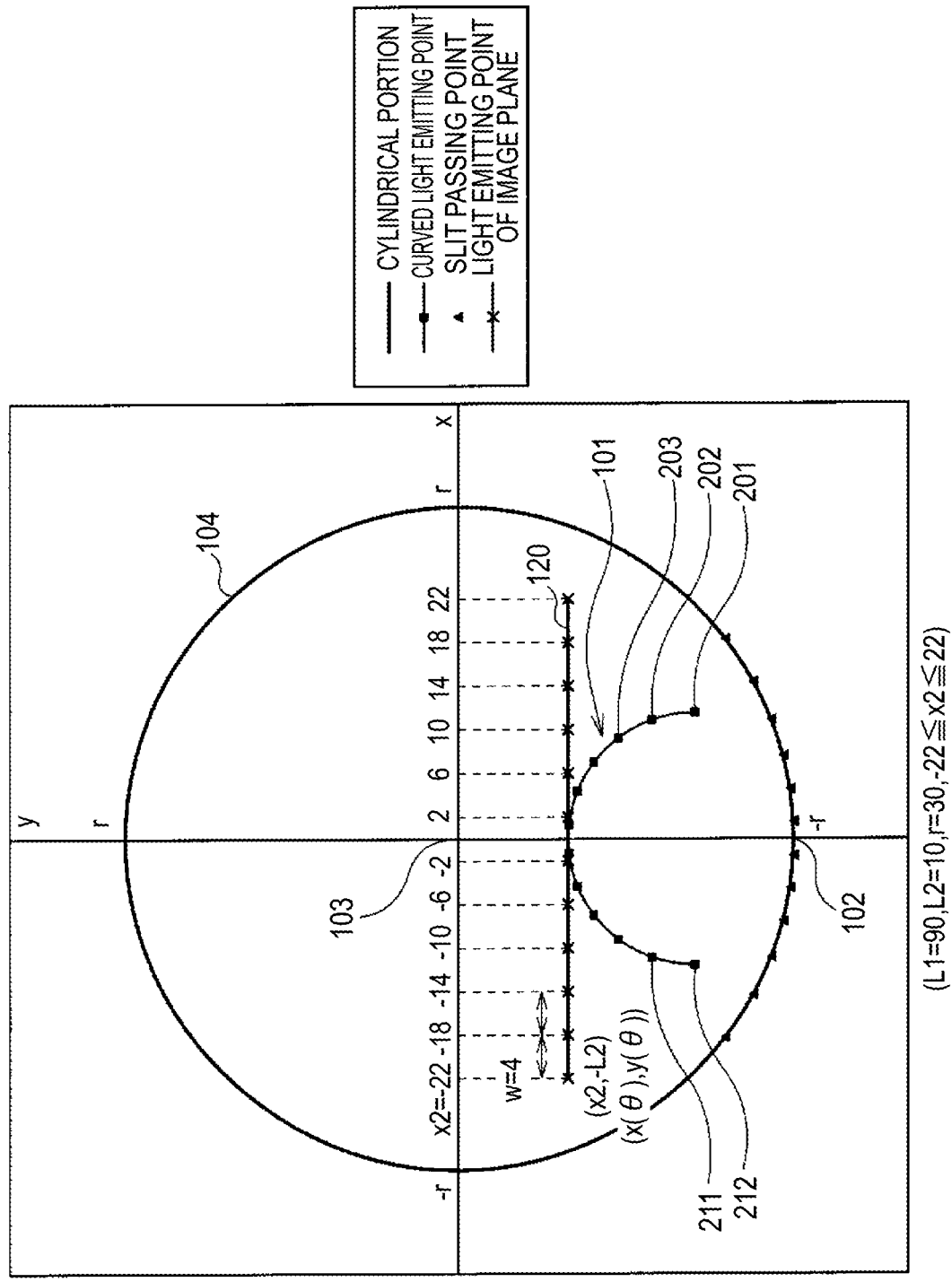
FIG. 29 is an explanatory view showing the curved shape of the two-dimensional light emitting element array and a specific example of the position of a light emitting point (light emitting element)

In FIG. 28, a light emitting point (equivalent to a pixel shown in FIG. 27B) which is actually observed through the slit 102 from the viewing point p is assumed to be a point (x2, −L2) on y=−L2. The conditions of a passing point (x1, y1) of the slit 102 which enables the light emitting point (x2, −L2) to be observed are as follows (in this case, L3=L1−L2).

$$x1 = \frac{x2\{L1 \cdot L3 - \sqrt{L3^2 \cdot r^2 + (r^2 - L1^2)x2^2}\}}{L3^2 + x2^2}$$

$$y1 = \sqrt{r^2 - x1^2}$$

Here, assuming that the angle θ indicating the position of the slit 102 increases in the rotation direction of the arrow in FIG. 28, the angle θ is as follows.

$$\theta = -\sin^{-1}(\theta)(x1/r)$$

Accordingly, the position coordinates (x(θ), y(θ)) of the curved light emitting point (light emitting element) in the two-dimensional light emitting element array 101 are as follows.

$$x(\theta) = x2 \cos \theta + L2 \sin \theta \quad (1A)$$

$$y(\theta) = x2 \sin \theta - L2 \cos \theta \quad (2A)$$

Assuming that a time at which the slit 102 passes through the position of the angle θ=0° is t=0 and time taken for one revolution, that is, rotation of 360° is Tc, an update timing of the light emitting point of an image observed from the viewing point p is as follows.

$$t = Tc \cdot \theta / 2\pi \quad (3)$$

[Specific Example]

FIG. 29 shows specific examples of the curved shape of the two-dimensional light emitting element array 101 and the position of a light emitting point (light emitting element) on the curved surface for arraying the light emitting points, which are actually observed through the slit 102 from the viewing point p, at equal distances on the flat surface. In FIG. 29, L1=90, L2=10, and r=30 are set, the number of light emitting points in the x-axis direction is set to 12, and the distance is set to 4. In addition, the values of x2 of the light emitting points observed at equal distances are set to −22, −18, −14, −10, −6, −2, 2, 6, 10, 14, 18, and 22.

Moreover, when an image for sixty viewing points of p=300 to 359 is output in one revolution, an update interval T of each of the twelve light emitting elements 201 to 212 is as follows.

$$T = Tc/60 \quad (4)$$

Figure 30:
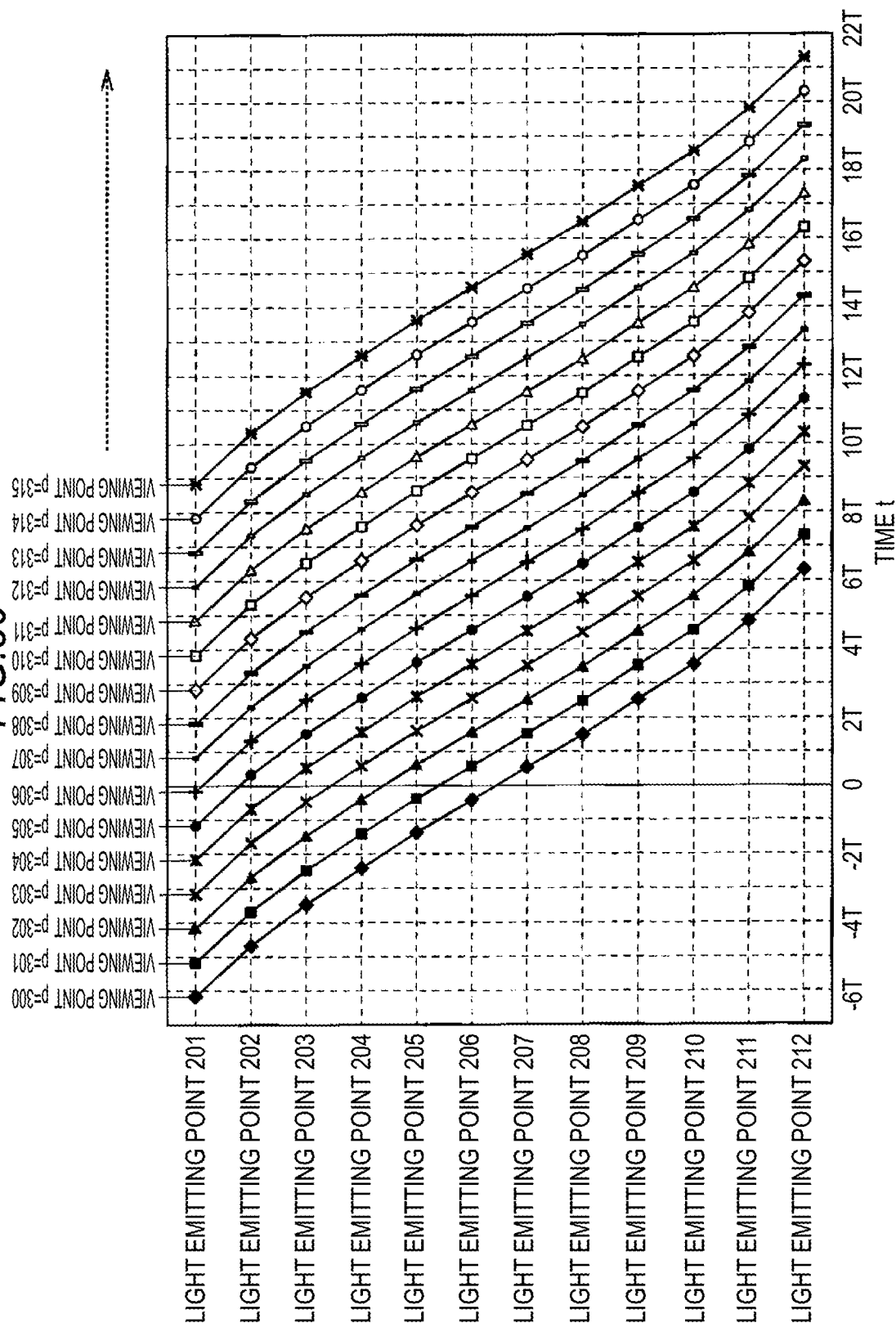
FIG. 30 is an explanatory view showing an emission timing of a light emitting element in the two-dimensional light emitting element array.
Figure 31:
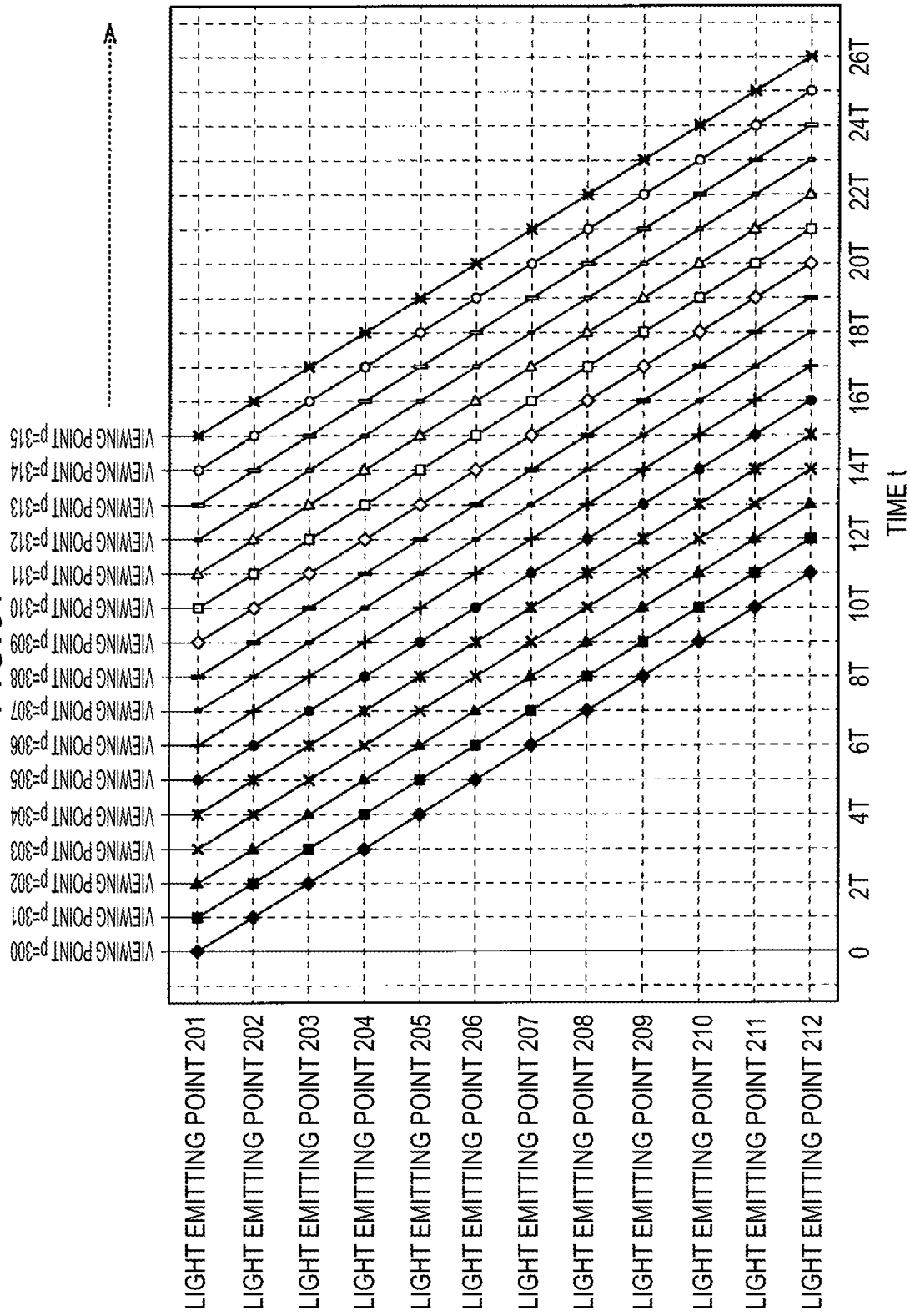
FIG. 31 is an explanatory view showing a comparative example of a light emitting element in the two-dimensional light emitting element array.

FIG. 30 shows an emission timing of a light emitting element for realizing the ideal image display shown in FIG. 27B. Moreover, FIG. 31 shows an emission timing in a comparative example. The comparative example in FIG. 31 corresponds to the light output timings shown in FIGS. 10A to 15B. In FIGS. 30 and 31, the horizontal axis indicates a time t, and a vertical axis indicates twelve light emitting points (light emitting elements 201 to 212). In FIG. 30, a solid curve (in FIG. 31, a straight line) indicates the emission timing at a certain viewing point p. For example, in FIG. 30, the leftmost solid curve indicates the emission timing of the light emitting point (light emitting element) observed from the viewing point 300. In addition, control of the emission timing shown in FIGS. 30 and 31 is performed by the display controller 15 (FIG. 18).

In the comparative example shown in FIG. 31, the update interval T and the update timing (time) of the twelve light emitting elements 201 to 212 are the same. For example, at time t=11T, the light emitting elements 201 to 212 perform image display (light emission) for the viewing points 311 to 300 (for example, the light emitting element 201 performs light emission for the viewing point 311 and at the same time, the light emitting element 202 performs light emission for the viewing point 310). At subsequent time t=12T, the light emitting elements 201 to 212 are simultaneously updated to perform light emission for the viewing points 312 to 301. That is, the image update timing (emission update timing) of the twelve light emitting elements 201 to 212 is the same.

On the other hand, in the example shown in FIG. 30, the update interval T is equal in the twelve light emitting elements 201 to 212, but the update timing (time) thereof is different. For example, the light emitting element 201 starts light emission for the viewing point 311 at a time slightly earlier than time t=5T, but the other light emitting elements 202 to 212 do not emit light at that time. For example, the light emitting element 202 starts light emission for the viewing point 310 at a time slightly later than time t=5T. Thus, the light emission timing is independently controlled for the twelve light emitting elements 201 to 212. By independently controlling the emission of the light emitting elements 201 to 212 at such emission timing, the ideal image display shown in FIG. 27B can be realized.

Figure 32:
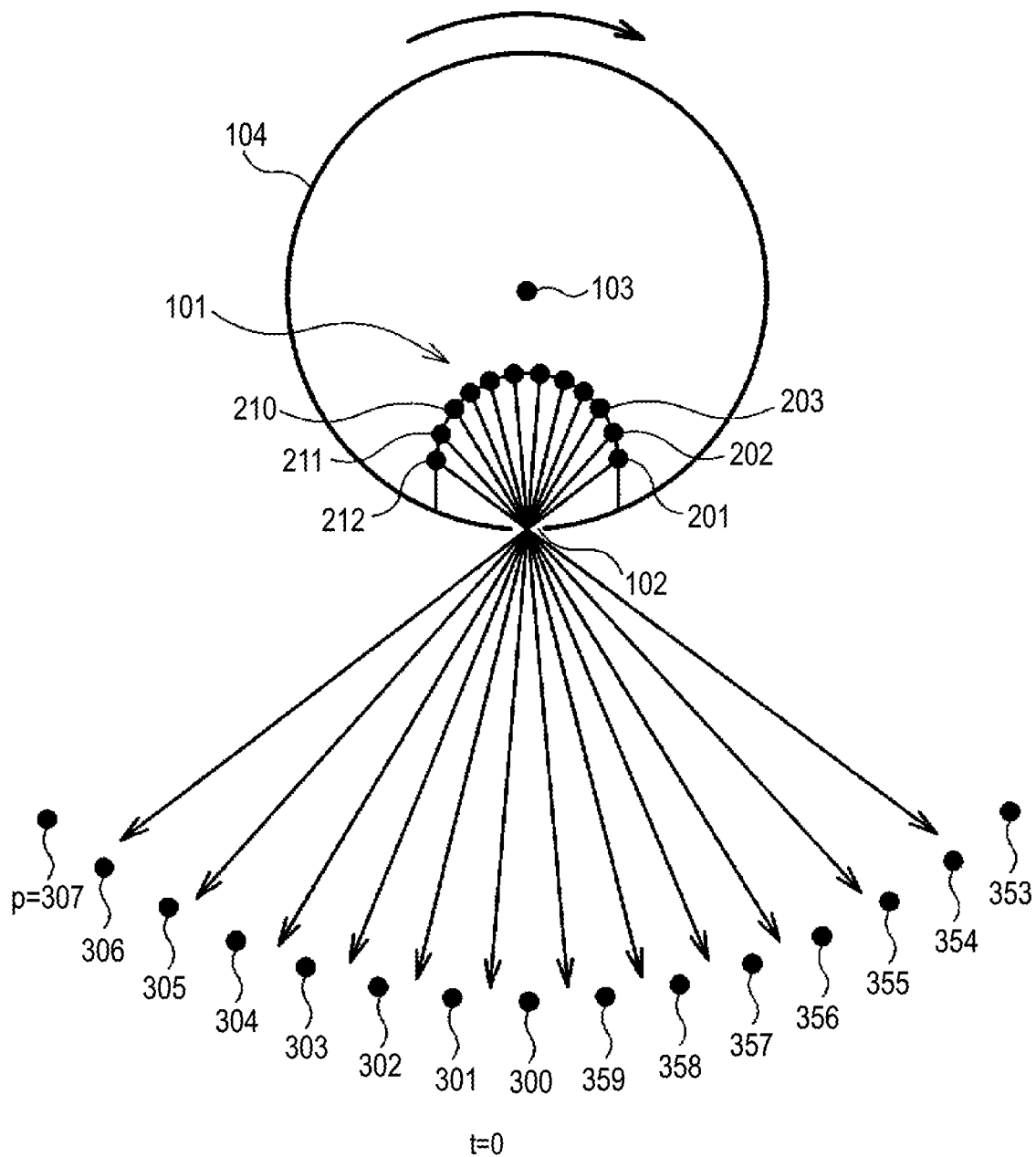
FIG. 32 is an explanatory view showing a state of light emitted through a slit when a plurality of light emitting elements emit light simultaneously at time t=0 in the configuration shown in FIG. 29.

FIG. 32 shows a state (light vector) of light emitted through the slit 102 when the twelve light emitting elements 201 to 212 emit light simultaneously at time t=0 in the configuration shown in FIG. 29. As can be seen from FIG. 32, regarding the light vectors from respective light emitting elements, the positional relationships with the viewing positions are different. This also indicates that it is necessary to control the emission timing of each light emitting element independently as shown in FIG. 30 instead of making the twelve light emitting elements 201 to 212 emit light simultaneously.

[Effects Obtained by Making an Observed Image Flat]

In each of the embodiments described above, it is preferable to form the curved surface of the two-dimensional light emitting element array 101 such that the display screen observed from the viewing point p becomes a flat surface. The reason is as follows.

If the observed display screen is flat, an image imaged by a camera or an image created by CG (computer graphics) can be used as it is without image processing. However, if the observed display screen is flat, it is necessary to create and use an image obtained by correcting the curvature of the display screen so that an image observed from the viewing point p is not distorted.

If the observed display screen is flat, an image is distorted in the bow shape when the display screen is viewed from above or below. Accordingly, it is difficult to obtain a good three-dimensional image.

In particular, when the distance between pixels on the display screen observed from the viewing point p like the present embodiment is constant, the following effects are further obtained.

If the distance between pixels is constant, an image imaged by a camera or an image created by CG (computer graphics) can be used as it is without image processing. If the distance between pixels is not constant, it is necessary to create and use an image obtained by correcting distortion of the width between pixels.

Ninth Embodiment

[Example of Watching a Three-Dimensional Image Using the Display Device According to Each of the First to Eighth Embodiments]

Figure 33A:
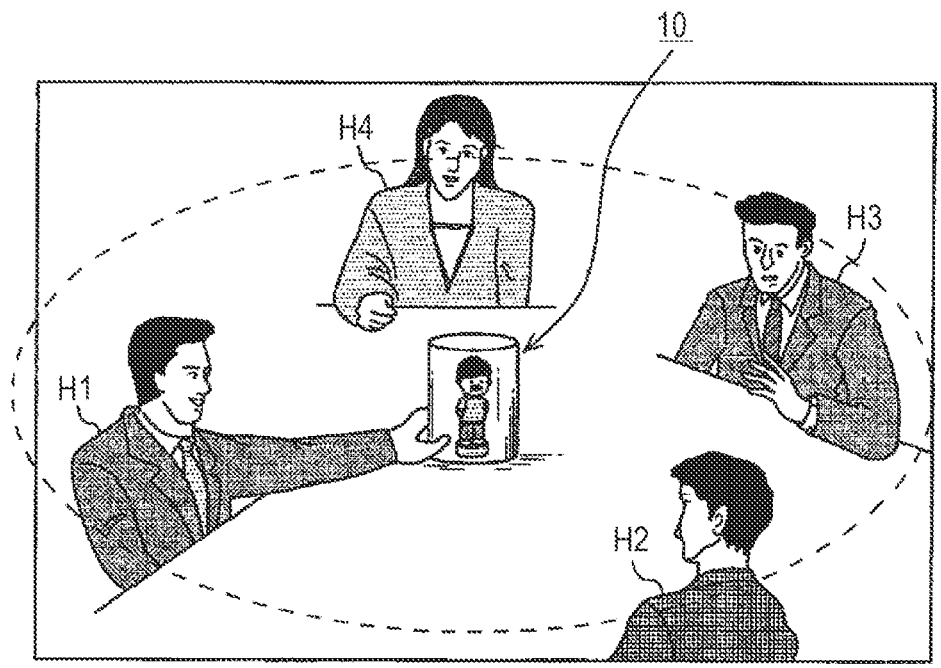
FIGS. 33A and 33B are explanatory views showing examples of watching a three-dimensional image in the multi-directional three-dimensional image display device or the like as each embodiment.
Figure 33B:
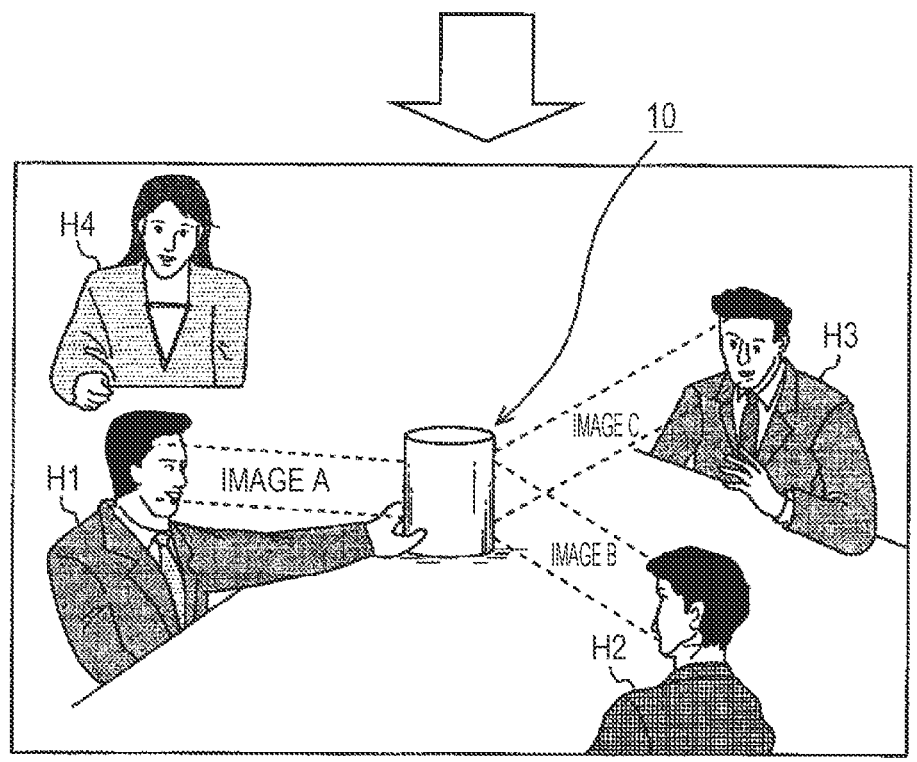

FIGS. 33A and 33B are explanatory views showing examples of watching a three-dimensional image in the multi-directional three-dimensional image display device 10 or the like as each embodiment. The example of watching a three-dimensional image shown in FIG. 33A is a case where four viewers H1 to H4 watch a character (boy doll) which is displayed in a three-dimensional way by the multi-directional three-dimensional image display device 10 or the like. In this case, since the three-dimensional image is displayed over the entire periphery of the character, the viewer H1 (male) can watch a three-dimensional image of the left side of the character. The viewer H2 (male) can watch a three-dimensional image of the front side of the character. The viewer H3 (male) can watch a three-dimensional image of the right side of the character. The viewer H4 (female) can watch a three-dimensional image of the back side of the character.

In the example of watching a three-dimensional image shown in FIG. 33B, a three-dimensional image display method is adopted in which an image is output only to a region where it is determined that there is a viewer and a three-dimensional image is not output to a region where it is determined that there is no viewer. For example, there are four viewers H1 to H4 around the multi-directional three-dimensional image display device 10 in FIG. 33B. This is the case where the three viewers H1 to H3 watch the multi-directional three-dimensional image display device 10 but the viewer H4 does not watch the multi-directional three-dimensional image display device 10. In this case, according to the multi-directional three-dimensional image display device 10 shown in FIG. 18, the viewer detecting sensor 81 detects the pupils of the three viewers H1 to H3 and generates the viewer detection signal S81.

The multi-directional three-dimensional image display device 10 transmits the watching areas of the three viewers H1 to H3 sequentially to the image source transmission device 90 on the basis of the viewer detection signal S81 output from the viewer detecting sensor 81. The image source transmission device 90 transmits only the region images corresponding to the watching areas of the three viewers H1 to H3 to the multi-directional three-dimensional image display device 10. As a result, it is possible to reproduce the display information only in the watching areas where the three viewers H1 to H3 are present.

In this example, the viewer H1 who is looking at the multi-directional three-dimensional image display device 10 can watch a three-dimensional image of the left side of the character. Similarly, the viewer H2 can watch a three-dimensional image of the front side of the character. Similarly, the viewer H3 can watch a three-dimensional image of the right side of the character. However, a three-dimensional image is not displayed in the watching area of the viewer H4 who does not watch the multi-directional three-dimensional image display device 10.

In FIG. 33B, dotted lines show that display light is contacted with the faces of the viewers H1 to H3. The reason why the display light is not contacted with the viewer H4 is that the eyes of the viewer H4 are not turned to the multi-directional three-dimensional image display device 10 and accordingly, the viewer H4 is not determined to be a viewer. Since a region image corresponding to the watching area between the viewers H1 and H2 is not output either, neither is a three-dimensional image displayed in the watching area. In this manner, a unique three-dimensional image display method can be provided.

Tenth Embodiment

[Configuration of a Multi-Directional Three-Dimensional Image Display Device 70]

Figure 34:
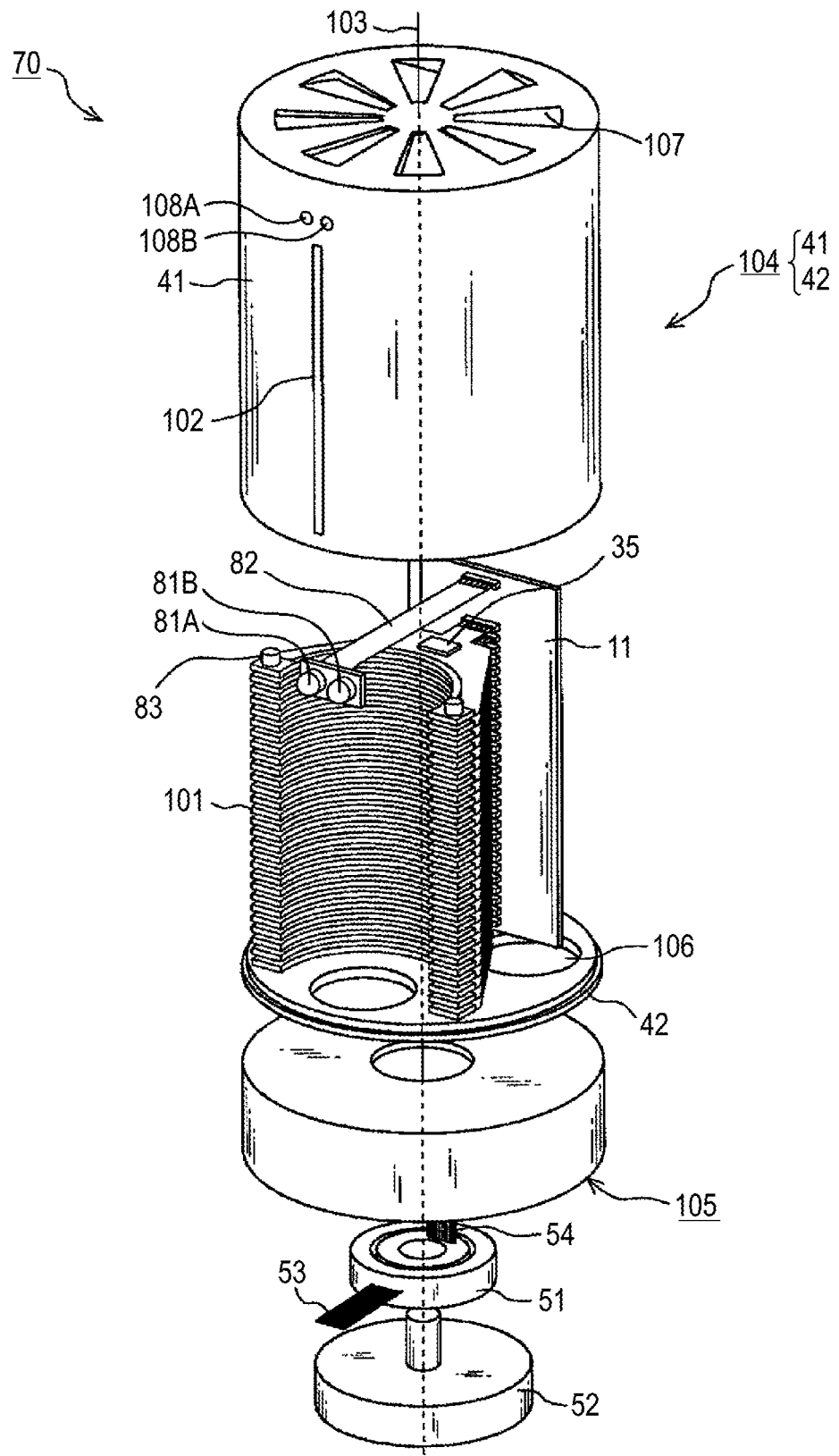
FIG. 34 is an exploded perspective view showing an example of the configuration of a multi-directional three-dimensional image display device according to a tenth embodiment.

FIG. 34 shows an example of the configuration of a multi-directional three-dimensional image display device 70 according to the present embodiment. The multi-directional three-dimensional image display device 70 includes an infrared light emitting section 81A and an infrared light receiving section 81B instead of the viewer detecting sensor 81 in the multi-directional three-dimensional image display device 10 shown in FIG. 2. Similar to the viewer detecting sensor 81, the infrared light emitting section 81A and the infrared light receiving section 81B are attached to one end of an arm member 82 and are connected to a connection substrate 11 through the arm member 82. In addition, the multi-directional three-dimensional image display device 70 includes a hole 108A for a light emitting section and a hole 108B for a light receiving section instead of the hole 108 in the multi-directional three-dimensional image display device 10 shown in FIG. 2. The hole 108A for a light emitting section is provided at the position corresponding to the infrared light emitting section 81A in a state where an external body 41 is attached to a turntable 42. The hole 108B for a light receiving section is provided at the position corresponding to the infrared light receiving section 81B in a state where the external body 41 is attached to the turntable 42.

Figure 36:
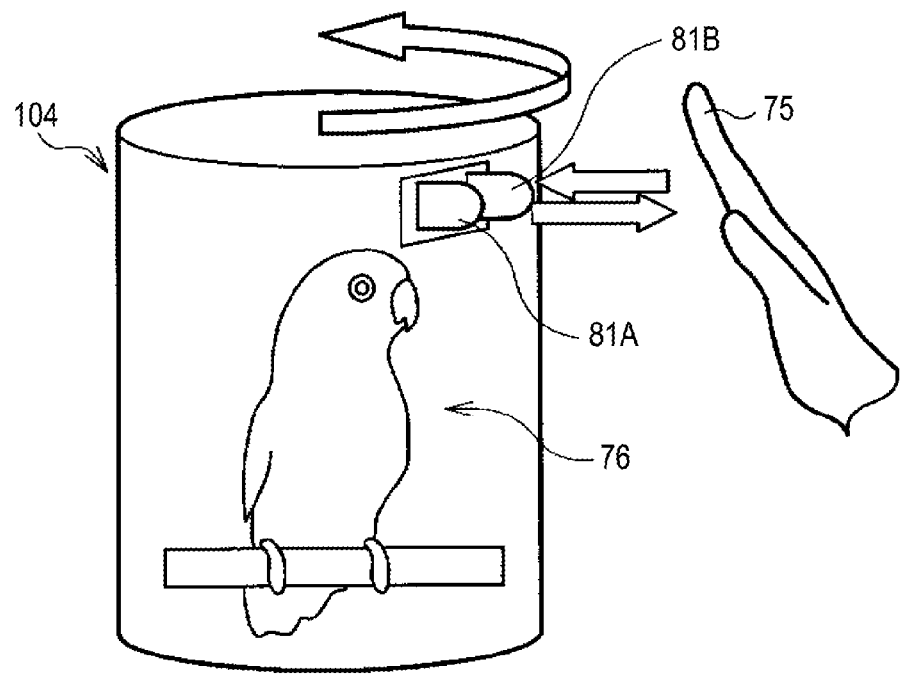
FIG. 36 is an explanatory view showing the concept of object detection of the multi-directional three-dimensional image display device.

The infrared light emitting section 81A and the infrared light receiving section 81B are provided to detect the position or the movement of an object (for example, a viewer's hand 75), for example, when the object comes closer around the surface of the rotating section 104 in a state where a three-dimensional display image 76 is displayed as shown in FIG. 36. The infrared light emitting section 81A emits infrared light toward the outside of the rotating section 104 through the hole 108A for a light emitting section. The infrared light receiving section 81B receives reflected return light of the infrared light, which is emitted from the infrared light emitting section 81A and then returns by reflection from the external object, through the hole 108B.

Figure 35:
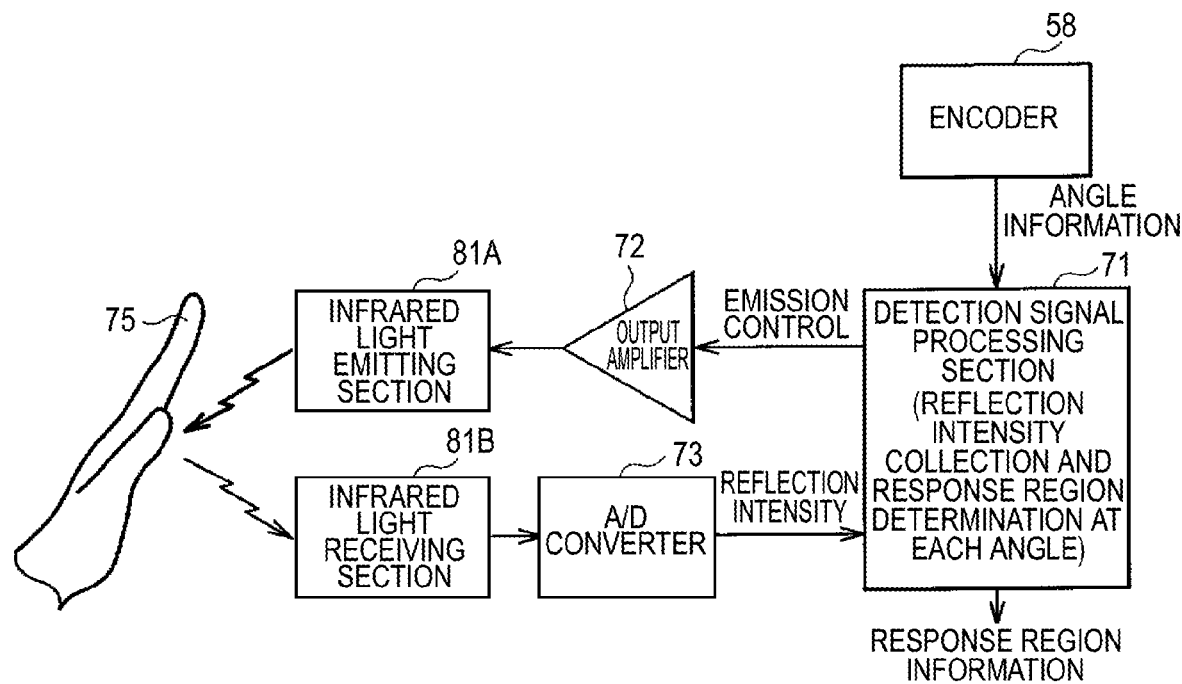
FIG. 35 is a block diagram showing an example of the configuration of an object detecting circuit of the multi-directional three-dimensional image display device.

FIG. 35 shows an example of the configuration of an object detecting circuit which uses the infrared light emitting section 81A and the infrared light receiving section 81B. This object detecting circuit includes a detection signal processing section 71, an output amplifier 72, and an A/D converter 73. In addition, the circuit configuration of other control systems is approximately the same as that of the circuit shown in FIG. 18 except for the circuit section of the viewer detecting sensor 81.

In the present embodiment, the infrared light emitting section 81A, the infrared light receiving section 81B, and the detection signal processing section 71 mainly correspond to one specific example of an "object detector" in one embodiment of the present invention.

The detection signal processing section 71 controls the emission of the infrared light emitting section 81A through the output amplifier 72. In addition, the detection signal processing section 71 receives a detection signal from the infrared light receiving section 81B through the A/D converter 73 and acquires the information on the reflection intensity of return light of the infrared light which returns by reflection from the external object. In addition, an angle information signal indicating the information on the angle of rotation (angle of rotation of the rotating section 104) of the motor 52 is input to the detection signal processing section 71 from the encoder 58 (refer to FIG. 18) attached to the motor 52. Accordingly, the detection signal processing section 71 acquires the information on the reflection intensity of reflected return light of infrared light in units of a predetermined angle. The detection signal processing section 71 determines a region (response region), in which it is assumed that there is an object such as the viewer's hand 75, on the basis of the information on the reflection intensity at each angle. The detection signal processing section 71 outputs a signal, which indicates the acquired response region information, to the display controller 15 (refer to FIG. 18). In addition, the detection signal processing section 71 outputs the signal indicating the response region information to the image source transmission device 90 through the I/F substrate 56 (refer to FIG. 18).

[Operation of the Multi-Directional Three-Dimensional Image Display Device 70]

The basic display operation of a three-dimensional image of the multi-directional three-dimensional image display device 70 is the same as that of the multi-directional three-dimensional image display device 10 (FIG. 1 and the like). That is, the rotating section 104 is rotated and emission control of light emitting elements located within the rotating section 104 is performed by the display controller 15. As a result, for example, as shown in FIG. 36, the three-dimensional display image 76 is displayed over the entire periphery. The image data Din for the three-dimensional display image 76 to be displayed is supplied from the image source transmission device 90 (FIG. 18).

Figure 38:
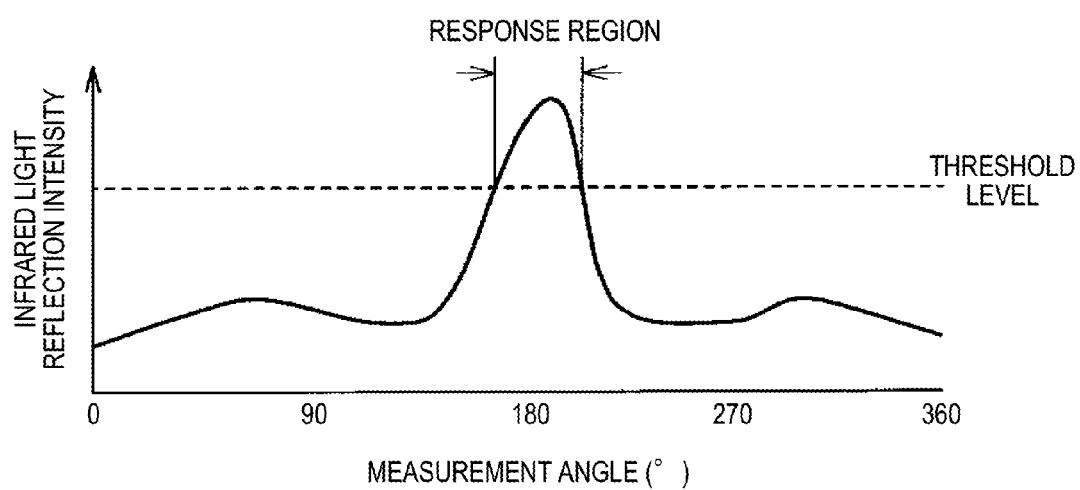
FIG. 38 is a waveform chart showing an example of a measurement result of the reflection intensity at each rotation angle in the multi-directional three-dimensional image display device.

Thus, in a state where the three-dimensional display image 76 is displayed, the detection signal processing section 71 acquires the information on the reflection intensity of reflected return light of infrared light, from the infrared light receiving section 81B, in units of a predetermined angle when necessary. The detection signal processing section 71 determines a region (response region), in which it is assumed that there is an object such as the viewer's hand 75, on the basis of the information on the reflection intensity at each angle. For example, as shown in FIG. 38, an angle region where the reflection intensity exceeds a predetermined threshold level is determined to be a response region. That is, an object, such as the viewer's hand 75, is determined to exist in the angle region. The detection signal processing section 71 outputs a signal, which indicates the acquired response region information, to the display controller 15 and the image source transmission device 90. The image source transmission device 90 supplies the image data Din corresponding to the response region. The display controller 15 controls the emission of a light emitting element according to the response region (position where an object, such as the viewer's hand 75, is detected). For example, emission control of a light emitting element is performed such that a display state of the three-dimensional display image 76 seen by the viewer changes according to the position where the object, such as the viewer's hand 75, is detected.

Figure 37:
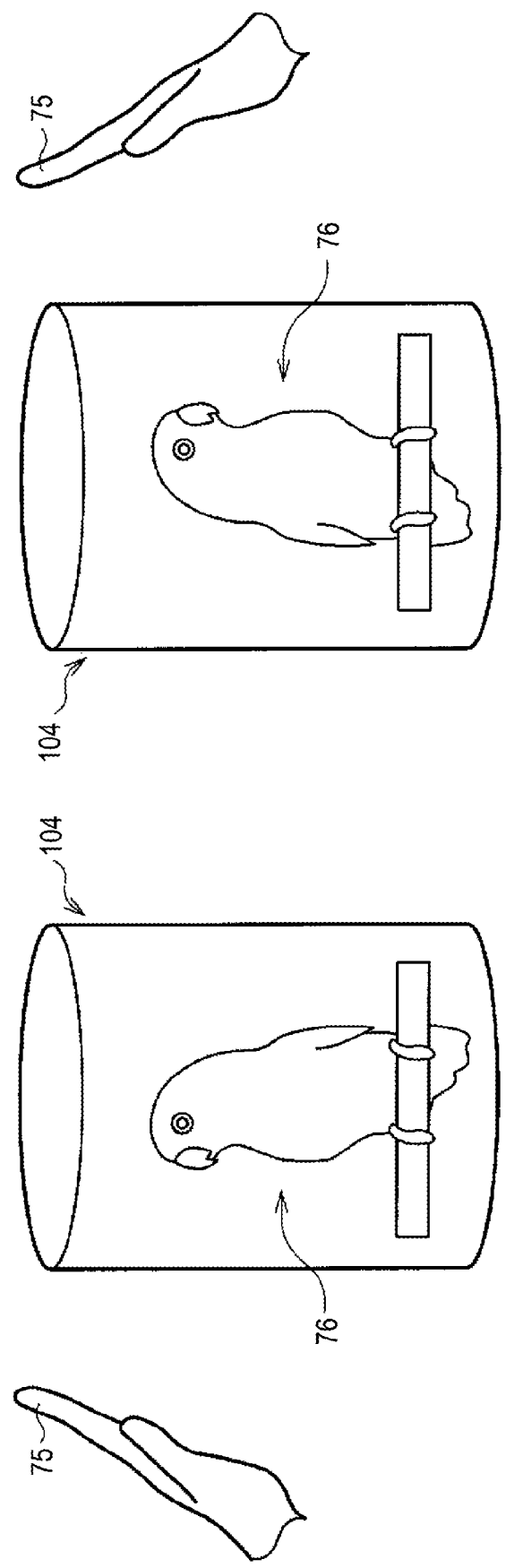
FIGS. 37A and 37B are explanatory views showing an example of a change of the display state of a three-dimensional image according to the object detection in the multi-directional three-dimensional image display device.

FIGS. 37A and 37B show an example of a change of the display state of the three-dimensional display image 76 according to the object detection. The direction of a viewer's eyes is any position (for example, a front direction). A bird image is displayed as the three-dimensional display image 76. For example, as shown in FIGS. 37A and 37B, display is performed such that the direction of a bird is changed to a direction, in which the hand 75 is detected, around the rotating section 104. The viewer can have a feeling of operating the display state (direction of a bird) of the three-dimensional display image 76 only by holding up the hand 75.

In addition, hysteresis may be given to the threshold level used for determination of a response region shown in FIG. 38. In addition, any display operation according to the change of the reflection intensity may be performed without setting the threshold level.

Other Embodiments

The present invention is not limited to the above-described embodiments, and may be modified in various ways.

For example, in the multi-directional three-dimensional image display device 10 shown in FIGS. 1 and 2, a fixed member for protection of the rotating section 104 may be provided outside the rotating section 104. In this case, for example, a fixed member which does not rotate may be provided, so as to cover the outer periphery of the external body 41 formed with the slit 102, at a distance therebetween. The fixed member may be formed by a cylindrical transparent member, for example. Alternatively, a cylindrical member processed into a net shape may also be used as the fixed member. For example, a member formed by metal processed into the net shape, such as punching metal, may be used.

The present invention is very suitable for being applied to a multi-directional three-dimensional image display device or the like based on the light reproduction method which images a subject over its entire periphery or reproduces a three-dimensional image over the entire periphery of the subject on the basis of two-dimensional image information for three-dimensional image display and the like created by a computer.

The present application contains subject matters related to those disclosed in Japanese Priority Patent Applications JP 2008-317522, JP 2009-242716 and JP 2009-280754 filed in the Japan Patent Office on Dec. 12, 2008, Oct. 21, 2009 and Dec. 10, 2009, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A three-dimensional image display device, comprising:
   a rotating section operable to rotate about a rotation center, the rotating section comprising:
      an external body comprising a slit; and
      a plurality of light emitting elements arranged in a matrix and disposed within the external body such that all of the light emitting elements arranged in the matrix are on one side of the rotation center, each light emitting element of the plurality of light emitting elements comprising a curved portion with a concave light-emission surface, wherein the plurality of light emitting elements and the external body are coupled so that the plurality of light emitting elements and the external body rotate about the rotation center together such that each light emitting element of the plurality of light emitting elements is configured to emit light outwardly from the slit independent of the position of the slit relative to the rotation center
   a display controller controlling emission of light by each one of the plurality of light emitting elements on a basis of image data.

2. The three-dimensional image display device of claim 1, wherein the image display data is for a three-dimensional image, and the display controller causes an image corresponding to the image data to be created at each of at least two viewing points.

3. The three-dimensional image display device of claim 2, wherein the display controller causes a substantially planar image to be created at each of the at least two viewing points.

4. The three-dimensional image display device of claim 1, wherein the display controller causes a same image to be created at a plurality of viewing points with respect to the image display device.

5. An image display device, comprising:
   a rotating section operable to rotate about a rotation center, the rotating section comprising:
      an external body comprising a slit; and
      a plurality of light emitting elements operable to present an image, wherein the plurality of light emitting elements are disposed within the external body such that all of the light emitting elements are on one side of the rotation center, wherein the plurality of light emitting elements and the external body are coupled so that the plurality of light emitting elements and the external body rotate about the rotation center together such that each light emitting element of the plurality of light emitting elements is configured to emit light outwardly from the slit independent of the position of the slit relative to the rotation center;
   a sensor being operable to rotate about the center and to detect an object; and
   a display controller to control presentation of the image based at least in part on detection of an object by the sensor.

6. The image display device of claim 5, wherein the rotating section and the sensor are operatively coupled so that the rotating section and the sensor rotate about the center together.

7. The image display device of claim 5, wherein the detection of an object by the sensor comprises detection of a presence of an object.

8. The image display device of claim 5, wherein the detection of an object by the sensor comprises detection of a position of an object with respect to the rotating section.

9. The image display device of claim 8, wherein the modification to the image is controlled at least in part based on the position of the object with respect to the rotating section.

10. The image display device of claim 5, wherein the detection of an object by the sensor comprises detection of a position of an object with respect to the image.

11. The image display device of claim 10, wherein the modification to the image is controlled at least in part based on the position of the object with respect to the image.

12. The image display device of claim 5, wherein the detection of an object by the sensor comprises detection of movement of an object.

13. The image display device of claim 12, wherein the sensor detects movement in a direction, and the display device controls a display of the image based at least in part on the direction.

14. The image display device of claim 13, wherein control of a display of the image comprises control of movement of the image.

15. The image display device of claim 14, wherein control of movement of the image comprises control of movement of the image away from the detected movement of the object.

16. The image display device of claim 14, wherein control of movement of the image comprises control of movement of the image toward the detected movement of the object.

17. The image display device of claim 14, wherein control of movement of the image comprises control of a rotation of the image about a point determined based on the detected movement of the object.

18. The image display device of claim 5, wherein the object detected by the sensor is a viewer of the image display device.

19. The image display device of claim 18, wherein the object detected by the sensor is an appendage of the viewer.

20. The image display device of claim 5, wherein the sensor comprises an infrared sensor.

21. The image display device of claim 5, wherein the rotating section presents the image as rotating.

22. The image display device of claim 5, wherein the rotating section presents the image as three-dimensional.

23. The image display device of claim 5, wherein the rotating section is operable to rotate 360 degrees about the center.

24. The image display device of claim 5, wherein:
   the rotating section has a surface and is operable to present an image to a viewer having a view of the surface;
   the sensor is operable to rotate about the center and to detect the object at any of a plurality of points along the surface; and the display controller controls presentation of the image on the surface based at least in part on the object detected by the sensor.

25. The image display device of claim 24, wherein the sensor comprises only a single sensor.

26. The three-dimensional image display device of claim 1, wherein each one of the plurality of light emitting elements is operable to emit light through the slit to a viewing position as the rotating section rotates about the rotation center.

* * * * *